(12) United States Patent
Reznik et al.

(10) Patent No.: US 11,849,153 B2
(45) Date of Patent: Dec. 19, 2023

(54) METHODS AND SYSTEMS FOR VIDEO DELIVERY SUPPORTING ADAPTATION TO VIEWING CONDITIONS

(71) Applicant: Vid Scale, Inc., Wilmington, DE (US)

(72) Inventors: Yuriy Reznik, Seattle, WA (US); Eduardo Asbun, Santa Clara, CA (US); Zhifeng Chen, San Diego, CA (US); Yan Ye, San Diego, CA (US); Eldad M. Zeira, Encinitas, CA (US); Ariela Zeira, Encinitas, CA (US); Naresh Soni, San Diego, CA (US); Hang Liu, North Potomac, MD (US)

(73) Assignee: VID SCALE, Inc., Wilmington, DE (US)

(*) Notice: Subject to any disclaimer, the term of this patent is extended or adjusted under 35 U.S.C. 154(b) by 0 days.

(21) Appl. No.: 17/225,191

(22) Filed: Apr. 8, 2021

(65) Prior Publication Data

US 2021/0235126 A1    Jul. 29, 2021

Related U.S. Application Data

(63) Continuation of application No. 13/745,580, filed on Jan. 18, 2013, now abandoned.
(Continued)

(51) Int. Cl.
*H04N 19/85* (2014.01)
*H04N 21/6587* (2011.01)
(Continued)

(52) U.S. Cl.
CPC .......... *H04N 19/85* (2014.11); *H04L 65/612* (2022.05); *H04L 65/762* (2022.05); *H04L 65/80* (2013.01);
(Continued)

(58) Field of Classification Search
None
See application file for complete search history.

(56) References Cited

U.S. PATENT DOCUMENTS 6,594,377 B1   7/2003  Kim et al.
6,611,613 B1   8/2003  Kang et al.
(Continued)

FOREIGN PATENT DOCUMENTS

CN    1557083 A    12/2004
CN    101133438 A   2/2008
(Continued)

OTHER PUBLICATIONS

Viola, P., Jones, M.J. Robust Real-Time Face Detection. International Journal of Computer Vision 57, 137-154 (2004). https://doi.org/10.1023/B:VISI.0000013087.49260.fb (Year: 2004).*
(Continued)

*Primary Examiner* — Stuart D Bennett
(74) *Attorney, Agent, or Firm* — Condo Roccia Koptiw LLP

(57) ABSTRACT

Described herein are methods and systems associated with viewing condition adaption of multimedia content. A method for receiving multimedia content with a device from a network may include determining a viewing parameter, transmitting a request for the multimedia content to the network, whereby the request may be based on the viewing parameter, and receiving the multimedia content from the network, whereby the multimedia content may be processed at a rate according to the viewing parameter. The viewing parameter may include at least one of: a user viewing parameter, a device viewing parameter, or a content viewing parameter. The method may further include receiving a multimedia presentation description (MPD) file from the network. The MPD file may include information relating to the rate of the multimedia content and information relating
(Continued)

to the rate may include a descriptor relating to the viewing parameter, whereby the descriptor may be required or optional.

16 Claims, 31 Drawing Sheets

Related U.S. Application Data

(60) Provisional application No. 61/672,668, filed on Jul. 17, 2012, provisional application No. 61/671,633, filed on Jul. 13, 2012, provisional application No. 61/588,588, filed on Jan. 19, 2012.

(51) Int. Cl.

| | | |
|---|---|---|
| *H04N 21/442* | (2011.01) | |
| *H04N 21/2343* | (2011.01) | |
| *H04L 67/306* | (2022.01) | |
| *H04L 67/303* | (2022.01) | |
| *H04N 21/81* | (2011.01) | |
| *H04L 65/80* | (2022.01) | |
| *H04L 65/612* | (2022.01) | |
| *H04L 65/75* | (2022.01) | |

(52) U.S. Cl.
CPC .......... *H04L 67/303* (2013.01); *H04L 67/306* (2013.01); *H04N 21/2343* (2013.01); *H04N 21/44218* (2013.01); *H04N 21/6587* (2013.01); *H04N 21/816* (2013.01)

(56) References Cited

U.S. PATENT DOCUMENTS

| | | | |
|---|---|---|---|
| 6,652,099 | B2 | 11/2003 | Chae et al. |
| 6,760,467 | B1 | 7/2004 | Min et al. |
| 7,095,901 | B2 | 8/2006 | Lee et al. |
| 7,146,027 | B2 | 12/2006 | Kim et al. |
| 7,215,797 | B2 | 5/2007 | Park |
| 7,271,839 | B2 | 9/2007 | Lee et al. |
| 7,284,201 | B2 | 10/2007 | Cohen-Solal |
| 7,768,572 | B2 | 8/2010 | Park |
| 8,477,995 | B2 | 7/2013 | Porter et al. |
| 2002/0057439 | A1 | 5/2002 | Chae et al. |
| 2003/0052911 | A1 | 3/2003 | Cohen-Solal |
| 2003/0156741 | A1 | 8/2003 | Lee et al. |
| 2005/0024381 | A1* | 2/2005 | Dotson .................... G09G 5/08 345/600 |
| 2006/0158558 | A1 | 7/2006 | Chung |
| 2006/0165176 | A1 | 7/2006 | Raveendran et al. |
| 2007/0081587 | A1 | 4/2007 | Raveendran et al. |
| 2007/0091920 | A1 | 4/2007 | Harris et al. |
| 2007/0113246 | A1 | 5/2007 | Xiong |
| 2007/0136772 | A1* | 6/2007 | Weaver ............... H04L 43/0882 348/E7.071 |
| 2007/0177852 | A1 | 8/2007 | Ando et al. |
| 2007/0263986 | A1 | 11/2007 | Matsubara et al. |
| 2008/0006762 | A1* | 1/2008 | Fadell ................... G06F 3/0383 250/201.1 |
| 2008/0117323 | A1 | 5/2008 | Sakamoto et al. |
| 2009/0278032 | A1* | 11/2009 | Tilmann ............... H05B 39/042 250/214 AL |
| 2010/0056274 | A1 | 3/2010 | Uusitalo et al. |
| 2010/0079508 | A1 | 4/2010 | Hodge et al. |
| 2010/0250765 | A1 | 9/2010 | Riggert et al. |
| 2010/0254670 | A1 | 10/2010 | Amsterdam et al. |
| 2011/0093605 | A1 | 4/2011 | Choudhury et al. |
| 2011/0141114 | A1* | 6/2011 | Chen .................... G06V 40/161 345/428 |
| 2011/0148926 | A1 | 6/2011 | Koo et al. |
| 2011/0150429 | A1 | 6/2011 | Kaneko |
| 2011/0194454 | A1 | 8/2011 | Ohmae |
| 2011/0211114 | A1 | 9/2011 | Cooper |
| 2011/0254846 | A1 | 10/2011 | Lee et al. |
| 2012/0020413 | A1 | 1/2012 | Chen et al. |
| 2012/0120271 | A1 | 5/2012 | Park et al. |
| 2012/0230553 | A1 | 9/2012 | Chandra Bijalwan |
| 2012/0259946 | A1* | 10/2012 | Stockhammer ..... H04L 65/1045 709/217 |
| 2013/0044101 | A1 | 2/2013 | Kim et al. |
| 2013/0125155 | A1* | 5/2013 | Bhagavathy ......... H04N 19/162 725/10 |
| 2013/0135198 | A1 | 5/2013 | Hodge et al. |
| 2014/0032777 | A1 | 1/2014 | Yuan et al. |

FOREIGN PATENT DOCUMENTS

| | | |
|---|---|---|
| CN | 101815227 A | 8/2010 |
| CN | 102177728 A | 9/2011 |
| JP | 2000-276123 A | 10/2000 |
| JP | 2001-251322 A | 9/2001 |
| JP | 2007-110312 A | 4/2007 |
| JP | 2007-306430 A | 11/2007 |
| JP | 2010-176307 A | 8/2010 |
| JP | 2011-172250 A | 9/2011 |
| KR | 10-2004-0041168 A | 5/2004 |
| KR | 10-2006-0079124 A | 7/2006 |
| KR | 10-1008523 B1 | 1/2011 |
| KR | 10-2011-0057921 A | 6/2011 |
| WO | 03/026250 A1 | 3/2003 |
| WO | 2011/047335 A1 | 4/2011 |
| WO | 2011/087449 A1 | 7/2011 |
| WO | 2011/100901 A2 | 8/2011 |
| WO | 2011/101448 A2 | 8/2011 |
| WO | 2011/102791 A1 | 8/2011 |
| WO | 2012/015460 A1 | 2/2012 |

OTHER PUBLICATIONS

K. A. Rahman, M. S. Hossain, M. A.-A. Bhuiyan, T. Zhang, M. Hasanuzzaman and H. Ueno, "Person to Camera Distance Measurement Based on Eye-Distance," 2009 Third International Conference on Multimedia and Ubiquitous Engineering, Qingdao, China, 2009, pp. 137-141, doi: 10.1109/MUE.2009.34. (Year: 2009).*

Akhshabi et al., "An Experimental Evaluation of Rate-Adaptation Algorithms in Adaptive Streaming over HTTP", MMSys'11, Proceedings of the Second Annual ACM Conference on Multimedia Systems, San Jose, California, USA, Feb. 23, 2011, 12 pages.

Apple Inc., "HTTP Live Streaming Overview", Developer, Feb. 11, 2014, pp. 1-39.

Bababekova et al., "Font Size and Viewing Distance of Handheld Smart Phones", Optometry and Vision Science, vol. 88, No. 7, Jul. 7, 2011, pp. 795-797.

Ban et al., "Design and Implementation of a Dynamic Adaptive Streaming System over HTTP", 2011 Fall Conference of the Journal of the Korea Institute of Maritime Information & Communication Sciences, Oct. 26, 2011, pp. 666-668.

Bergquist, Johan, "Resolution and Contrast Requirements on Mobile Displays for Different Applications in Varying Luminous Environments", Proceedings of the 2nd International Symposium on Nanovision Science, Hamamatsu, 2005, 3 pages.

Brandon, John, "How the iPhone Works", Available at <https://www.macworld.com/article/1143221/smartphones/how-iphone-works.html; Macworld; IOS Central>, Oct. 9, 2009, pp. 1-7.

Cermak et al., "The Relationship Among Video Quality, Screen Resolution, and Bit Rate", IEEE Transactions on Broadcasting, vol. 57, No. 2, Jun. 2011, pp. 258-262.

Conklin et al., "Video Coding for Streaming Media Delivery on the Internet", IEEE Transactions on Circuits and Systems for Video Technology, vol. 11, No. 3, Mar. 2001, pp. 269-281.

Curcio et al., "Human Photoreceptor Topography", The Journal of Comparative Neurology, vol. 292, Feb. 1990, pp. 497-523.

Curcio, Igor D. D., "Mobile Video Telephony", Wireless Internet Handbook, CRC Press, Inc., 2003, 15 pages.

Daly, Scott, "Motion Perception in Displays", Dolby Laboratories, Simon Fraser University, Oct. 2011, 153 pages.

(56) References Cited

OTHER PUBLICATIONS

De Valois et al., "Spatial Vision", Oxford Science Publications, Mar. 1988, 11 pages.
Displaymate, "Mobile LCD and OLED Display Shoot-Outs", Available at <http://www.displaymate.com/mobile.html>, pp. 1-4.
Dodgson, Neil A., "Variation and Extrema of Human Interpupillary Distance", Stereoscopic Displays and Virtual Reality Systems XI, vol. 5291, San Jose, California, USA, May 21, 2004, pp. 1-11.
Graham, Clarence H., "Vision and Visual Perception", Manor House, John Wiley & Sons, Inc., Dec. 1965, 14 pages.
ISO/IEC, "Information Technology—Dynamic Adaptive Streaming Over HTTP (Dash)—Part 1: Media Presentation Description and Segment Formats", ISO/IEC 23009-1:2012(E), Apr. 1, 2012, 134 pages.
ISO/IEC, "Information Technology—Dynamic Adaptive Streaming over HTTP (Dash)—Part 1: Media Presentation Description and Segment Formats", ISO/IEC DIS 23009-1, Aug. 30, 2011, 131 pages.
Jain, Anil K., "Fundamentals of Digital Image Processing", Point Operations, Prentice Hall Information and System Sciences Series, 1989, 21 pages.
Kalloniatis et al., "Webvision—Visual Acuity", Available at <http://webvision.med.utah.edu/book/part-viii-gabac-receptors/visual-acuity/>, Jun. 5, 2007, pp. 1-13.
Levent-Levi, Tsahi, "The Past, Present and Future of Mobile Video Telephony", VisionMobile, Available at <http://www.visionmobile.com/blog/2010/06/the-past-present-and-future-of-mobile-video-telephony/>, Jun. 8, 2010, pp. 1-16.
Liu et al., "Rate Adaption for Adaptive HTTP Streaming", Proceedings of the Second Annual ACM Conference on Multimedia System, San Jose, California, USA, Feb. 23-25, 2011, pp. 169-174.
Luk, Lorraine, "Apple Developing New iPad", The Wall Street Journal, Available at <http://online.wsj.com/article/SB10001424053111903596904576517674178129628.html>, Aug. 2011, pp. 1-2.
Myers, David J., "Mobile Video Telephony for 3G Wireless Networks", The McGraw-Hill Companies, Inc., 2004, 12 pages.
Real Networks, "Codec and Protocol Support Helix Media Delivery Platform", Helix Producer 14 and Helix Server 14.2, Oct. 27, 2011, 45 pages.
Romero, Luciano Rubio, "A Dynamic Adaptive HTTP Streaming Video Service for Google Android", School of Information and Communication Technology, Royal Institute of Technology, Stockholm, Sweden, Oct. 6, 2011, 148 pages.
Shibata et al., "The Zone of Comfort: Predicting Visual Discomfort with Stereo Displays", Journal of Vision, vol. 11, No. 8, Jul. 2011, 59 pages.
Takahashi, Fumitada, "Future of Television", Nikkei Electronics, No. 1072, Dec. 26, 2011, 9 pages.
Viola et al., "Rapid Object Detection Using a Boosted Cascade of Simple Features", Proceedings of the 2001 IEEE Computer Society Conference on Computer Vision and Pattern Recognition, CVPR 2001, vol. 1, 2001, pp. 1-9.

* cited by examiner

METHODS AND SYSTEMS FOR VIDEO DELIVERY SUPPORTING ADAPTATION TO VIEWING CONDITIONS

CROSS REFERENCE TO RELATED APPLICATIONS

This application is a continuation application of U.S. patent application Ser. No. 13/745,580, filed Jan. 18, 2013, which claims the benefit of U.S. Provisional Patent Application No. 61/672,668, filed Jul. 17, 2012, U.S. Provisional Patent Application No. 61/671,633, filed Jul. 13, 2012, and U.S. Provisional Patent Application No. 61/588,588, filed Jan. 19, 2012 the contents of which are hereby incorporated by reference herein.

BACKGROUND

Streaming content over wireless and wired networks may utilize adaptation due to variable bandwidth in the network. Streaming content providers may publish content encoded at multiple rates and/or resolutions. This may enable clients to adapt to varying channel bandwidth. The MPEG/3GPP DASH standard may define a framework for the design of an end-to-end service that may enable efficient and high-quality delivery of streaming services over wireless and wired networks.

SUMMARY

Described herein are methods and systems associated with viewing condition adaption of multimedia content. A method for receiving multimedia content with a device from a network may include determining a viewing parameter and transmitting a request for the multimedia content to the network, whereby the request may be based on the viewing parameter. The method may further include receiving the multimedia content from the network, whereby the multimedia content may be processed at a rate according to the viewing parameter. A device may be configured to receive multimedia content from a network. The device may include a processor that may be configured to determine a viewing parameter, and transmit a request for the multimedia content to the network, whereby the request may be based on the viewing parameter. The processor may be further configured to receive the multimedia content from the network, whereby the multimedia content may be processed at a rate according to the viewing parameter. The device may be, for example, a wireless transmit/receive unit, a streaming video player, a video chat application, a video application, or a video game application.

A method for delivery of multimedia content to a device from a network may include determining a viewing parameter, determining characteristics of video encoding suitable for the determined viewing parameter, and transmitting video content encoded according to the determined characteristics of video encoding.

The multimedia content may be a video file. The method may be performed via a DASH client of the device. The processor may be part of a DASH client of the device.

The rate may be a function of at least one of: an encoding rate of the multimedia content, a spatial resolution of the multimedia content, a temporal resolution of the multimedia content, quantization parameters, rate control parameters, target bit rate of the multimedia content, spatial filtering of the multimedia content, or temporal filtering of the multimedia content.

The viewing parameter may include at least one of: a user viewing parameter, a device viewing parameter, or a content viewing parameter. The user viewing parameter may include at least one of: a user's presence, a user's location with respect to a screen of the device, a user's orientation with respect to a screen of the device, a user's viewing angle with respect to a screen of the device, a user's distance from a screen of the device, a user's visual acuity, an ambient lighting condition, a number of users viewing a screen of the device, or a user's point of attention.

The device viewing parameter may include at least one of: mobility of the device, size of a screen of the device, resolution of a screen of the device, pixel density of a screen of the device, size of a window displaying the multimedia content on the device, or a location of a window displaying the multimedia content on the device.

The content viewing parameter may include at least one of: contrast of the multimedia content, color gamut of the multimedia content, presence of third-dimension of multimedia content, or range of depth of three-dimensional content of the multimedia content.

The viewing parameter may be determined using at least one of: a size of a screen of the device, a resolution of a screen of the device, an angle of a screen of the device, a pixel density of a screen of the device, a contrast ratio of a screen of the device, a user proximity sensor, a front facing camera, a back facing camera, a light sensor, an infra-red imaging device, an ultra-sonic sensor, a microphone, an accelerometer, a compass, or a gyroscope sensor.

The request transmitted by the device may determine the rate of multimedia content received by the device. The network may determine the rate of the multimedia content received by the device according to the request. For example, the request may be a multimedia presentation description (MPD) file that comprises the viewing parameter.

The method may further include receiving a manifest file (e.g., a multimedia presentation description (MPD)) file from the network. The processor may be further configured to receive a multimedia presentation description (MPD) file from the network. The MPD file may include information relating to the rate of the multimedia content. The information relating to the rate may include a descriptor relating to the viewing parameter. The MPD file may indicate whether the descriptor is required or optional. A required descriptor may indicate that the device must meet the requirements of the descriptor to receive the multimedia content processed at the rate. An optional descriptor may indicate that the device may meet the requirements of the descriptor to receive the multimedia content processed at the rate.

BRIEF DESCRIPTION OF THE DRAWINGS

FIG. 23 illustrates an example of an interface for detecting the smallest font size a user can recognize.

FIG. 24 illustrates an example of an interface for detecting the longest distance at which a user can see the smallest spatial details.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Video delivery systems may transmit video encoded under an assumption that the video will be viewed under ideal reproduction settings (e.g., dimmed room, high-contrast displays, wide viewing angle, etc.). This may require a significant amount of bandwidth to encode and carry visual information (e.g., videos, games, etc.) that may be rendered on the screen. Implementations described herein may be utilized in situations (e.g., in mobile situations) where reproduction settings may deviate from the ideal reproduction settings. For example, implementations described herein may provide for an adaptive system that may be more efficient in delivering and rendering content in less than ideal reproduction settings by, for example, taking into consideration the viewing conditions present at the time when a viewer is watching the visual content.

Figure 1A:
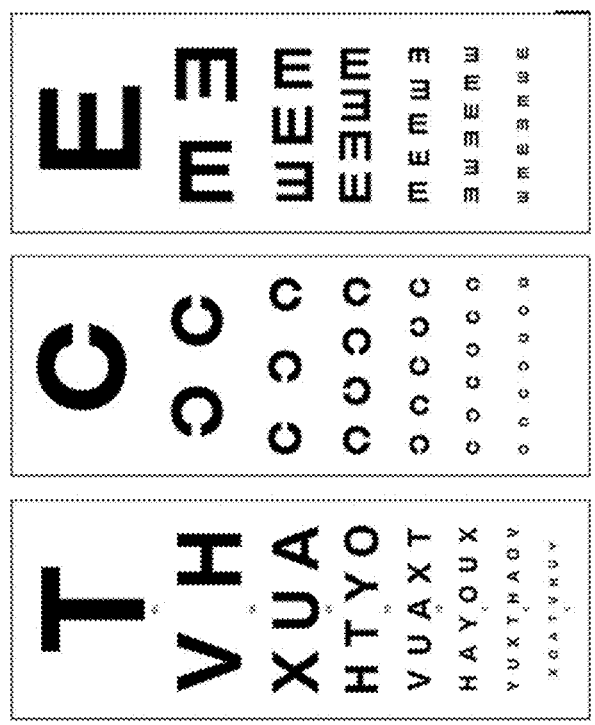
FIG. 1A illustrates examples of Snellen, Landolt C, and "Illiterate E" charts for visual acuity.
Figure 1C:
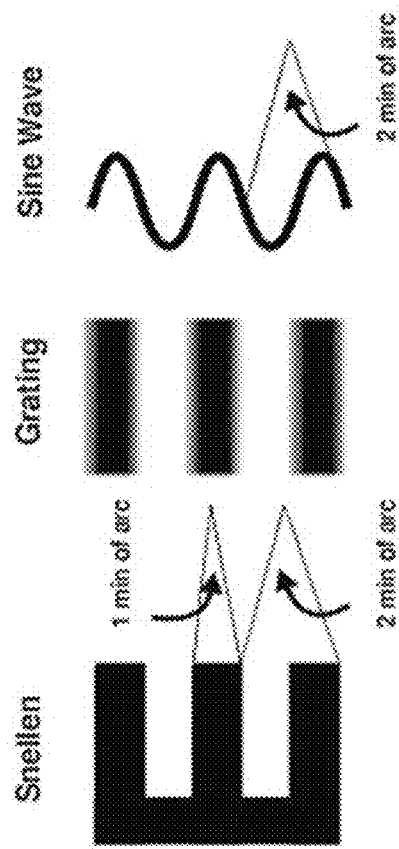
FIG. 1C illustrates an example of deriving dominant spatial frequency from a Snellen's E chart.
Figure 1B:
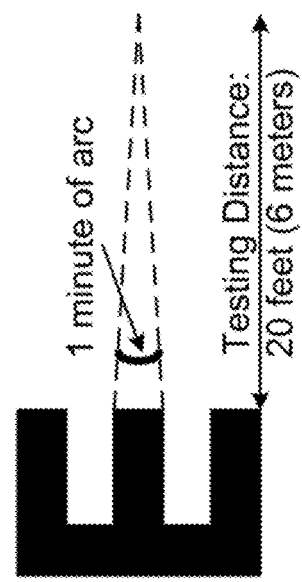
FIG. 1B illustrates an example of characteristics of the letter E in "20/20 vision" row.

Several phenomena/characteristics of human visual may be utilized by the implementations described herein. Visual acuity may be a measure of spatial resolution of a visual processing system. It may be measured by using an optometric charts, such as but not limited to the Snellen, Landolt C, and/or "Illiterate E" charts, shown in FIGS. 1A-C. For example, the term "20/20-vision" may be used to describe normal vision for adults. It may imply an ability to read a row including letters designed such that when viewed from 20 feet (e.g., approximately 6 meters), their smallest spatial details (e.g., strokes, gaps) constitute 1 minute of arc (e.g., $\frac{1}{60}$ of degree of visual angle). An example of such is illustrate in FIG. 1B. "20/20 vision" may imply the ability to resolve details as small as 1 minute of arc (e.g., $\frac{1}{60}$ of degree of visual angle).

Spatial frequency limit may be utilized. There may be a connection between visual acuity and the spatial frequency limit of the human visual system. This may be explained by showing Snellen's E to a grating conversion, for example, as exemplified in FIG. 1C. It may be observed that for 20/20 (6/6)-row E letter, there may be 2 minutes of arc in one cycle. There may be 60 minutes in one degree, and therefore one degree may include 30 cycles. In a 20/20 (6/6) letter, there may be 30 cycles per degree (cpd). For example, the term "20/20 vision" may correspond to an ability to resolve spatial frequencies as high as 30 cycles per degree.

Figure 2:
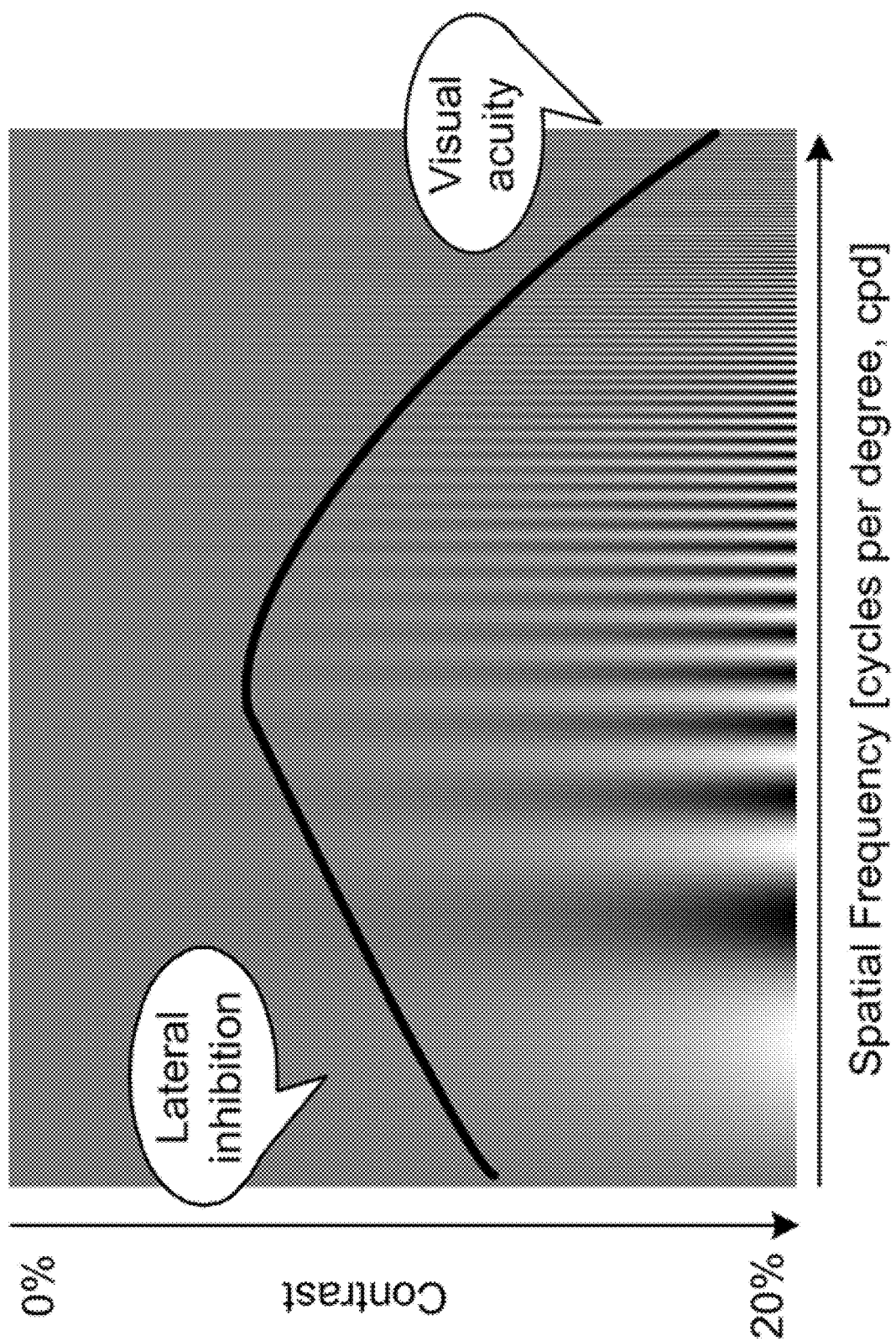
FIG. 2 illustrates an example of Campbell-Robson overlaid with Contrast Sensitivity Function (CSF).

Contrast sensitivity functions (CSF) may be utilized. Visual acuity may be measured using high contrast letters (e.g., black symbols on a white background). "Contrast Sensitivity Function" (CSF) may be a more complete characterization of HVS limits, obtained by considering images of different contrasts. CSF may be best understood when overlaid with a Campbell-Robson chart, an example of which is shown in FIG. 2. Referring to FIG. 2, the luminance of pixels may be modulated sinusoidally along the horizontal dimension. The frequency of modulation (e.g., spatial frequency) may increase logarithmically (e.g., with a substantially exponential increase in frequency from left to right). The contrast may vary logarithmically from 100% to about 0.5% (e.g., from the bottom to the top).

As show in FIG. 2, CSF may exemplify the boundary of a visible region in contrast/spatial frequency space. The leftmost point of CSF may coincide with a visual acuity limit (e.g., a cut-off frequency at the high contrast). CSF may monotonically decrease at high frequencies until it reaches an acuity limit. CSF may decrease at low frequencies. This may be caused by a different neurobiological phenomenon. The peak of CSF may be near 6 cycles per degree. It may be noted that the shape of CSF may change based on the level of retinal illumination. Under low light conditions, sensitivity may be greatly diminished.

Figure 3:
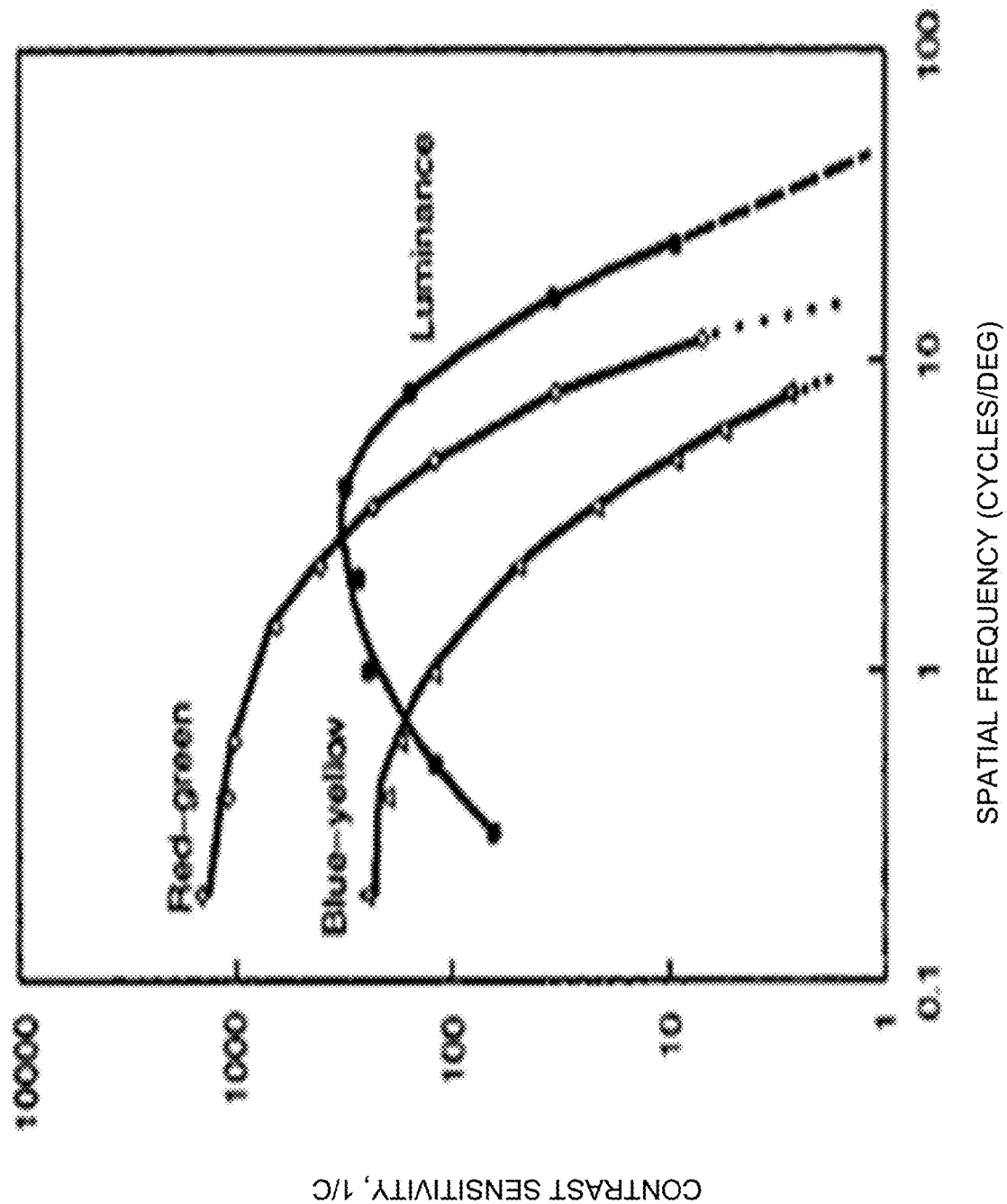
FIG. 3 illustrates an example comparison of CSF curves for gray-scale (luminance), red-green, and blue-yellow channels.

Limitations of color vision may be utilized. The human retina may include much fewer color sensitive elements (e.g., cones) as opposed to ones responding to the broad spectrum (e.g., rods). This may manifest itself in much lower spatial resolution of color vision. FIG. 3 illustrates an example of a comparison of CSF curves produced for gray-scale, red-green, and blue-yellow channels. As exemplified in FIG. 3, the blue-yellow and red-green channel may have an earlier decline, reaching cut-off at about 10-15 cycles per degree. This may be lower than acuity limit for luminance. Color-related CSFs may be influenced more by overall retinal illumination that CSF for luminance. Under low light conditions, we may not see colors. This phenomenon may be referred to as scotopic vision.

The angular limits of color vision maybe utilized. Humans may see colors in a narrow angle within a field of view. This may relate to an asymmetric distribution of rods and cones on a human retina.

Figure 4:
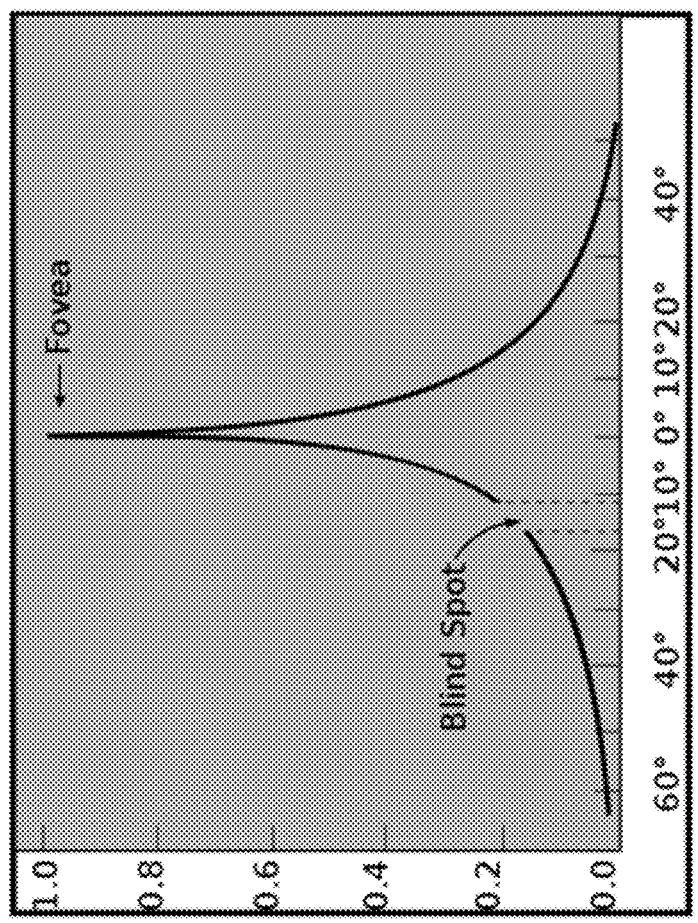
FIG. 4 illustrates an example of relative acuity (left eye) in degrees from fovea.

A comparison of foveal vs. peripheral vision, and relative acuity may be utilized. A high concentration of cone and ganglion cells in a fovea may lead to a higher visual acuity capability in this area. The standard vision tests may assess acuity for the foveal region. Outside fovea acuity may drop rapidly. An example plot of relative acuity as function of angle from the fovea is illustrated in FIG. 4.

Figure 5:
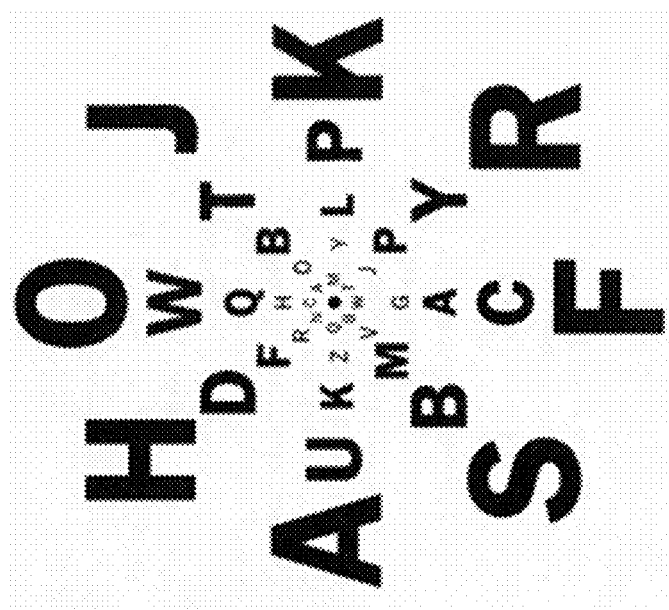
FIG. 5 illustrates an example test illustrating change of acuity with angle from fixation point.

FIG. 5 shows an example test illustrating change of acuity with angle from fixation point. This test may demonstrate that when focusing on the center, all characters appear equally sharp. This test may be taken at a comfortable viewing distance at which the spatial angle between the smallest and biggest characters may be approximately 2 degrees. The linear size difference between the smallest and largest characters may be approximately 1:8.

The implication of this phenomenon may be that a small fraction of the picture may be ever observed at full resolution at any one time. To estimate a limit of the potential savings using this phenomenon, we may assume that the horizontal and vertical pixel densities may be identical, therefore savings may be approximated by areas. With screen diagonal size of D and an aspect ratio of r, the screen size may be:

$$A = D^2 \frac{1}{1+r^2}$$

The "high resolution" area may include the outer square defined by angle β (e.g., approximately 2°), and may depend on the viewing distance d and may be given by:

$$A' = 4d^2 (\tan \beta)^2$$

It may be assumed that the low resolution (e.g., the outside of the focus area) may be coded with a resolution that is lower than the focus area, for example, by a factor R. The pixel count ratio (e.g., with to without this technique) may be:

$$\frac{A' + (A - A')/R}{A} = \frac{1}{R} + \frac{A'}{A}\left(1 - \frac{1}{R}\right) = \frac{1}{R} + \frac{4d^2(\tan\beta)^2}{D^2 \frac{1}{1+r^2}}\left(1 - \frac{1}{R}\right)$$

With D=9.7", r=9/16, R=8, d=25, and β=2°, the ratio may be approximately 15%, which may be a savings of 85%. A smooth variation between tiles (e.g., in space and/or in time) may result in a lower savings but a better user experience.

Dynamic Adaptive HTTP Streaming (DASH) may be described and utilized herein. DASH may consolidate several approaches for HTTP streaming. For example, MPEG DASH may be an extension of "3GP-DASH" described in 3GPP Release 10. DASH may be used to cope with variable bandwidth in wireless and wired networks. DASH may be supported by content providers and devices. DASH may enable multimedia streaming services over any access network to any device.

Figure 6:
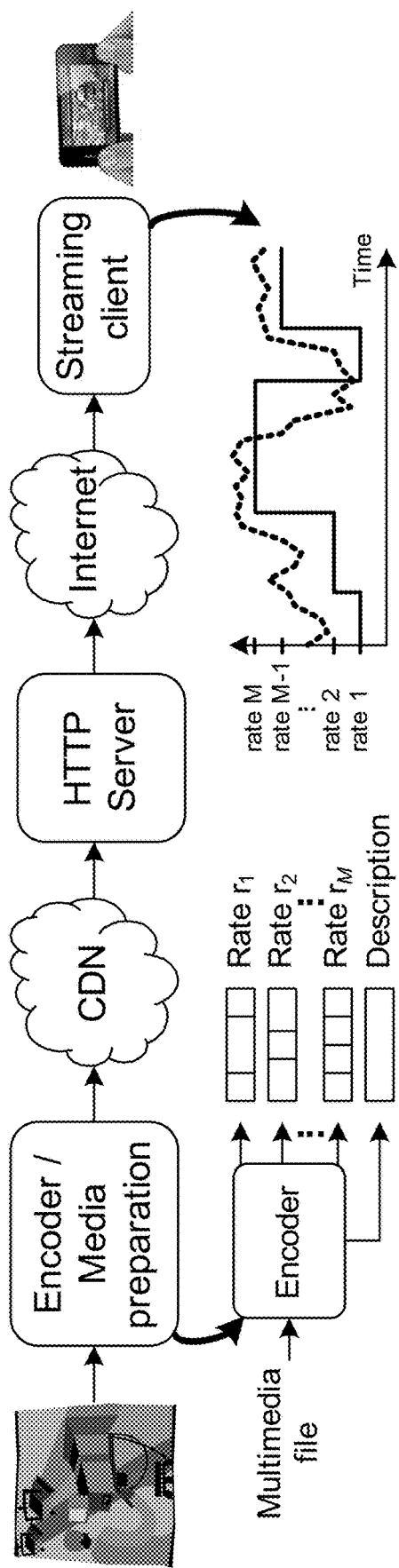
FIG. 6 illustrates a diagram of an example DASH high-level system architecture.

DASH may be deployed as a set of HTTP servers that may distribute live and/or on-demand content that may have been prepared in a suitable format. Clients may access content directly from the HTTP servers and/or from Content Distribution Networks (CDN), for example, as shown in FIG. 6. FIG. 6 illustrates a diagram of an example DASH high-level system architecture. CDNs may be used for deployments where a large number of clients are expected, as they may cache content and may be located near the clients at the edge of the network.

In DASH, the streaming session may be controlled by the client by requesting segments using HTTP and splicing them together as they are received from the content provider and/or CDN. A client may monitor (e.g., continually monitor) and adjust media rate based on network conditions (e.g., packet error rate, delay jitter) and their own state (e.g., buffer fullness, user behavior and preferences), effectively moving intelligence from the network to the client.

Figure 7:
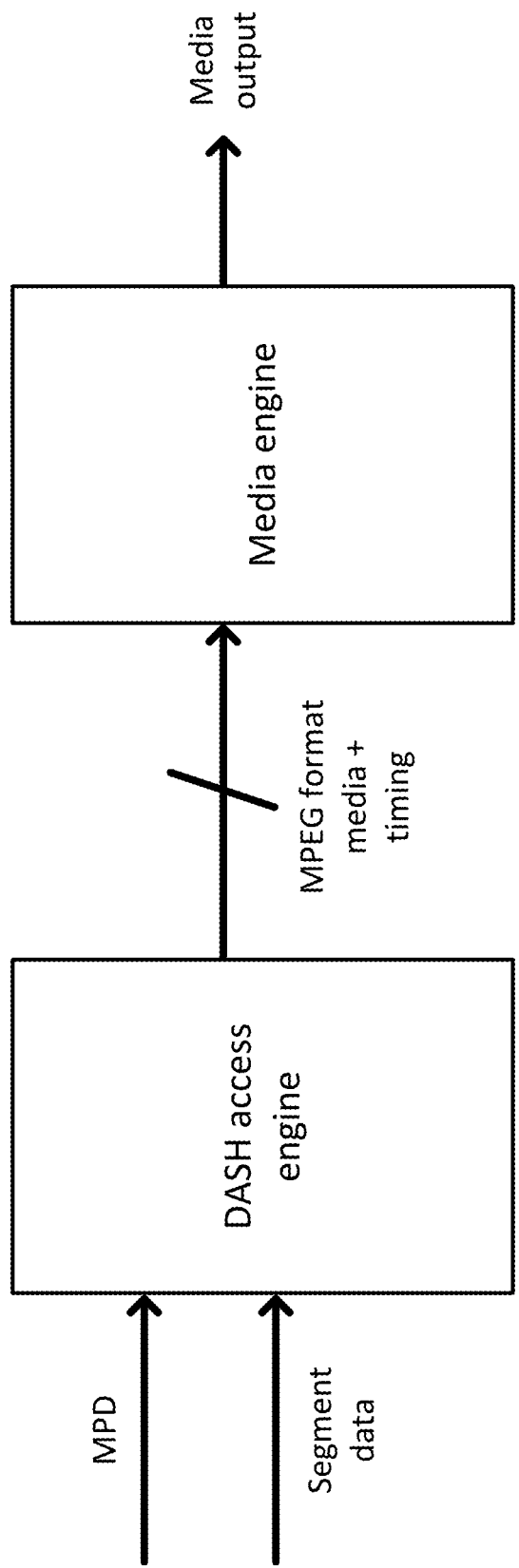
FIG. 7 illustrates a diagram of an example DASH client model.

The design of the DASH standard may be based on an informative client model, for example, as shown in FIG. 7. FIG. 7 illustrates a diagram of an example DASH client model. FIG. 7 illustrates an example of the logical components of a conceptual DASH client model. The DASH Access Engine may receive the media presentation description file (MPD), construct and issue requests and/or receive segments or parts of segments. The output of the DASH Access Engine may consist of media in MPEG container formats (e.g., MP4 File Format or MPEG-2 Transport Stream) together with timing information that maps the internal timing of the media to the timeline of the presentation. A combination of encoded chunks of media, together with timing information may be sufficient for correct rendering of the content.

Most constraints that DASH imposes on encoded media segments may be based on an assumption that decoding, postprocessing, and/or playback may be done by a media engine that knows nothing about what those segments are and/or how they were delivered. The media engine may just decode and play the continuous media file, fed in chunks by the DASH access engine. For example, the access engine may be a Java script, while the media engine may be something that is provided by browser, browser plugin (e.g., Flash® or Silverlight®), and/or an operating system.

Figure 8:
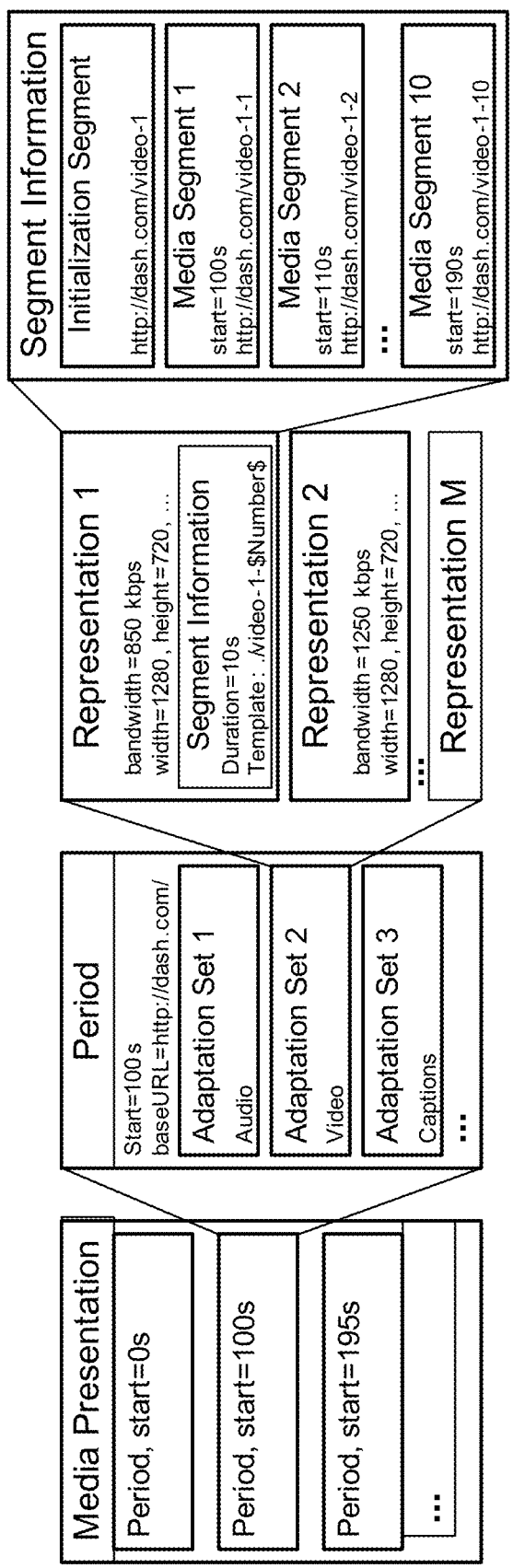
FIG. 8 illustrates a diagram of an example DASH media presentation high-level data model.

FIG. 8 illustrates a diagram of an example DASH media presentation high-level data model. In DASH, the organization of a multimedia presentation may be based on a hierarchical data model. A media presentation description (MPD) may describe the sequence of periods that make up a DASH media presentation (e.g., the multimedia content). A period may represent a media content period during which a consistent set of encoded versions of the media content may be available. The set of available bit rates, languages, and/or captions may not change during a period.

An adaptation set may represent a set of interchangeable encoded versions of one or several media content components. For example, there may be an Adaptation Set for video, one for primary audio, one for secondary audio, and/or one for captions. Adaptation Sets may also be multiplexed, in which case, interchangeable versions of the multiplex may be described as a single Adaptation Set. For example, an Adaptation Set may include video and main audio for a period.

A representation may describe a deliverable encoded version of one or more media content components. A representation may include one or more media streams (e.g., one for each media content component in the multiplex). Any single representation within an adaptation set may be sufficient to render the contained media content components. For example, a client may switch from representation to representation within an adaptation set, for example, in order to adapt to network conditions and/or other factors. A client may ignore representations that use codecs/profiles/parameters that they do not support.

A segment may be content within a representation that may be divided in time into segments of fixed or variable length. A URL may be provided for each segment. A segment may be the largest unit of data that may be retrieved with a single HTTP request. The media presentation description (MPD) may be an XML document that includes metadata for a DASH client to construct HTTP-URLs to access segments and to provide the streaming service to the user.

A base URL in the MPD may be used by the client to generate HTTP GET requests for segments and other resources in the media presentation. HTTP partial GET requests may be used to access a limited portion of a segment by using a byte range (e.g., via the 'Range' HTTP header). Base URLs may be specified to allow access to the presentation in case a location is unavailable, providing redundancy to the delivery of multimedia streams, and/or allowing client-side load balancing and parallel download.

An MPD may be "static" or "dynamic." A static MPD type may not change during the media presentation, and it may be used for on demand presentations. A dynamic MPD type may be updated during the media presentation, and it may be used for live presentations. An MPD may be updated to extend the list of segments for each representation, introduce a new period, and/or terminate the media presentation.

In DASH, encoded versions of different media content components (e.g., video, audio, etc.) may share a common timeline. The presentation time of access units within the media content may be mapped to a global common presentation timeline, which may be referred to as a Media Presentation Timeline. This may allow synchronization of different media components and/or may enable seamless switching of different coded versions (e.g., Representations) of the same media components.

A segment may include the actual segmented media streams. They may include additional information on how to map the media stream into the media presentation timeline for switching and/or synchronous presentation with other representations.

The segment availability timeline may be used to signal clients the availability time of segments at the specified HTTP URLs. For example, these times may be provided in wall-clock times. Before accessing the segments at the specified HTTP URL, a client may compare the wall-clock time to the segment availability times.

For on-demand content, the availability times of some or all segments may be identical. Some or all segments of the media presentation may be available on the server once any segment is available. The MPD may be a static document.

For live content, the availability times of segments may depend on the position of the segment in the media presentation timeline. Segments may become available with time as the content is produced. The MPD may be updated periodically to reflect changes in the presentation over time. For example, segment URLs for new segments may be added to the MPD and old segments that are no longer available may be removed from the MPD. Updating the MPD may not be necessary, for example, if segment URLs are described using a template.

The duration of a segment may represent the duration of the media included in the segment when presented at normal speed. Some or all segments in a representation may have the same or roughly similar duration. Segment duration may differ from representation to representation. A DASH presentation may be constructed with relative short segments (e.g., a few seconds), or longer segments including a single segment for the whole representation.

Short segments may be suitable for live content (e.g., by reducing end-to-end latency) and may allow for high switching granularity at the segment level. Short segments may increase the number of files in the presentation. Long segments may improve cache performance by reducing the number of files in the presentation. They may enable clients to make flexible request sizes (e.g., by using byte range requests). Long segments may necessitate the use of a segment index and may not be suitable for live events. Segments may or may not be extended over time. A segment may be a complete and discrete unit that may be made available in its entirety.

Segments may be further subdivided into sub-segments. A sub-segment may include a number of complete access units. An "access unit" may be a unit of a media stream with an assigned media presentation time. If a segment is divided into sub-segments, then the sub-segments may be described by a segment index. The segment index may provide the presentation time range in the representation and corresponding byte range in the segment occupied by each sub-segment. Clients may download this index in advance and then issue requests for individual sub-segments using HTTP partial GET requests. The segment index may be included in the media segment, for example, in the beginning of the file. Segment index information may also be provided in separate index segments.

DASH may define initialization segments, media segments, index segments, and bitstream switching segments. Initialization segments may include initialization information for accessing the representation. Initialization segments may or may not include media data with an assigned presentation time. The initialization segment may be processed by the client to initialize the media engines for enabling play-out of media segments of the included representation.

A media segment may include and/or encapsulate media streams that are described within the media segment and/or described by the initialization segment of the representation. Media segments may include a number of complete access units. Media segments may include at least one Stream Access Point (SAP) for each contained media stream.

Index segments may include information that may be related to media segments. Index segments may include indexing information for media segments. An index segment may provide information for one or more media segments. The index segment may be media format specific. Details may be defined for each media format that supports index segments.

A bitstream switching segment may include data that may be utilized for switching to the representation it may be assigned to. It may be media format specific and details may be defined for each media format that permits bitstream switching segments. One bitstream switching segment may be defined for each representation.

Clients may switch from representation to representation within an adaptation set at any point in the media. Switching at arbitrary positions may be complicated, for example, because of coding dependencies within representations and other factors. Download of 'overlapping' data may be avoided (e.g., media for the same time period from multiple representations). Switching may be simplest at a random access point in a new stream.

DASH may define a codec-independent concept of Stream Access Point (SAP) and identify various types of SAPs. Stream access point type may be communicated as one of the properties of the adaptation set (e.g., it may be assumed that some or all segments within an adaptation set have same SAP types).

A SAP may enable random access into a file container of media stream(s). A SAP may be a position in a container enabling playback of an identified media stream to be started using the information included in the container starting from that position onwards and/or possible initialization data from other part(s) of the container and/or externally available.

File container properties may include $T_{SAP}$. $T_{SAP}$ may be the earliest presentation time of an access unit of the media stream, for example, such that some or all access units of the media stream with the presentation time that is greater than or equal to $T_{SAP}$ may be correctly decoded using data in the Bitstream starting at $I_{SAP}$ and, potentially, no data before $I_{SAP}$. $I_{SAP}$ may be the greatest position in the bitstream such that some or all access units of the media stream with presentation time greater than or equal to $T_{SAP}$ may be correctly decoded using bitstream data starting at $I_{SAP}$ and, potentially, no data before $I_{SAP}$. $I_{SAU}$ may be the starting position in the bitstream of the latest access unit in decoding order within the media stream such that some or all access units of the media stream with presentation time greater than or equal to $T_{SAP}$ may be correctly decoded using this latest access unit and access units following in decoding order and, potentially, no access units earlier in decoding order. $T_{DEC}$ may be the earliest presentation time of any access unit of the media stream that can be correctly decoded using data in the bitstream starting at $I_{SAU}$ and, potentially, no data before $I_{SAU}$. $T_{EPT}$ may be the earliest presentation time of any access unit of the media stream starting at $I_{SAU}$ in the bitstream. $T_{PTF}$ may be the presentation time of the first access unit of the media stream in decoding order in the bitstream starting at ISAU.

Figure 9:
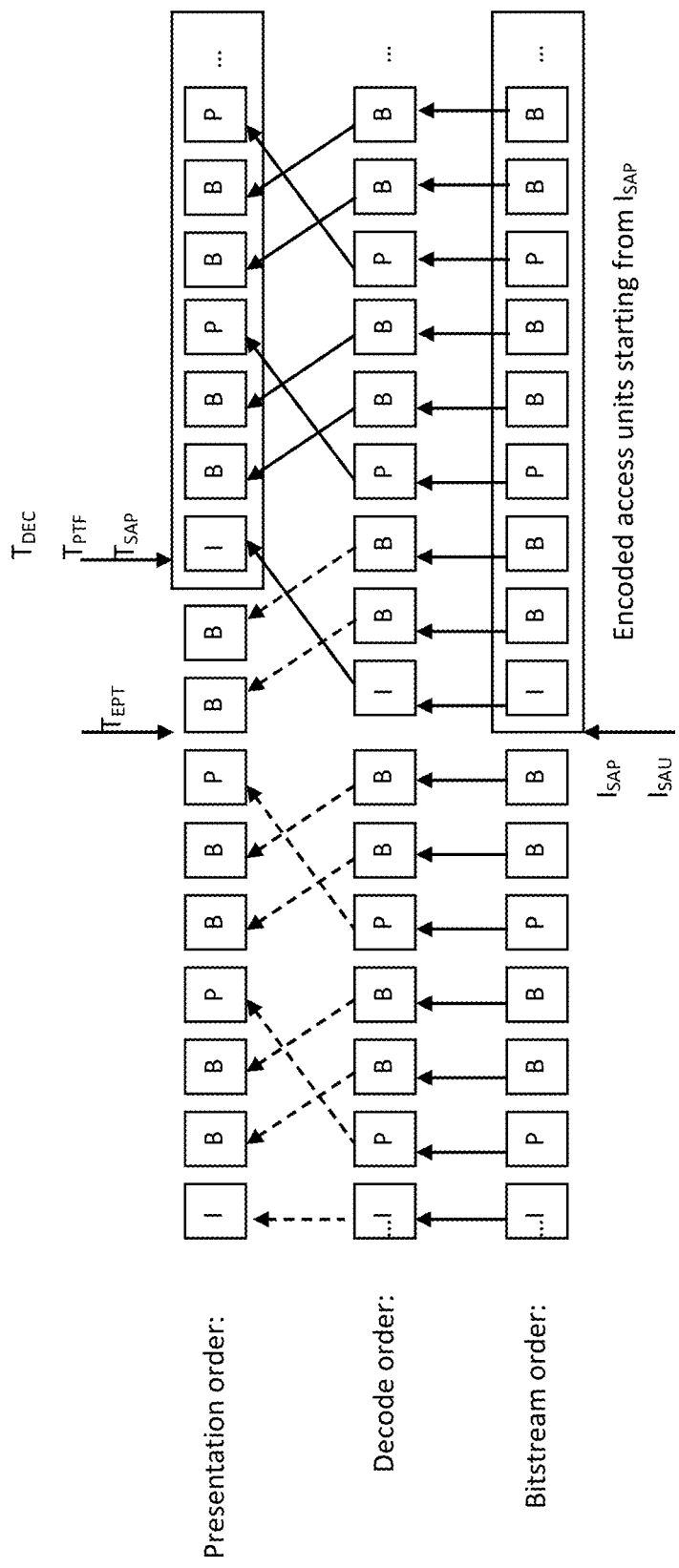
FIG. 9 illustrates a diagram of an example of parameters of a stream access point.

An example is shown of a stream access point with these parameters in FIG. 9. In this example, examples of encoded video stream with 3 different types of frames: I, P, and B are illustrated. P-frames may utilize prior I or P frames to be decoded, while B-frames may utilize both prior and following I and/or P frames. There may be differences in transmission, decoding and/or presentation orders.

FIG. 9 illustrates a diagram of parameters of a stream access point. Six SAP types may be provided. The use of the different SAP types may be limited to profiles (e.g., for some profiles, only a subset of the SAPs types may be utilized).

DASH SAP types may be dependent on which access units are correctly decodable and/or their arrangement in the presentation order. For example, for a Type 1, $T_{EPT}=T_{DEC}=T_{SAP}=T_{PFT}$. This SAP type may correspond to what may be referred to as a "Closed GoP random access point." Access units (e.g., in decoding order) starting from ISAP may be correctly decoded. The result may be a continuous time sequence of correctly decoded access units with no gaps. The first access unit in decoding order may be the first access unit in presentation order.

For example, for a Type 2, $T_{EPT}=T_{DEC}=T_{SAP}<T_{PFT}$. This SAP type may correspond to what may be referred to as a "Closed GoP random access point" for which the first access unit in decoding order in the media stream starting from $I_{SAU}$ may not be the first access unit in presentation order. The first two frames may be backward predicted P frames (e.g., which syntactically may be coded as forward-only B-frames in H.264 and some other codecs), and they may need the 3$^{rd}$ frame to be decoded first.

For example, for a Type 3, $T_{EPT}<T_{DEC}=T_{SAP}<=T_{PTF}$. This SAP type may correspond to what may be referred to as an "Open GoP random access point", in which there may be some access units in decoding order following $I_{SAU}$ that may not be correctly decoded and may have presentation times less than $T_{SAP}$.

For example, for a Type 4, $T_{EPT}<=T_{PFT}<T_{DEC}=T_{SAP}$. This SAP type may correspond to what may be referred to as a "Gradual Decoding Refresh (GDR) random access point" (e.g., or a "dirty" random access) in which there may be some access units in decoding order starting from and following $I_{SAU}$ that may not be correctly decoded and may have presentation times less than $T_{SAP}$.

The intra refreshing process may be an example of GDR. The intra refreshing process may be extended over N frames, and part of a frame may be coded with intra MBs. Non-overlapping parts may be intra coded across N frames. This process may be repeated until the entire frame is refreshed.

For example, for a Type 5, $T_{EPT}=T_{DEC}<T_{SAP}$. This SAP type may correspond to the case for which there may be at least one access unit in decoding order starting from $I_{SAP}$ that may not be correctly decoded and may have a presentation time greater than $T_{DEC}$, and where $T_{DEC}$ may be the earliest presentation time of any access unit starting from $I_{SAU}$.

For examples, for a Type 6, $T_{EPT}<T_{DEC}<T_{SAP}$. This SAP type may correspond to the case for which there may be at least one access unit in decoding order starting from $I_{SAP}$ that may not be correctly decoded and may have a presentation time greater than $T_{DEC}$, and where $T_{DEC}$ may not be the earliest presentation time of any access unit starting from $I_{SAU}$.

Profiles of DASH may be defined to enable interoperability and the signaling of the use of features. A profile may impose a set of specific restrictions. Those restrictions may be on features of the Media Presentation Description (MPD) document and/or on segment formats. The restriction may be on content delivered within segments, for example, such as but not limited to, on media content types, media format(s), codec(s), and/or protection formats, and/or on quantitative measures, such as but not limited to, bit rates, segment durations, segment sizes, horizontal visual presentation size, and/or vertical visual presentation size.

Figure 10:
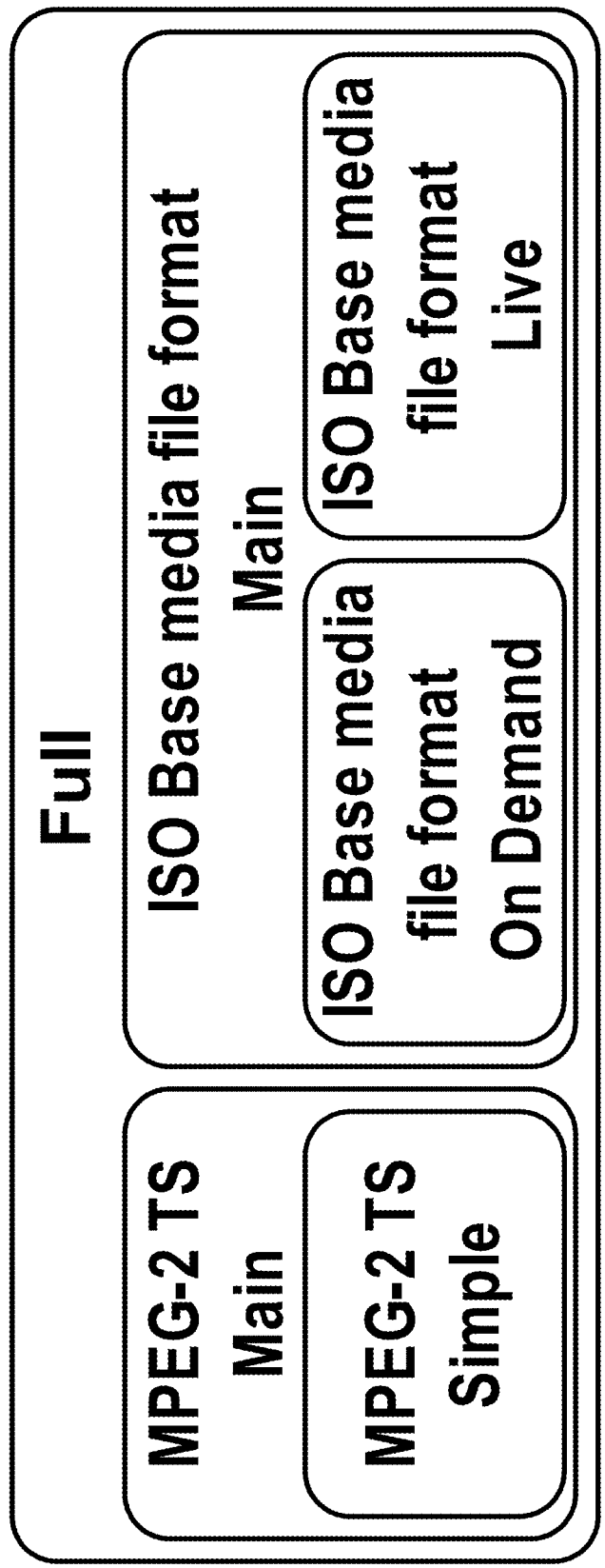
FIG. 10 illustrates a diagram of an example of profiles in DASH.

FIG. 10 illustrates a diagram of examples of six profiles in DASH. Profiles may be organized in two major categories based on the type of file container used for segments: Three profiles may use ISO Base media file containers, two profiles may use MPEG-2 transport stream (TS) based file containers, and one profile may support both file containers types. Either container type may be codec independent.

The ISO base media file format on demand profile may provide support for on demand content. This profile may specify that each representation may be provided as a single segment, that subsegments may be aligned across representations within an adaptation set, and/or the subsegments may begin with stream access points. This profile may be used to support large VoD libraries with minimum amount of content management. It may permit scalable and efficient use of HTTP servers and/or may simplify seamless switching.

The ISO Base media file format Live profile may be utilized for live encoding and low latency delivery of segments consisting of a single movie fragment of ISO file format with relatively short duration. Each movie fragment may be requested when available using a template generated URL. It may not be necessary to request a MPD update prior to each segment request. In this profile, segments may be constrained so that they may be concatenated on segment boundaries. Segments may be decrypted without gaps and/or overlaps in the media data, regardless of adaptive switching of representations in an adaptation set. This profile may be used to distribute non-live content. For example, in case a live media presentation may be terminated, but kept available as an on-demand service.

The ISO base media file format main profile may be a superset of the ISO Base media file format On Demand and Live profiles.

The MPEG-2 TS main profile may impose constraints on the Media Segment format for MPEG-2 Transport Stream (TS) content. For example, representations may be multiplexed, for example, so that no binding of media streams (e.g., audio and video) at the client may be required. Segments may include an integer number of MPEG-2 TS packets. Indexing and segment alignment may be recommended.

The MPEG-2 TS simple profile may be a subset of the MPEG-2 TS main profile. It may impose restrictions on content encoding and multiplexing, for example, in order to allow simple implementation of seamless switching. For example, seamless switching may be achieved by guaranteeing that a media engine conforming to ISO/IEC 13818-1 (e.g., MPEG-2 systems) may play any bitstream generated by concatenation of consecutive segments from any representation within the same adaptation set.

The full profile may be a superset of the ISO Base media file format main profile and MPEG-2 TS main profile.

A destination of visual information rendered on a mobile device's screen may be the user who is holding it. However, a user's viewing setup may vary. For example, a user may hold a mobile device close to his eyes or at arm's length. This may affect the viewing angle and/or the user's ability to see details on the screen. Other external factors, such as but not limited to illumination may change and alter the user's viewing experience. For example, the user may be in an office, outside under direct sunlight, in a shadow, or in a completely dark area. The user may be paying full attention to content on device's screen, or s/he may be busy with something else and only occasionally look at the screen of the mobile device. A device (e.g., a mobile device) may refer to, for example, a wireless transmit/receive unit, a streaming video player, a video chat application, a video application, or a video game application.

Examples of the variability of viewing conditions of mobile devices may be described. Such conditions may be indicative of the extent to which a user is able to receive visual information. They may be utilized to define the capacity of the "visual channel," which may serve as the last link in a communication system delivering visual information to the user.

The delivery of visual information to mobile devices may adapt to user behavior and/or viewing conditions in a way that delivers the best possible user experience and/or conserves resources of the wireless network (e.g., bandwidth, capacity, etc.) and/or mobile devices (e.g., power). Applications may be provided for mobile video streaming and mobile video telephony. Characteristics of the visual link and factors that affect it may be utilized, for example parameters of viewing setup, types of illumination, limitations of mobile screens, limitations of human visual system, etc.

There may be applications that may be improved by viewing conditions-adaptive encoding and delivery of visual content. For example, these may include, but are not limited to mobile video streaming, mobile TV, mobile video telephony, video games, and augmented reality. Classes of such applications described herein, include but are not limited to, mobile video streaming and video telephony. Mobile video streaming, or mobile multimedia streaming, may be a technique for incremental delivery of multimedia content, which may allow real-time playback and VCR-type navigation without waiting for entire media file to be delivered.

Figure 11:
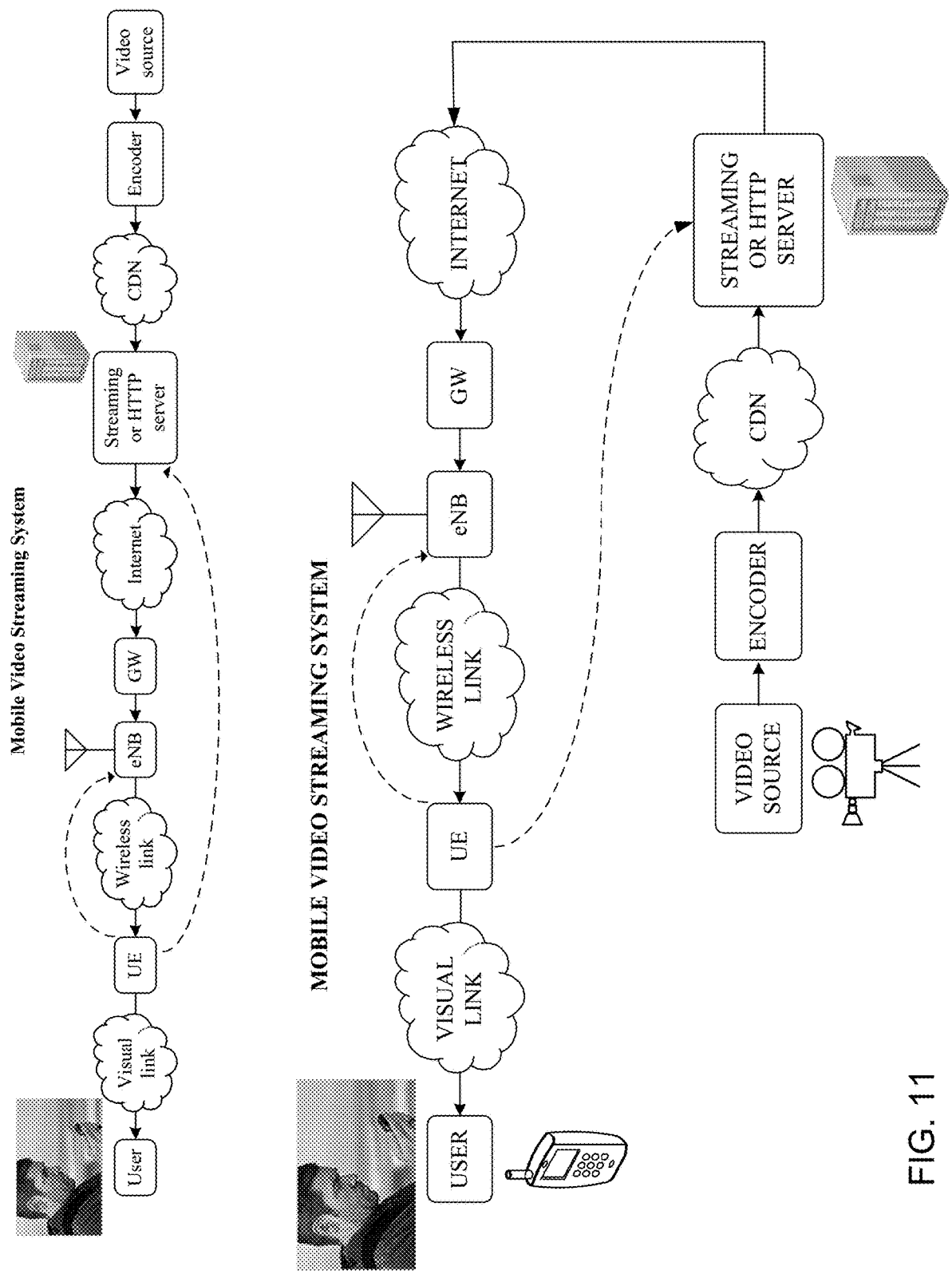
FIG. 11 depicts an example architecture of mobile video streaming system.

FIG. 11 illustrates examples of components and communication links involved in the delivery of streaming media content to mobile devices. The content may be acquired and encoded for streaming distribution. For example, this may be done by dedicated encoding software, such as but not limited to Real Producer®, Windows Media Encoder®, and Adobe Media Encoder®. Then the content may be placed on a server, which, depending on the streaming technology, may be a dedicated streaming server, a standard HTTP server, etc. The content may also be placed on multiple servers forming a so-called Content Distribution Network (CDN), for example to scale distribution capabilities. The consumer of the streaming media content may be a user, who may be using software such as a streaming media player or a web-browser on a mobile device. The media player may initiate and maintain a connection with the server. In turn, the server may send segments of encoded media to the player, which may then render it on the screen.

Several communication links may be involved in the delivery of streaming media content. These include, but are not limited to, (e.g., cf. FIG. 11) an Internet connection and routing path between a steaming server and a wireless network gateway (GW); a wireless link between a user device (e.g., a UE) and a base station (e.g., an eNB); and the "visual link" between user's eyes and display of the mobile device.

Figure 12:
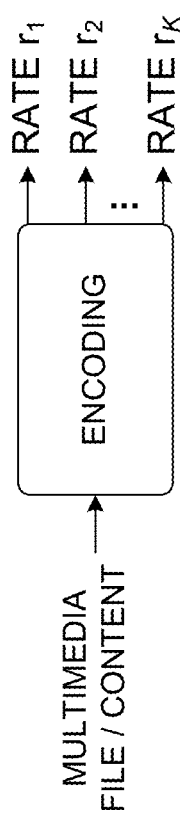
FIG. 12 depicts an example of multimedia content encoded at different bit rates.
Figure 13:
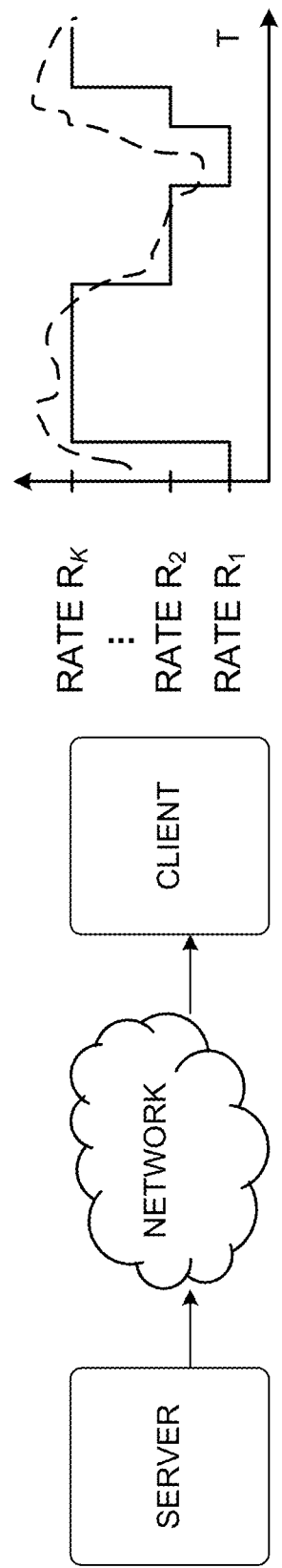
FIG. 13 depicts an example of bandwidth adaptive multimedia streaming.

Bandwidth adaption may be utilized. In bandwidth adaptive streaming, multimedia content may be encoded at several different bit rates, an example of which is shown in FIG. 12. FIG. 13 depicts an example of bandwidth adaptive multimedia streaming. Video content at different rates may also be encoded at different spatial resolutions. Multimedia content may be prepared such that transitions between streams at different rates are possible at certain time-intervals (e.g., 2-5 seconds). If different spatial resolutions are used by different streams, the media player may scale the video to fill the same region on the screen, such that changes in resolution may not be noticeable.

After encoding, content may be made available to the streaming server and may be delivered to the client upon request. At the beginning, the server may stream the content at a default initial bit rate. The bit rate may change during the streaming session based on, for example, the bandwidth available in the network. The rate may change directly at the request of the client, or the server may make the decision based on feedback from the client.

Delivery mechanisms that may be employed for delivery of multimedia content include, but are not limited to, HTTP streaming and RTP/RTSP streaming. In HTTP streaming, segmented content (e.g., content partitioned into segments of a few seconds in length) may be delivered over HTTP. Segments may be guaranteed to be delivered at the cost of possible delays due to retransmission. In RTP/RTSP streaming, the content may be packetized and delivered over UDP. This may avoid retransmission delays at the cost of possible lost packets. Examples of HTTP streaming systems are MPEG/3GPP DASH® and Apple®'s HLS®. Real Networks®' Helix® server may be capable of supporting a variety of HTTP and RTP/RTSP streaming protocols.

Bandwidth adaptation for mobile streaming may be utilized. When streaming video is delivered over wireless, bandwidth fluctuations may be expected to be caused by load and other characteristics of the wireless link (e.g., connecting user device to the base station (for example, cf. FIG. 11)). Bandwidth adaptation logic may be implemented on the base station (e.g., eNode-B) and/or another server (e.g., proxy) that may be located close to the wireless link. This may result in faster response and granularity of adaptation that may be achieved. Such a server may implement adaptation, for example, by receiving a compound set of encoded streams, scalable encoding, and/or by implementing dynamic transcoding of information to be sent over the link.

Mobile video telephony may include technologies for reception and delivery of audio-video signals originated by users at different locations. The purpose may be to enable real-time communication between them.

Figure 14:
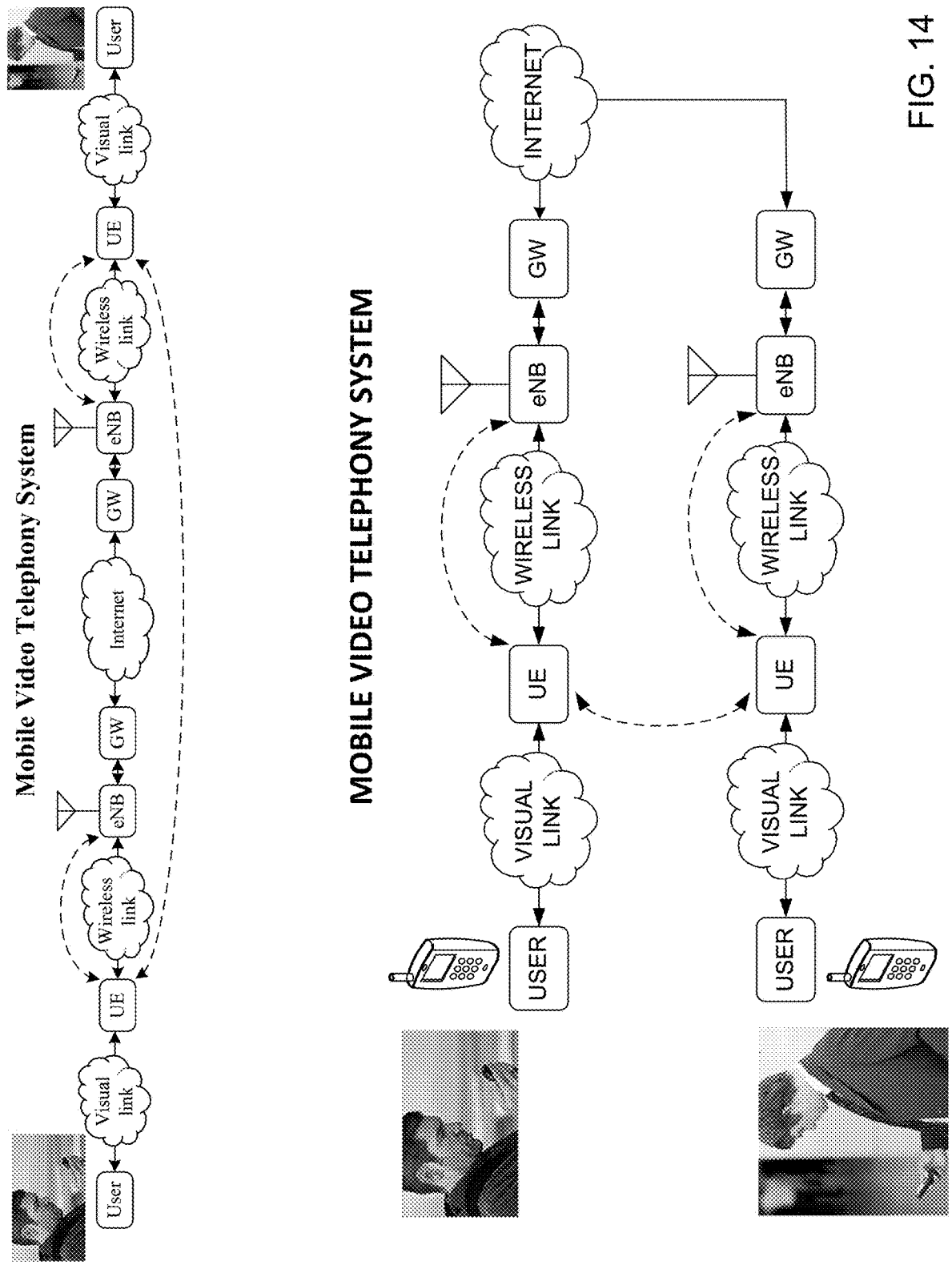
FIG. 14 illustrates an example architecture of a mobile video telephony system.

Implementations described herein may be applicable, for example, to consumer-level video communication/messaging applications, mobile video conferencing applications, mobile video telephony applications, etc. An example of the architecture of such a system is shown in FIG. 14. A mobile device may capture audio and video information, encode it, and/or transmit it to the other device through a combination of wireless and/or wired links. Once this information is received (e.g., via a mobile device), it may be decoded and presented to the user. Video and audio data may be sent as RTP/UDP packets, for example, due to the real-time nature of such systems. RTP/UDP packets may be lost during transmission. In order to control quality, mobile devices (e.g., video phones) may employ feedback protocols, such as, but not limited to RTCP. Calls may be placed using standard session initiation protocols, such as, but not limited to SIP or ITU-T H.323/H.225.

Several communication links may be involved in the transmission of information in mobile video telephony applications. For example, the communication links may include, but are not limited to (e.g., cf. FIG. 14), Internet connection/routing path between wireless network gateways (GW), wireless links between user devices (e.g., UE) and base stations (e.g., eNB), "visual links" between users and displays and cameras of their mobile devices, etc.

Characteristics, behavior, and/or limitations of Internet and wireless links may be understood, and a video phone system may employ several mechanisms to adapt to them. Such mechanisms may include, for example, bandwidth-adaptive video encoding, the use of feedback, error-resiliency, and error concealment techniques. Implementations described herein may utilize characteristics and limiting factors of "visual links", such as, but not limited to varying viewing distance, illumination, and user attention to the screen, for example to improve video transmission and/or communication.

Figure 15:
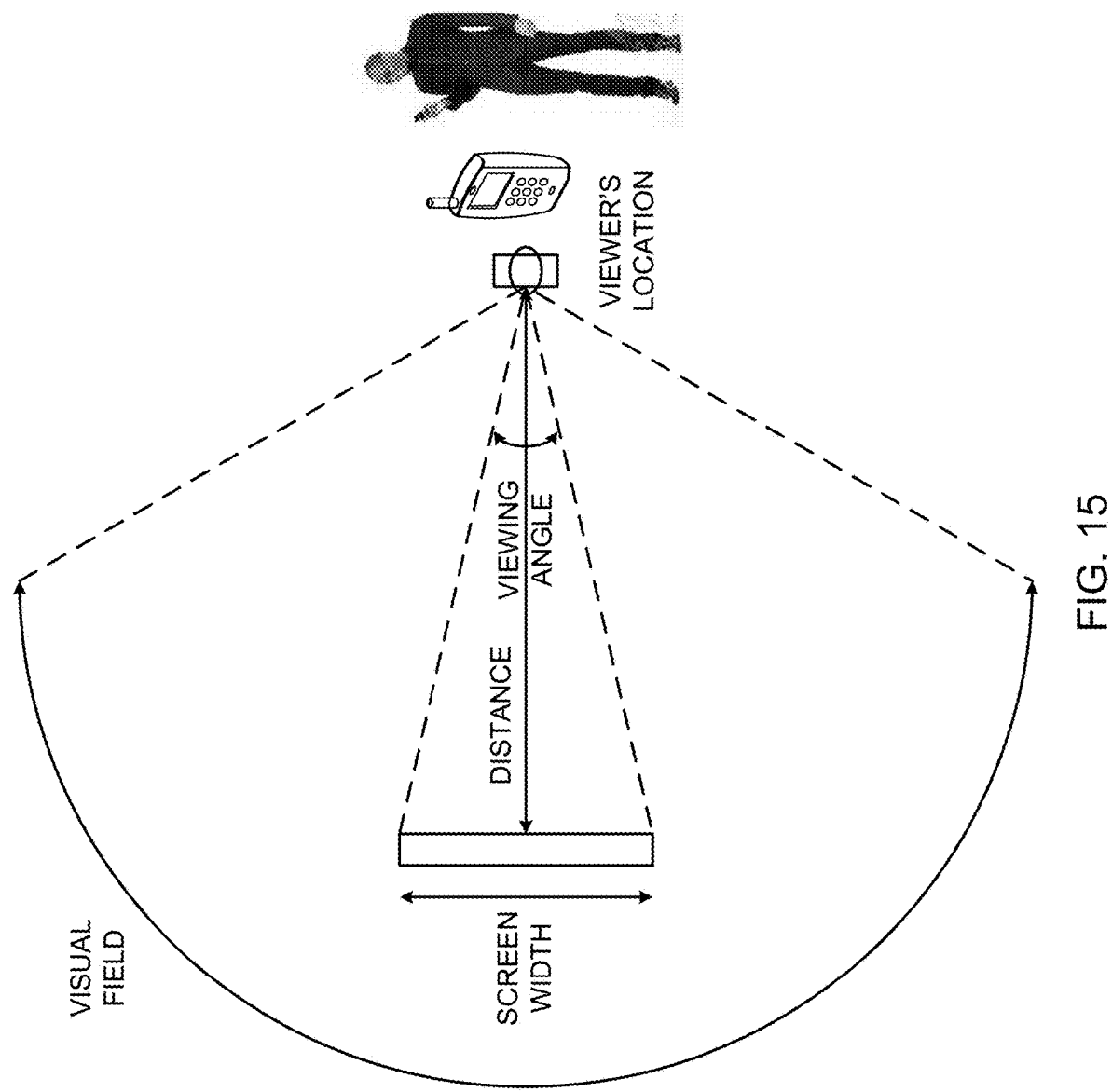
FIG. 15 illustrates an example of parameters of mobile viewing setup.

Characteristics of the "Visual Link," which may be the link formed by a display and the user, may be explained herein. Examples of parameters of mobile viewing setup are shown in FIG. 15. For example, a horizontal slice is shown, and it may be assumed that the visual field may be formed by binocular vision, for example, about 120° horizontally. Visual parameters may include, but are not limited to, screen size, distance to the screen, screen resolution, screen density (e.g., in pixels per inch), or viewing angle. Some visual parameters may be interrelated. For example, viewing angle (e.g., as shown in FIG. 15) may be computed as:

$$\text{viewing angle} = 2 \arctan\left(\frac{\text{screen width}}{2 \cdot \text{distance}}\right).$$

Viewing angle may constrain the amount of "useful" visual information that a user can acquire. In stationary viewing settings, such as the ones used in movie theatres or living rooms, viewing angle may be large, for example about 30° and more. Standards (e.g., SMPTE EG-18-1994) may declare 30° as a minimum acceptable viewing angle for movie reproductions. In mobile settings, viewing angle may be much smaller, due to, for example, the small sizes of mobile screens. In order to see more, the viewer may move the phone closer to his eyes. However, there may be several natural limits and reasons why people use different viewing distances, and why in many cases such distances may not be short enough to compensate for small dimensions of mobile screens.

The range of viewing distances may vary from individual to individual. The ability to see objects at different distances may be due to a mechanism called accommodation of the human eye. It may be a process by which the curvature of the crystalline lens in the human eye may change such that the light coming from a distant source comes in focus on the retina. Such changes in curvature may be produced by cilliary muscles. When cilliary muscles are relaxed, the eye may be focused on infinity. By applying tension the curvature of lens increases allowing lights from closer objects to come to focus on retina. But the crystalline lens may not be "squeezed" infinitely. The shortest distance for which lens may focus light on the retina is called the least distance of distinct vision (LDDV). For most adults with normal vision, LDDV may be about 25 cm (10"). This number may be smaller for young people, but it may increases with age (e.g., as cilliary muscles become less effective).

Figure 16:
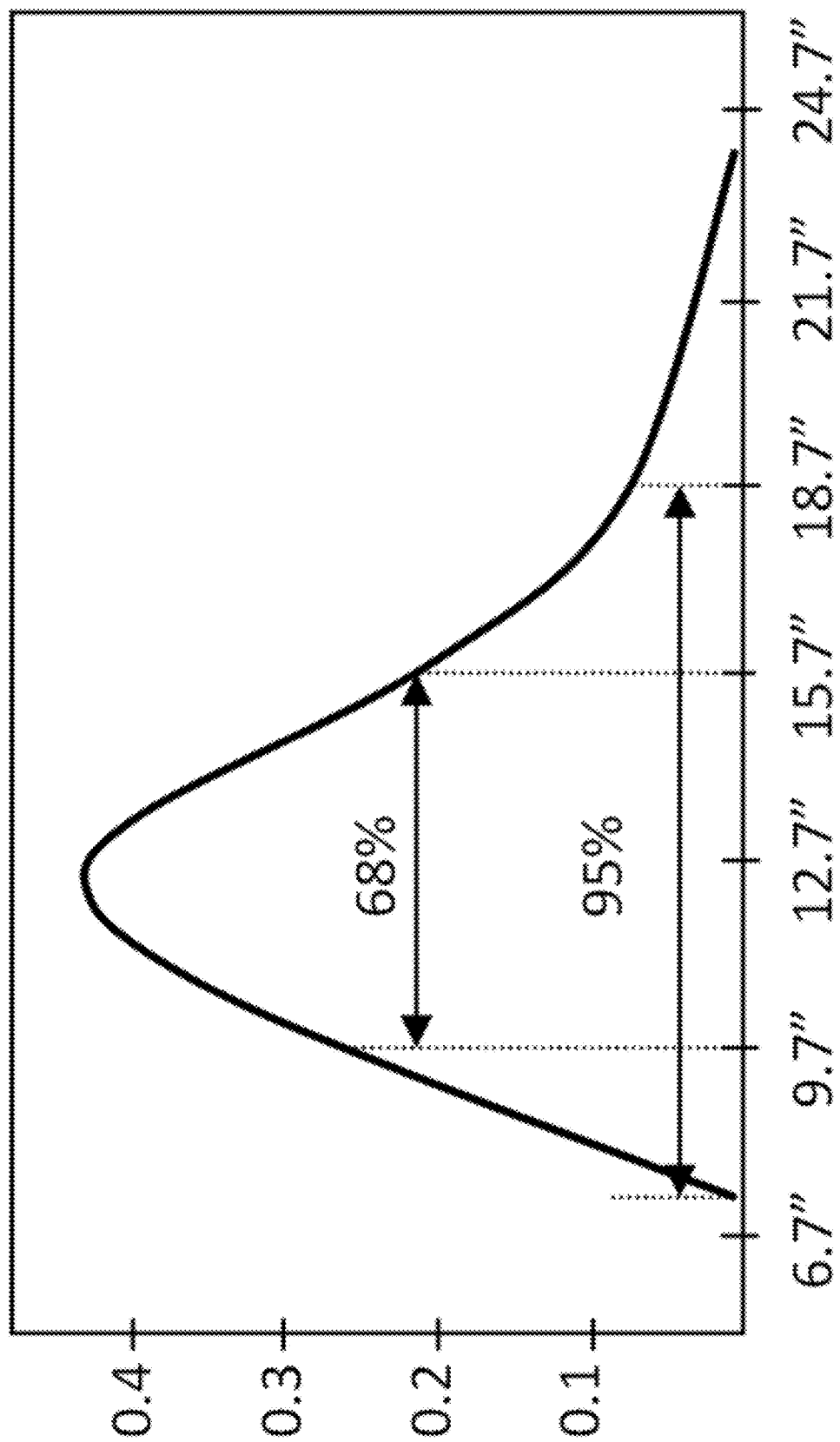
FIG. 16 illustrates a graph of an example of shape of distribution of viewing distances.

LDDV may set the lower limit for viewing distance of a mobile device. The other natural limit may be user's arm length. This number may be related to user's height (e.g., approximately 26" for a 5'9" tall person). There may be other factors, including but not limited to size/type of a mobile device, environment, and/or personal sense of comfort that may cause different people to hold or place such devices at different viewing distances. Within some bounds, users may also seek to attain the best perceived quality by holding screens closer or father. The range of their viewing distances may be from approximately 7.5" to 23.6". The mean viewing distance may be approximately 12.7" and the standard deviation may be approximately 3". This may imply a fairly spread distribution. The range of ±1σ may corresponds to a range of distances from 9.7" to 15.7". The range ±2σ may imply a range of distances from 6.7" to 18.7". FIG. 16 illustrates an example of an approximate shape of this distribution.

Spatial density limitations may be described and utilized. The amount of visual information may be limited by spatial density. Limits may include, for example, spatial density of screen on a mobile device and/or spatial sensitivity limits of human vision.

Spatial density or resolution of displays may be reported in absolute metrics, such as, but not limited to pixels per inch (ppi). Angular characteristics, such as but not limited to the number of pixels corresponding to 1° of viewing angle may be used herein. When viewing distance is known, the number of pixels corresponding to 1° of viewing angle may be computed as:

$$\text{pixels in } 1° = \text{display density } [ppi] \cdot \text{distance}[in] \cdot 2\tan\left(\frac{\pi}{360}\right).$$

The human visual system (HVS) may place its own limits on spatial resolution. The visual acuity limit may state that people with normal (e.g., so-called "20/20") vision may recognize spatial details as small as $\frac{1}{60}^{th}$ of a degree of viewing angle. This may mean that, in order to match or surpass human visual acuity limit, screen density and viewer's distance to the screen may be such that the resulting angular density is at least 60 pixels in a degree of viewing angle. Surpassing this limit by any significant degree may provide diminishing returns, since users with normal vision won't be able to appreciate it.

Examples of viewing settings may be described herein. Table 1 provides examples of parameters of several possible viewing settings. Table 1 may consider several classes of modern mobile devices, such as but not limited to laptops, tablets, and smartphones, as well as variety of possible viewing distances. Cases marked with underlining may be those where the viewing angle may be greater or equal to 30°, which may be considered broad enough for watching TVs or movies in conventional settings. Cases marked with double underlining may be where the angular density of reproduction setup may exceed visual acuity limit.

TABLE 1

Examples of viewing settings.

| Device | Screen Size | Resolution (pixels) | Density (ppi) | Viewing distance | Viewing angle Horizontal | Vertical | Angular density (pixels in 1°) |
|---|---|---|---|---|---|---|---|
| Netbook Sony ® Z-series | 13.3" | 1920 × 1080 | 165.63 | 16" | 39.8° | 23° | 46.3 |
|  |  |  |  | 24" | 27.1° | 15.5° | 69.3 |
| Tablet Apple ® iPad ® 3 | 9.7" | 2048 × 1536 | 263.92 | 12" | 35.8° | 27.3° | 55.3 |
|  |  |  |  | 16" | 27.3° | 20.6° | 73.7 |
|  |  |  |  | 24" | 18.4° | 13.8° | 110.5 |
| Large-screen Smartphone HTC ® Rezound ® | 4.3" | 1280 × 720 | 341.54 | 8" | 26.4° | 15° | 47.7 |
|  |  |  |  | 12" | 17.8° | 10° | 71.5 |
|  |  |  |  | 16" | 13.4° | 7.5° | 95.4 |
|  |  |  |  | 24" | 8.9° | 5° | 143.1 |
| Smartphone iPhone 4 | 3.5" | 960 × 640 | 329.65 | 8" | 20.6° | 13.8° | 46.0 |
|  |  |  |  | 12" | 13.8° | 9.2" | 69.0 |
|  |  |  |  | 16" | 10.4° | 6.9° | 92.1 |
|  |  |  |  | 24" | 6.9° | 4.6° | 138.1 |

Some mobile devices (e.g., smartphones) may have viewing angles that fluctuate in a very wide range, for example from sub-5° to mid-20°. Yet, even with very short viewing distances they may not reach the 30° desired for some reproduction setups. Larger devices (e.g., laptops or tablets) may accommodate viewing angles of 30° and higher. Angular densities achievable by mobile screens may match or exceed acuity limit of human vision. Mobile display technologies may be capable of reproducing visual content with density that viewers may be no longer able to receive and appreciate. For example, the higher the viewing distance the higher the angular density, and the higher the imbalance in capabilities of transmitter (e.g., the display) and receiver (e.g., the human eye) in the visual link. With future display technologies, this imbalance may increase. Under such conditions, encoding and delivery of natural visual content at highest spatial resolution supported by the screen may be increasingly wasteful.

Effects of illumination may be described and utilized. In addition to changing viewing distances and angles, mobile viewing experience may be affected by a variety of luminous environments. These environments may vary by viewing location (e.g., indoor or outdoor), time of day, season, geo-location, and/or many other factors.

The light emitted by the mobile screen may become "mixed" with light reflected from various peripheral sources. As a result, colors of images projected to the screen may become "washed away." This may be quantified in terms of, for example, reduction of contrast, reduction of gamut, and shift of color balance. For example, contrast ratio may be calculated by dividing the total display luminance in the white and black states, respectively. The total luminance from a display under peripheral illumination may be computed as:

$$L_{total} = L_{display} + L_{spec}R_{spec} + \frac{1}{\pi}L_{diff}R_{diff};$$

$L_{display}$ may be the luminance emitted by the display, $L_{spec}$ and $L_{diff}$ may be illuminance from direct and diffused light sources, and $R_{spec}$ and $R_{diff}$ may be specular and diffuse reflectance characteristics of the mobile screen. Contrast may fall off quickly even for moderate illuminance.

One of the consequences of the reduced contrast of the screen may be the reduced range of spatial frequencies that a human observer may be able to see. This may be explained by considering so-called contrast sensitivity function (CSF) of human vision. An example plot of this function is shown in FIG. 17.

Figure 17:
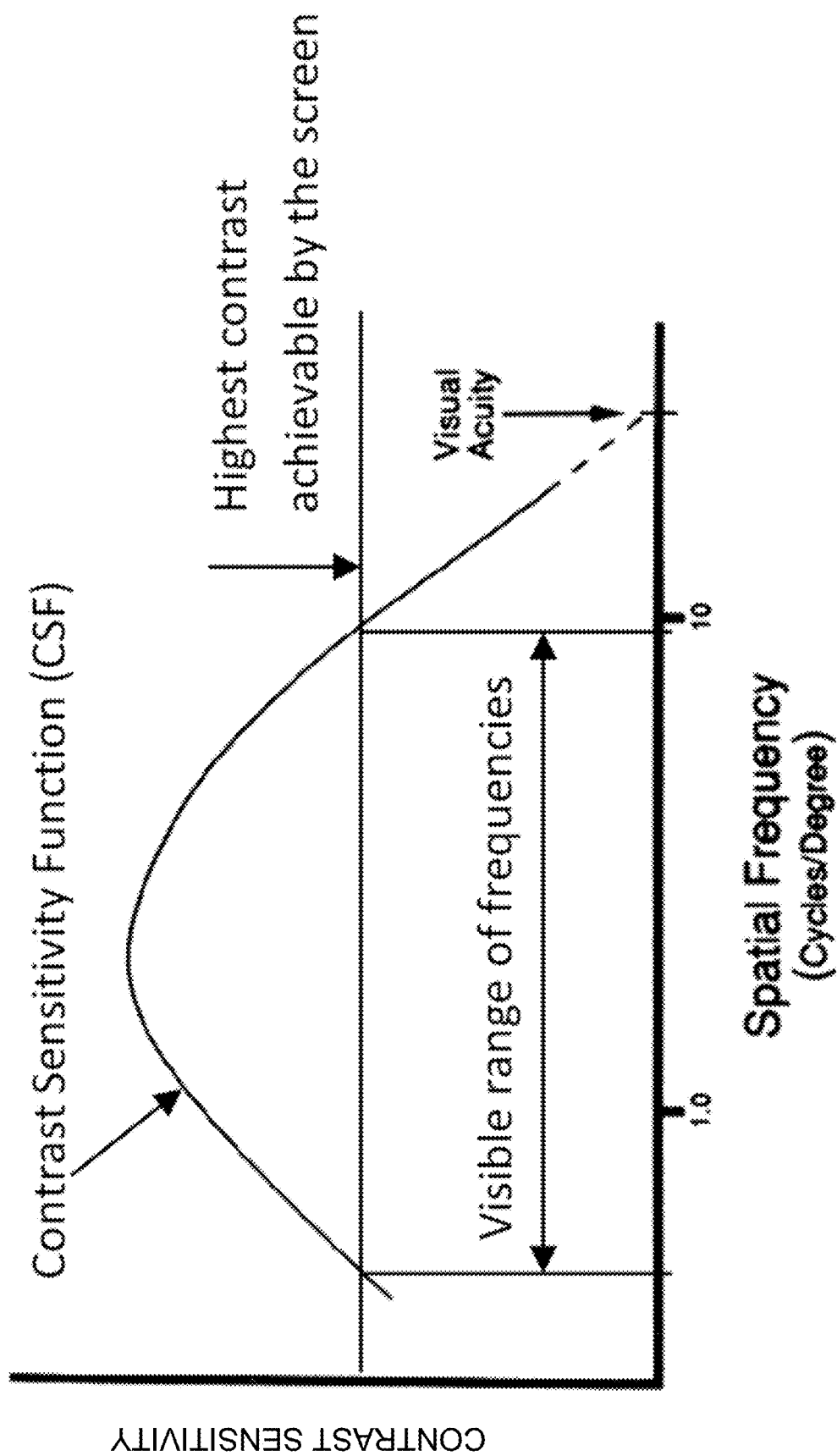
FIG. 17 illustrates an example of the relationship between screen's contrast and visible range of spatial frequencies that it can reproduce.

When contrast is very high, the range of visible frequencies may be limited by the acuity bound, for example, as shown on the far right of FIG. 17. If contrast ratio is small, it may define the lower boundary which touches CSF in one or two points. The right point may define maximum visible spatial frequency. The left point may define the minimum visible spatial frequency. By lowering the contrast further, the range of visible frequencies may be reduced to one, for example corresponding to the peak of CSF curve. That peak may be between 3-6 cycles per degree of visual angle. That may be about 5-10 times away from acuity limit.

The illuminance may have an additional effect on vision, for example, through the narrowing of the pupil. At high illuminance the pupil may narrow, which may reduce distortion caused by imperfections of the cornea (e.g., the "lens"). This may counter the effect described above (e.g., to an extent).

Screen tilt may be described and utilized. Tilt of a mobile screen may refer to the angle between normal to the surface and a user's direction of view (e.g., the viewing axis). For example, as shown in FIG. 15, the tilt may be 0°. Tilt may vary. The tilt angle may affect, for example, brightness, contrast, colors, etc. For example, a 30° degree tilt of an iPhone 4® may cause 57% decrease in brightness and over a factor of 2 drop in contrast ratio.

Point of interest may be described and utilized. When a user is looking at the screen, his eyes may be focused on a certain region on the screen. A human's acuity may be maximal at such a focus point (e.g., projecting image in fovea), and it may decay in any direction away from it. For example, about 50% of visual information may be captured within just 2° from a fixation point.

Effects on the perceived depth in 3D content may be described and utilized. Information about a viewer's distance may be utilized when the reproduction of 3D videos is utilized. For example, the perceived 3D depth of 3D video preproduction may be affected. For example, the perceived depth may be expressed by:

$$D = f\alpha\frac{b}{d}$$

where D may be the perceived depth, f may be the distance to the screen, a may be the pixel density, b may be the baseline distance between the two eyes (e.g., the user's IPD), and d may be the disparity of an object on the screen (e.g., in pixels).

A viewer's distance to the screen may be used to adjust the disparity and/or to retrieve and show another view to compensate for the depth distortion. Viewer distance-based adaptation for 3D viewing may be understood by considering differences between vergence and focal distances of human vision, and the related concept of "zone of comfort."

Figure 18:
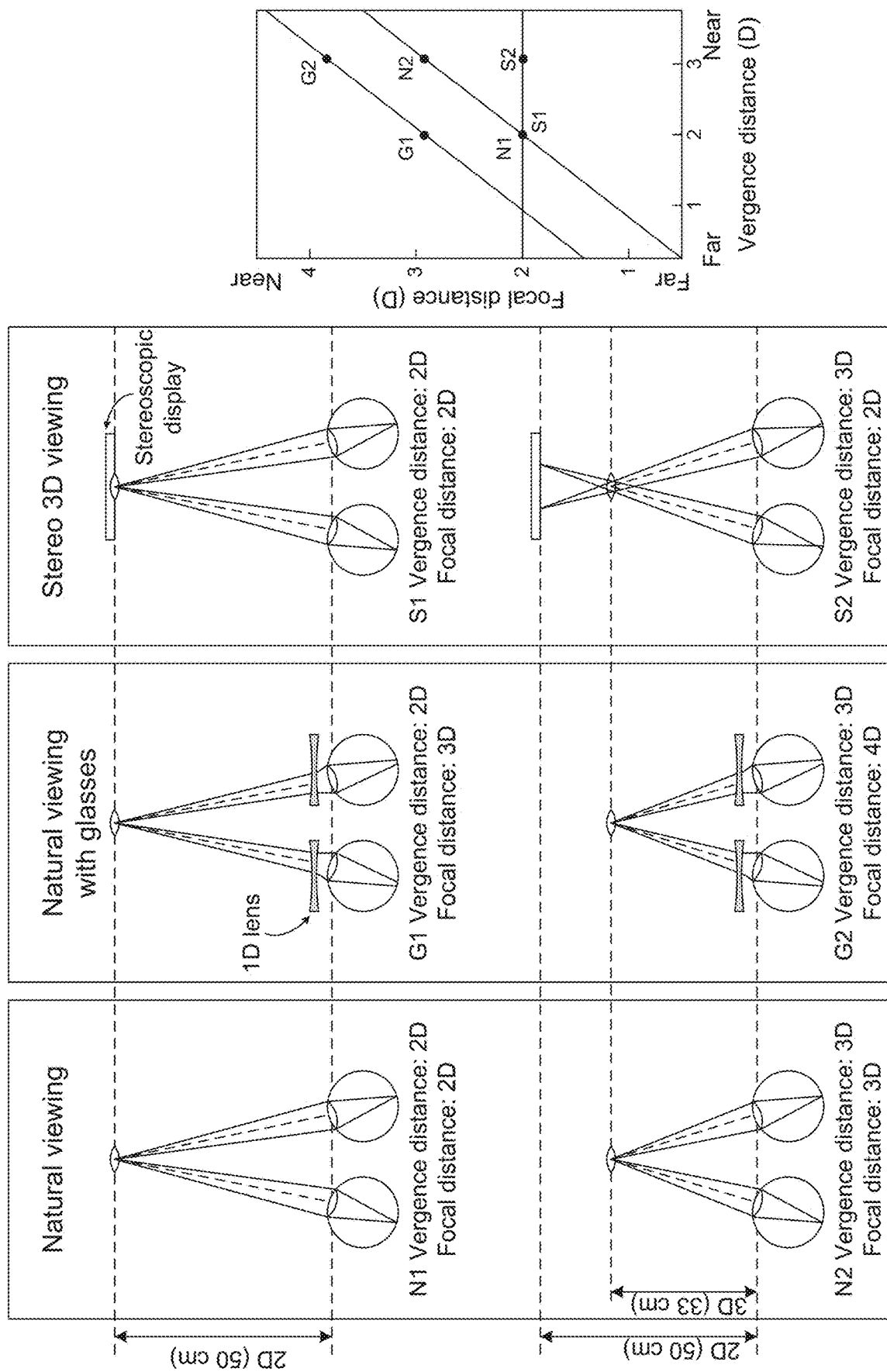
FIG. 18 illustrates an example of vergence and focal distance in various viewing situations.

FIG. 18 illustrates an example of vergence and focal distance in various viewing situations. The three columns on the left illustrate examples of natural viewing (N), natural viewing with optical correction (e.g., glasses) (G), and stereo 3D viewing (S). In natural viewing, the vergence stimulus and focal stimulus may be at the same distance and, therefore, may be consistent with one another. In natural viewing with an optical correction for refractive error (e.g., spectacles or contact lenses), the focal distance may be different from the vergence distance because of the constant decrement or increment in focal power due to the correction. Stereo viewing may create inconsistencies between vergence and focal distances, for example, because the vergence distance may vary depending on the image contents while the focal distance may remain constant.

The right side of FIG. 18 illustrates an example plot of the focal distance in diopters as a function of vergence distance in diopters for the six viewing conditions exemplified on the left side. The green line illustrates an example of natural viewing, the blue line illustrates an example of natural viewing with an optical correction, and the red line illustrates an example of viewing a stereo display. Near and far distances are indicated on the axes.

Figure 19:
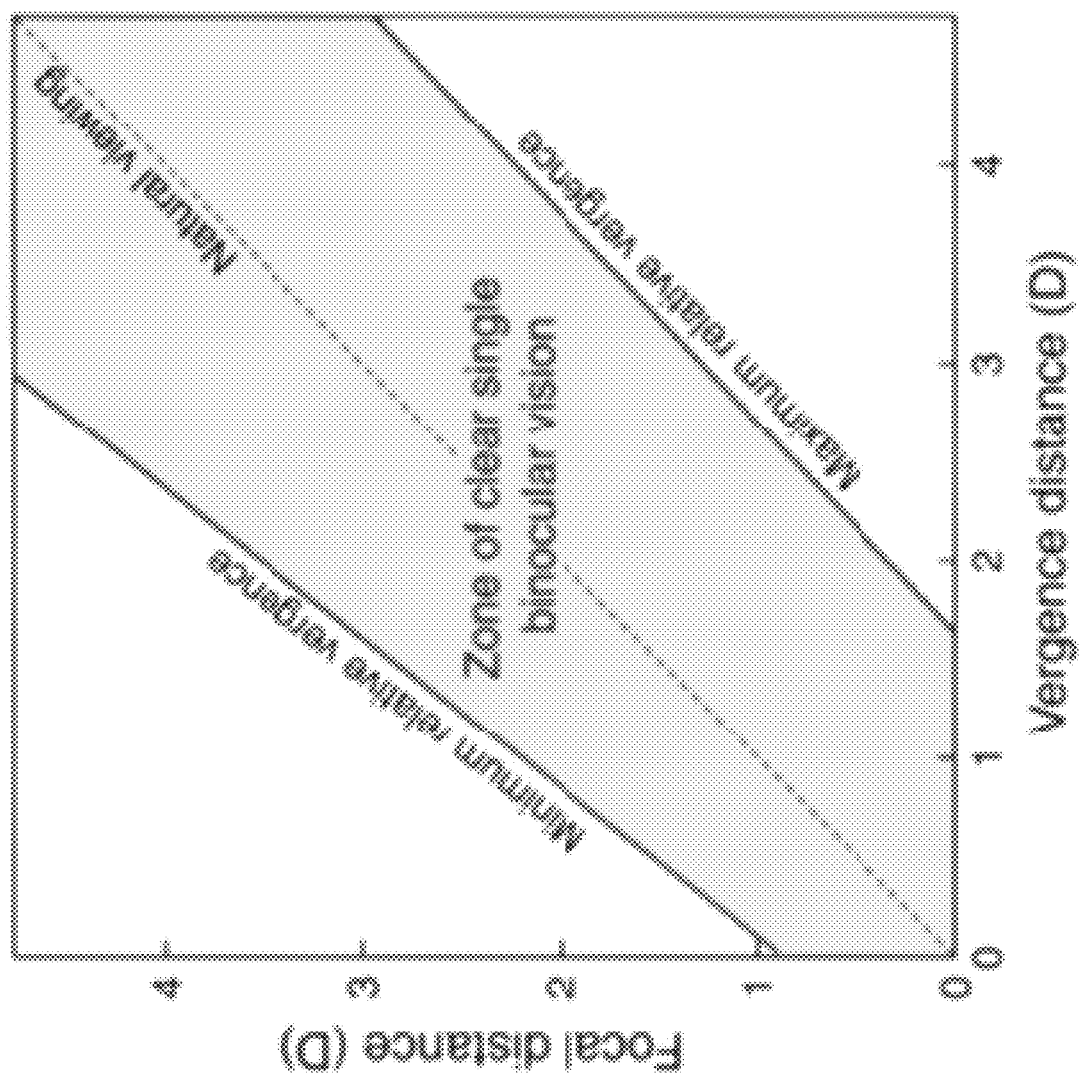
FIG. 19 illustrates an example of a zone of clear single binocular vision (ZCSBV).

FIG. 19 illustrates an example of a zone of clear single binocular vision (ZCSBV). Focal and vergence distances may be plotted in diopters on the ordinate and abscissa, respectively. The dashed diagonal line may represent an example of the vergence and focal stimuli associated with natural viewing. The line labeled "Minimum relative vergence" may represent the smallest vergence distance for which the viewer may maintain a single, well-focused image of the stimulus target at each focal distance. The line labeled "Maximum relative vergence" may represent the largest vergence distance for which the viewer can maintain single, well-focused vision.

Figure 20:
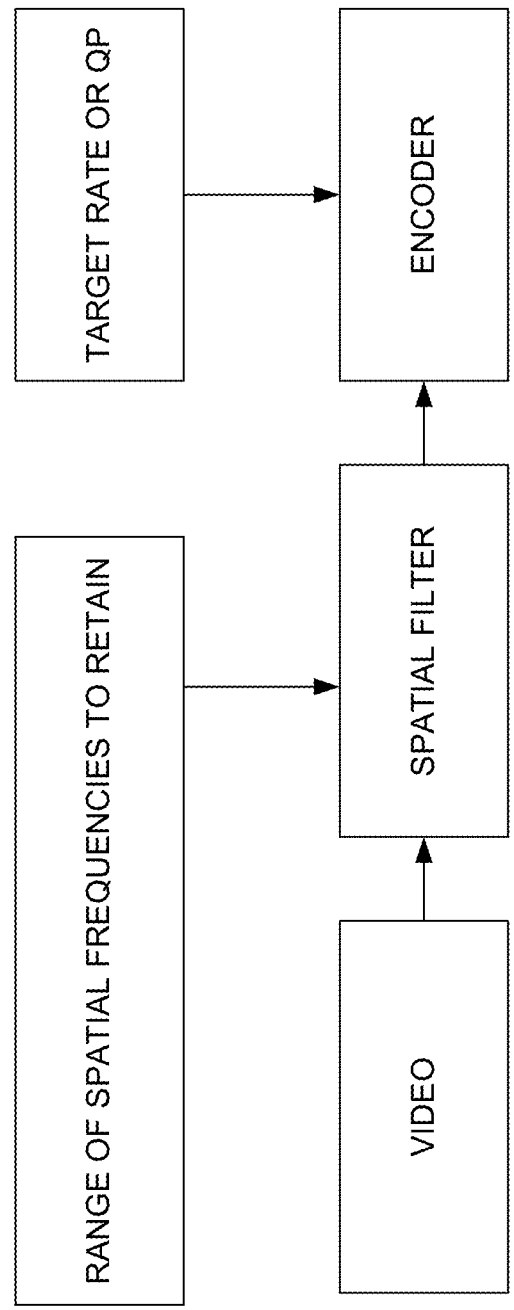
FIG. 20 illustrates an example of an adaptation to visible range of spatial frequencies by means of pre-filtering.

Implementations that may provide for an adaptation to viewing conditions may be described and utilized. There may be variability in the ways users may hold their mobile devices, which may affect the amount of visual information that they can acquire. For example, as exemplified in Table 1, different viewing distances and orientations of mobile phone screens may cause viewing angles to change, for example, from approximately 5° to 25°. This, assuming high density of mobile screens, may imply a factor of 5 variability of bandwidth of the visual link. Ambient illuminance may cause contrast ratios to drop by orders of magnitude. A drop of contrast may reduce visible spatial bandwidth significantly (e.g., as shown in FIG. 20). An additional factor of 2 drop of brightness and contrast may be caused by tilt of the phone's screen.

A user may be paying full attention to the screen or he/she may be looking somewhere else. If the user is paying full attention to the screen, the user may benefit from the best possible video quality delivered. If the user is not paying full attention to the screen, then quality may drop without any inconvenience to the user. The user may be focusing his or her attention only on a part of the screen. Details present at a spatial separation may not be observed (e.g., more than, for example, 2-3 degrees from that region of interest).

Implementations described herein may provide improvements in system design that utilizes one or more viewing/visual parameters (e.g., those described herein). The viewing/visual parameters may be used for reducing the load on, for example, networks, power usage, and delivering the best appreciable quality of visual information to the user. Implementations utilizing viewing/visual parameters may be referred to herein as viewing condition adaptation.

The implementations described herein may be deployed at different points in the delivery of content to a user. The effectiveness of the visual parameter(s) utilized may depend on the user's device, vision, and/or other characteristics. For example, users that are using low-density screens and/or have better than 20/20 vision may not be able to benefit from implementations utilizing view-distance adaptation, however, other techniques may be useful.

Video processing-chain tools may be provided. Viewing condition adaptation may be a part of a system that delivers and/or projects visual information on a mobile screen, for example, mobile video streaming, video telephony applications, etc. Such systems may have means for trading off video bitrate and quality. Such means may include, but are not limited to the capability to produce multiple rate or scalable video encoding/decoding (e.g., for streaming video), capability to dynamically change parameters of a codec/video encoding/decoding chain (e.g., in a video telephony application), etc.

A change in spatial resolution of an encoded video may be one way to achieve different bitrates (e.g., spatial bandwidth). This may be accomplished, for example, either within the codec (e.g., if the codec supports dynamic changes of resolution) or by means of pre- and/or post-processing logic.

A pre-processor may lower (e.g., dynamically lower) resolution of the video. A post-processor may be configured to up-sample the video. Low-pass filtering may be applied in the pre-processor. The rest of the processing chain may be kept intact. An example is depicted in FIG. 20. Such a filter may be a band-pass, for example, if operating in a low-contrast regime. A band-pass filter may remove invisible low-frequencies. The lower the bandwidth of the signal, then the lower the codec may produce. This may be enforced by passing a new target rate or quantization step size (QP) parameter to the encoder.

Means for trading bitrate and quality of video in adaptation system may include, but are not limited to, reducing the frame rate, switching to "slide-show" mode, etc. These means may be invoked by adaptation logic, for example, in cases when quality may be reduced without causing inconveniences to the user (e.g., when the user is not paying attention to the screen).

Speed and granularity of viewing condition adaptation implementations may be provided. Natural limits of human vision may allow adaptations to be performed with certain delays. For example, one characteristic may be referred to as accommodation delay. Accommodation delay may be the time that it takes the human eye to change focus from one distance to another. Accommodation delay may be about 350 ms for adults. For example, this may mean that if user is distracted (e.g., is looking at an object other than the screen of the mobile device) but then looks back to the screen of the mobile device, it may take about 350 ms for the user's eye to change focus back to the screen of the mobile device.

One-way communication delays may be within 100-300 ms (e.g., in LTE wireless networks). This may be a range, for example, for mobile video telephony applications. The delay may be sufficient to execute implementations described herein to perform changes in viewing conditions in a way that may be unnoticeable to the user. Such delays may be slower if implementations are performed at the base station. Such systems may perform trans-coding or selection of layers of video (e.g., if encoded in scalable/layered fashion) to be transmitted to the WTRU over the air at any given time. Spatial bandwidth of visual reproduction may be changed. If changes are introduced in small increments (e.g., 3-5 steps per octave), the changes may be less noticeable.

Implementations utilizing viewing condition adaptation may be described and utilized. Adaptation techniques that may be employed by a delivery system may be described herein. A subset of combination of the adaptation techniques may be utilized, including, but not limited to, one or more of detection and adaptation to the presence of a user; detection and adaptation to screen tilt; estimation and adaptation to a user's distance from the screen; adaptation to a user's distance from the screen and user's vision by means of calibration tests; estimation and adaptation to lighting conditions; and estimation and adaptation to user's point of interest/attention.

Detection and adaptation to the presence of a user. If a user is not present, then the system may throttle the video rate down, for example, to a lowest "toll" quality representation, turn it into a slide-show, and/or turn the video off There are several sensors and techniques that can be employed to detect user's presence, for example, by using a dedicated "user proximity" sensor, by using a phone's front facing camera, by using infra-red imaging devices, by using ultra-sonic sensors, by using input from microphone, by using a motion sensor, etc.

Proximity sensors may be used to turn off a screen backlight when a user is talking on the phone. Input from this sensor may be used to stop or adjust (e.g., reduce) the bit rate at which content (e.g., video) is being delivered. When using input from other sensors, this input may be converted into an indicator indicating the presence of the user. This indicator may be used to make a decision about the rate, quality, etc. of the content (e.g., video) to be delivered.

Figure 21:
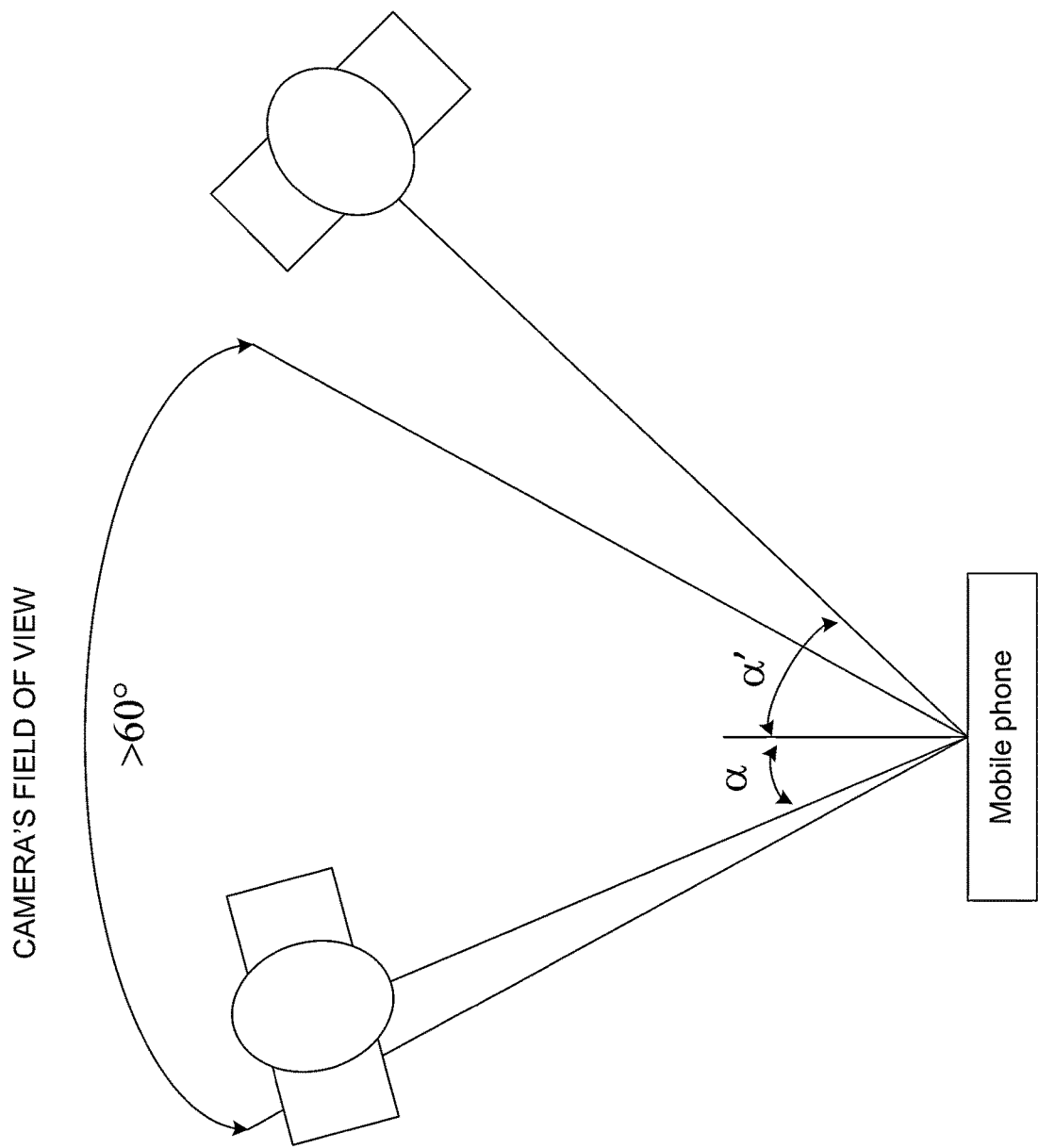
FIG. 21 illustrates an example of detecting user's presence and user's angle of view using front-facing camera.

Detection logic that may be used using input from front-facing camera may be described herein. A system may acquire an image from a front-facing camera. A face detection algorithm may be used to find the location of a face within an image. For example, the system may employ a Viola-Jones detector to detect the face. If face is found, a determination may be made that the user is present. If a face is not found, a determination may be made that the user is located outside the field of view of the front-facing camera or out of the range of the face recognition algorithm. An example of such is illustrated in FIG. 21. In cases of wide angle cameras and narrow-angle displays, it may be inferred that the user is not able to see the content rendered on the screen. If the user is out of range, then s/he may not be able to perceive full screen resolution.

Detection and adaptation to screen tilt may be described herein. A mobile device may include sensors that may be used to estimate a user's location and/or orientation with respect to the screen of a mobile device. For example, the sensors may include, but are not limited to, a phone's front facing camera, infra-red sensors, ultra-sonic sensors, a microphone array, etc. The system may acquire an image (e.g., visible light, IR, sonar-based, etc.) of a field in the front of the phone. The system may detect a location of a human face. The system may compute the angle with respect to that location. For example, if a camera is used as a sensor, then an image from the camera (e.g., front facing camera) may be captured and utilized to detect a human face. Face-detection techniques, such as but not limited to Viola-Jones detector, may be employed. If a face is not detected, then the system may infer that the user's direction of view may be at least half of camera view angle away. For example, this may be exemplified in FIG. 21. When a user's face is detected, the tilt may be computed as:

$$\alpha = \arctan\left(\tan\left(\text{camera field of view}[°]/2\frac{\text{distance between face and image center}}{\text{image width}/2}\right)\right).$$

Once tilt is determined, one or more viewing characteristics of a mobile screen may be utilized, such as but not limited to its contrast and/or brightness as functions of viewing angle to obtain limits for brightness and/or contrast that may be achievable with the setup of the device. The system may utilize the one or more characteristics (e.g., possibly in combination with information about illumination) to detect a range of visible spatial frequencies on the screen. The one or more characteristics may be used to drive decision on spatial resolution and/or filter parameters that may be used for encoding of the content (e.g., once the range of frequencies is detected).

Estimation and adaptation to a user's distance from the screen may be described. There may be sensors and techniques that may be employed for detecting a user's distance with respect to the screen. This may be done by using, for example, a phone's front facing camera, infra-red imaging, ultra-sonic sensors, or by any combination of inputs from these sensors.

A motion sensor may be used to detect possible changes in viewing distance. Changes in viewing distance may be determined using an input from a front facing camera. For example, human facial features, such as, but not limited to interpupillary distance (IPD), may be utilized as a metric that may be used to analyze a user's viewing distance.

Figure 22B:
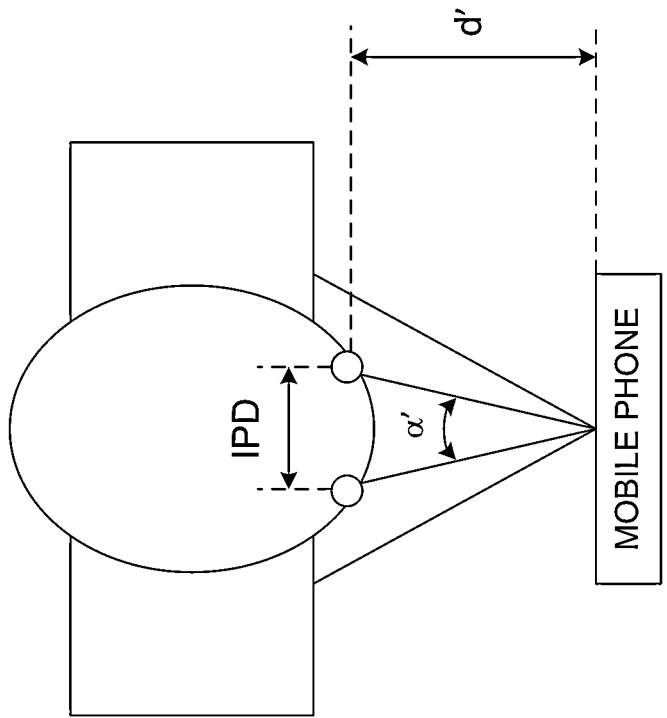
FIGS. 22A-B illustrate examples of detecting a user's distance from the screen by using interpuppilary distance (IDP).
Figure 22A:
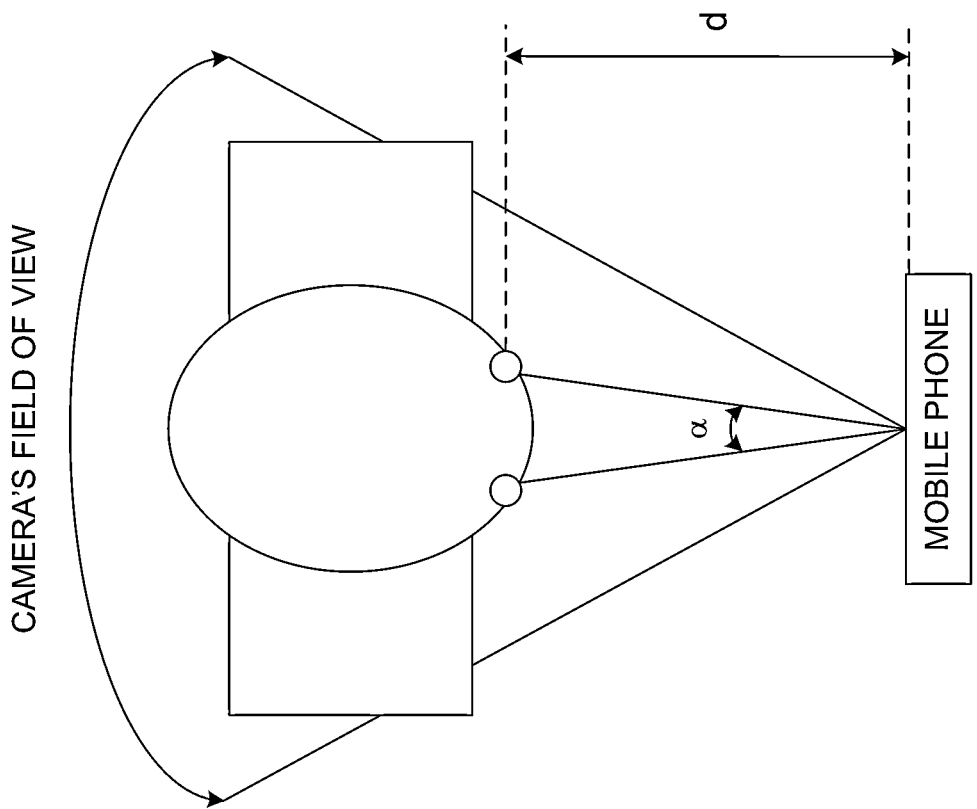

An example of this logic may be explained in reference to FIGS. 22A-B. Two angles that may come into play are the camera's view angle, which may be known from the phone's specifications, and the angle between a user's eyes (a). If an image is captured and/or processed by a face detector, the distance between the user's eyes (e.g., measured in pixels) within that image may be measured. The angle between a user's eyes may be computed as:

$$\alpha = 2\arctan\left(\tan\left(\text{camera field of view}[°]/2\frac{\text{distance between eyes [pixels]}}{\text{image width}}\right)\right).$$

This angle may be connected to the distance between the user and the phone, d:

$$\alpha = 2\arctan\left(\frac{IPD}{2d}\right).$$

Hence, this distance may be computed as:

$$d = IPD\frac{1}{2\tan(\alpha/2)}.$$

A variable that may be unknown may be the user's IPD. The user's IPD may be estimated and/or provided as an input parameter to the application (e.g., customized for a particular user). For example, the IPD of a majority of adults may vary in the range from 50 to 75 mm. Such a range may be used as an estimate. If a user enters his exact IPD as a parameter, then the performance of the system may be more accurate. It may be sufficient to know (e.g., only know) a lower bound estimate of viewer distance, for example for adaptation logic. If there are multiple viewers who are watching the screen, it may be sufficient to detect the distance of the viewer who may be closest to the screen.

Implementations utilized to detect a user's distance based on his/her IPD may include (e.g., all of or a subset of) the following: estimate and/or enter a user's interpupillary distance (IPD) as a parameter; obtain the camera parameters, such as but not limited to resolution and camera's angle; capture an image using a front facing camera; detect the presence and/or location of a human face within the image; measure the distance (e.g., pixel-level distance) between the user's eyes in the image; and compute the user's distance to the screen based on the known quantities.

Detecting a face (e.g., human face) within an image may be accomplished, for example, using a Viola-Jones detector. Detectors may compute pixel-level sizes of several standard images features (e.g., IPD). If more than one face is detected in an image, then the distance from the screen to one or more of the faces may be stabled. The face that is closest to the screen may be utilized. The user's distance may be utilized (e.g., possibly in combination with information about illumination and viewing angle) to detect a range of visible spatial frequencies on the screen. The range of visible frequencies may be utilized to determine spatial resolution and/or filter parameters, for example, to be used for video encoding/decoding and/or to switch to a stream encoded using such parameters.

Figures 23, 24:
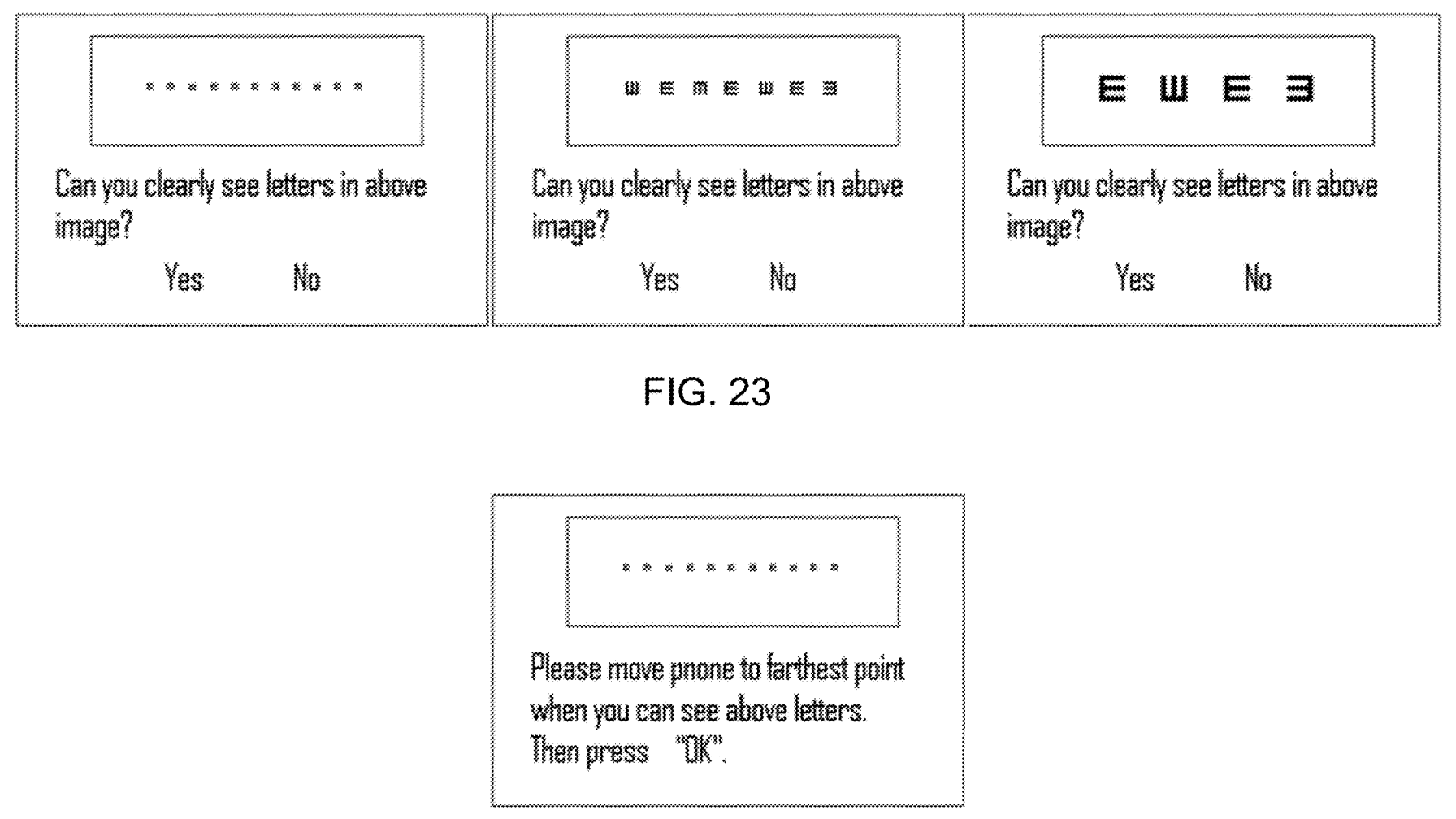

Adaptation to a user's distance from the screen and a user's vision by means of calibration tests may be described. A technique for detecting a user's ability to appreciate visual details at different viewing distances may be determined via one or more tests. For example, the user may be directed to look at the screen and answer a series of questions, such as but not limited to those shown in FIGS. 23 and 24. FIG. 23 shows example questions that may permit detection of the smallest spatial details that the user can see at his most comfortable position. Using the example questions of FIG. 24, the user may be instructed to move the camera/screen to the farthest point where s/he can still see such details. When the user confirms such (e.g., presses OK), the user's photograph may be taken, his face may be detected, and the IPD may be computed (e.g., in the pixel domain), which may correspond to the user's viewing distance. This may detect situations when a user is located at a shorter or a longer distance in the future. One or more distance/visible resolution points may be determined. For example, by asking the user to confirm (e.g., press "OK") using two possible letter sizes (e.g., cf. test in FIG. 24), two distance/visible resolution points may be obtained, which may be sufficient for adaptation to any distances.

Estimation and adaptation to lighting conditions may be described and utilized. Lighting conditions may be assessed using one or more sensors, such as but not limited to, ambient light sensor information, a front facing camera, a back facing camera, etc. Such information (e.g., together with information relating to the brightness settings of the screen) may be utilized to estimate the achievable contrast of the screen and the amount of total illumination.

The estimates may be refined using information about the tilt of the screen. The estimated total illumination may be used to select an appropriate contrast sensitivity curve. The contrast of the screen may be used to detect an operating range on the appropriate contrast sensitivity curve. This may yield the range of visible spatial frequencies on the screen.

The front and back illumination may affect a user's perception in different ways. For example, the front illumination may be reflected from the screen. The back illumination may change the pupil's dilation. Once a range of frequencies is detected and/or the user's distance to the screen is known, the front and/or back illumination may be utilized to determine the spatial resolution and/or filter parameters to be used for encoding the content and/or to switch to a stream encoded using such parameters.

Estimation and adaptation to a viewer's point of attention may be described and utilized. A user may perceive picture details in a small part of the screen, which may be referred to herein as a "point of attention" (POA). The resolution in areas of the screen outside of the user's POA may be reduced without a noticeable effect to the user. Estimating a user's POA may be useful when a user is a very short distance from the screen (e.g., at wider viewing angles). For example, a user's POA may be used in saliency based coding with a content derived saliency point. A user's POA may be estimated and used to improve the user's experience. A user's POA may be used in streaming of old material that may not have been coded with this information.

A user's POA, for example, may be estimated using the front facing camera by measuring the angle between the pupil and the reflection from the corneal lens. While the user may have to be close for this measurement, this may be a time when the measurement is relevant.

One or more of the following may be implemented utilizing a user's POA: an encoder supporting division of the picture into sections, or tiles, where each section/tile may be encoded at a number of resolutions or layers; a mobile device with a front camera and a procedure to estimate the user's viewing point; an implementation used to compute an optimal resolution for each tile; a signaling implementation utilized to identify to the network, for a section/tile, which resolution may be used; and an adaptation network entity. If the entity is not an encoder/decoder, then several layers/rates may be sent from the encoder/decider and/or server for the adaptation entity to choose from. The adaptation may be performed in a network node (e.g., a Node-B), for example, to reduce the adaptation time. A rendering algorithm may stitch the sections/tiles together.

Computer vision and/or computer graphics techniques may be employed. For example, a Viola-Jones face detector and eye tracker may be used to identify fixation points. Tile stitching may be done, for example, by using local features, such as but not limited to Scale-Invariant Feature Transform (SIFT) features.

Figure 25:
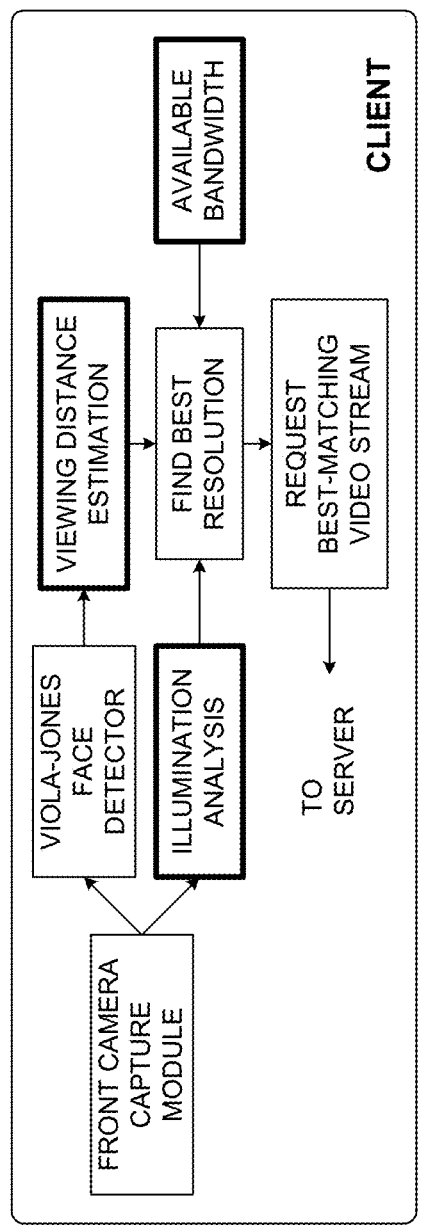
FIG. 25 illustrates an example of a viewing conditions adaptive streaming system.
Figure 25:
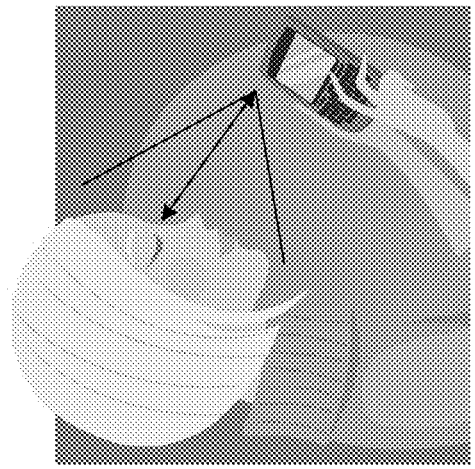

FIG. 25 illustrates an example of a viewing-condition adaptive system. A mobile streaming video system may incorporate one or more of the implementations described herein for the adaptation to viewing conditions. FIG. 11 may illustrate an example of the architecture of a streaming system. Examples of components and logic used by the streaming client (e.g., residing in a WTRU) may be shown in FIG. 25. This client may communicate with a streaming or HTTP server that may store a plurality of video streams encoded at different rates and/or spatial resolutions. The client device may use a front camera to estimate viewing distance and/or illumination level. For example, these parameters (e.g., in addition to the client's view of available bandwidth) may be used to determine the best resolution at which the client can request the content (e.g., video stream).

The streaming sever may react to a client requests. For example, the streaming server may be an off-the-shelf rate-adaptive HTTP and/or RTSP/RTP-compliant server. The system may employ all or any subset of the implementations described herein.

Figure 26:
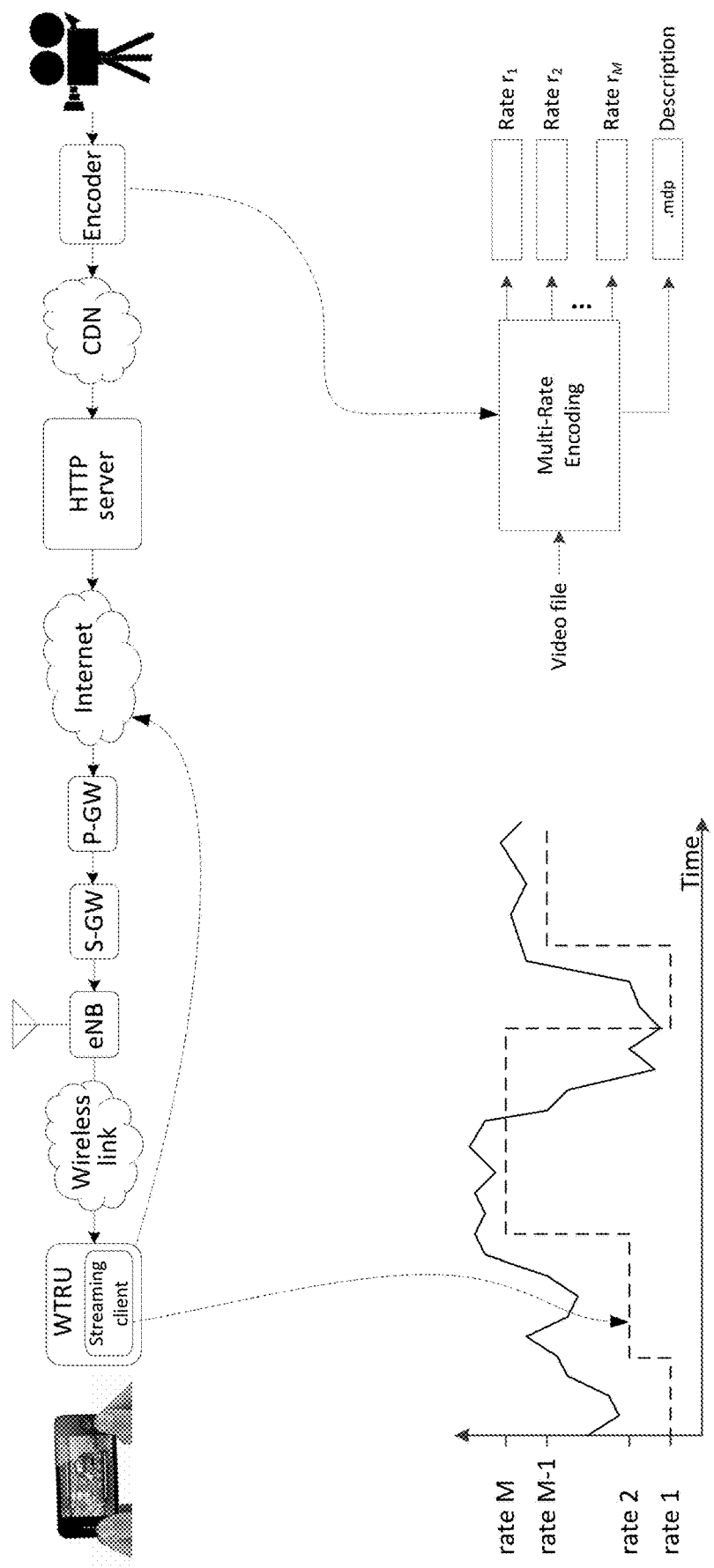
FIG. 26 illustrates a diagram of an example architecture and explanation of functionality of such a system.

Streaming in a wireless and wired network may utilize adaptation to variable bandwidth, for example, due to congestions and other possible impairments in the network. Simultaneous encoding of multimedia content to several target rates may be utilized. This may be coupled with signaling and rate switching logic in the client application. FIG. 26 illustrates a diagram of an example architecture and explanation of functionality of such a system. The example of FIG. 26 shows operation of an adaptive HTTP-based streaming system.

In a streaming system, stream switches may be enabled at certain granularity, which may be about 2-10 seconds. The points at which a client may switch between encoded streams may be referred to as switch points. The portions of the encoded content between the switch points may be referred to as segments.

During a streaming session, the streaming client may compute the rate of delivery of each segment, which may give the client an estimate of the bandwidth of the network that may be available for receiving of next segment. Based on this estimate, the client may decide which next encoding/rate to use for the next segment. The client may adapt to changing network conditions utilizing such a model. Information (e.g., high-level information) about encoded streams (e.g., possibly including the rates of the encoded streams) may be stored in a manifest or multimedia presentation description (MPD) file. Offsets and timing information for each encoded segment within a stream may be stored in Segment Index files.

Formats of encoded media segments, segment indices, and/or media presentation description (MPD) files may be defined. The set of encodings with common attributes that may allow stream switching may be referred to as the adaptation set. Elements of adaptation sets may be called representations. Adaption sets may include SubRepresentations as components. Representations and SubRepresentations may include one or more media content components, such as but not limited to audio, video, text, etc.

MPEG-DASH Adaptation sets, Representations, and/or Sub-Representations may share common attributes. For example, if they include video, they may have @width, @height, @sar, and/or @framerate attributes. If they include audio, they may include @audioSamplingRate attribute. Attributes may include @mimeType and @codecs attribute. Attributes may or may not be required. A representation may have its own unique attributes, such as but not limited to @id, @bandwidth, @qualityRanking, etc.

MPEG-DASH streaming standard may be used universally, for example, for delivery of information to reproduction devices, including but not limited to TV sets, computers, tablets, and smartphones. The characteristics of viewing setups when using different reproduction devices may be different. For example, when watching videos on mobile devices, their small screens may yield a 5-10° viewing angles when being held at a comfortable distance. When a user is holding a device in their hand, such distance may no longer be stationary, for example, it may change with the user's pose and attention to the content. FIGS. 7 and 8 illustrate a diagram and a chart showing examples of parameters of viewing setup and distribution of viewing distances in a mobile setting.

As described herein, Table 1 illustrates examples of viewing settings with various mobile devices. Mobile viewing may bring a broad distribution of viewing angles, which may be small (5-10°) for small-form-factor devices. The effective density of visual content may go beyond the acuity limit.

Figure 27:
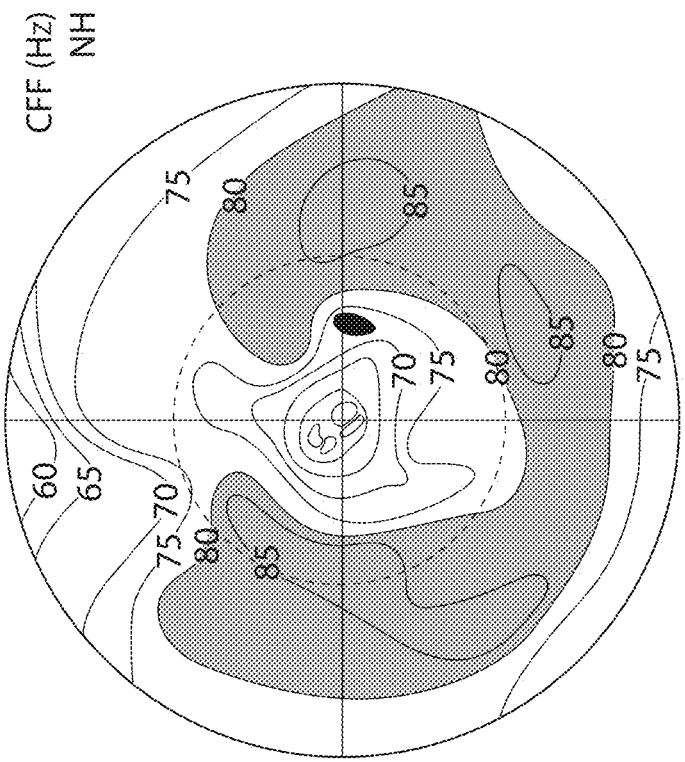
FIG. 27 illustrates an example of topographic maps of CFF values as functions of tilt from view axis.
Figure 27:
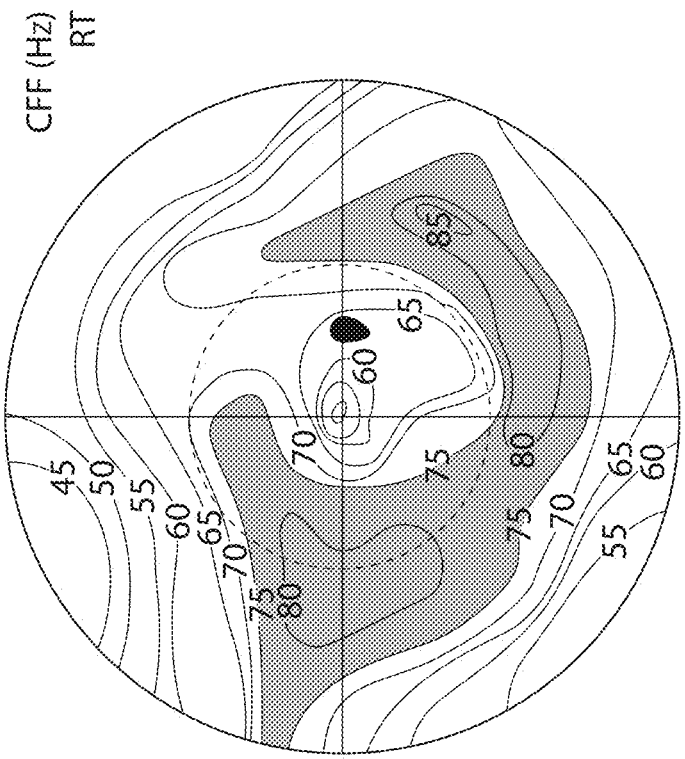

Temporal characteristics of vision may be considered. One temporal characteristic may be Critical Flicker Frequency (CFF). FIG. 27 illustrates examples of topographic maps of CFF values as functions of tilt from view axis. These measurements may be produced for the right eye. The black region may correspond to a blind spot. From FIG. 27, it may be observed that in the central (fovea) region, the CFF may be approximately 55 Hz. For peripheral regions, the CFF may be approximately 85 Hz. Eccentricity of Critical Fusion Frequency (e.g., the inner circle may correspond to a 30° shift from view axis) may be depicted in FIG. 27. This suggests that with narrow-angle (e.g., 5-10°) reproduction, lower framerates in encoding of video content may be utilized (e.g., as opposed to cases of wide-angle reproduction).

Video encoding produced for conventional (e.g., a 30-40° angle) viewing may deliver much more information (e.g., in terms of spatial and temporal details) than mobile users with narrow (e.g., 5-10°) view-angle reproduction may be able to see and/or appreciate.

In order to optimize delivery for narrow view-angle reproduction, a content publisher may employ a number of techniques. For example, a content producer may, in any permissible combination, down-sample video spatially and/or temporally, apply spatial or temporal pre-filtering techniques, use encoder-level optimizations (e.g., such as but not limited to frame/slice- and MB-level RD decision modes, which may be coupled with a cost function that may be tuned to a specific reproduction setup), etc.

Down-sampling may be executed using tools, and may or may not require any additional attributes or signaling. For example, the DASH MPD format may include @width, @height, and/or @framerate attributes. For example, if mobile device supports 720p resolution natively, it may be desirable to send video data encoded at such spatial resolution, but with perceptual redundancy removed by means of pre-filtering and code-level optimizations.

For example, other implementations may be used to optimize content (e.g., video) for a given fixed viewing angle. By removing viewing angle as one of the degrees of freedom, the effectiveness of each encodings may be improved.

Additional attributes may be disclosed herein, for example, to enable the use of such customized streams in DASH. Attributes in DASH MDP syntax may include, but are not limited to, @viewingAngle, which may be an attribute specifying an intended (e.g., optimal) viewing angle for viewing the encoded content in a given Representation or Adaptation Set. @minViewingAnge and @maxViewingAngle may be attributes identifying a range of viewing distances/ranges for encodings supported by a given Representation or Adaptation Set.

The DASH may include @cutOff and/or @frequencyResponse, which may be an attribute indicating that content was low-pass filtered prior to encoding with given cut-off frequency parameter. The @cutOff and/or @frequencyResponse parameter may be sufficient to implement customization by means of spatial pre-filtering. The @viewingAngle attribute may leave such decisions to encoders/decoders. Introduction of @minViewingAnge and @maxViewingAngle may allow for a range, and may be used in a description an encoded stream.

Viewing angle may be signaled by at least a combination of the physical size of the screen (e.g., screen width) and the distance between the viewer and the screen. For example, viewing angle may be signaled by:

$$\text{viewing angle} = 2\arctan\left(\frac{\text{screen width[in]}}{2 \cdot \text{distance[in]}}\right)$$

Physical size of the screen and the distance between the viewer and the screen may provide characterization of the viewing setup. For example, for the reproduction of 2D images/video, the viewing angle may be utilized. In the reproduction of 3D images and videos, there may be at least one more degree of freedom, and therefore the signaling of the physical size of the screen and the distance between the viewer and the screen may be utilized. An example of such is illustrated in FIG. 28.

Figure 28:
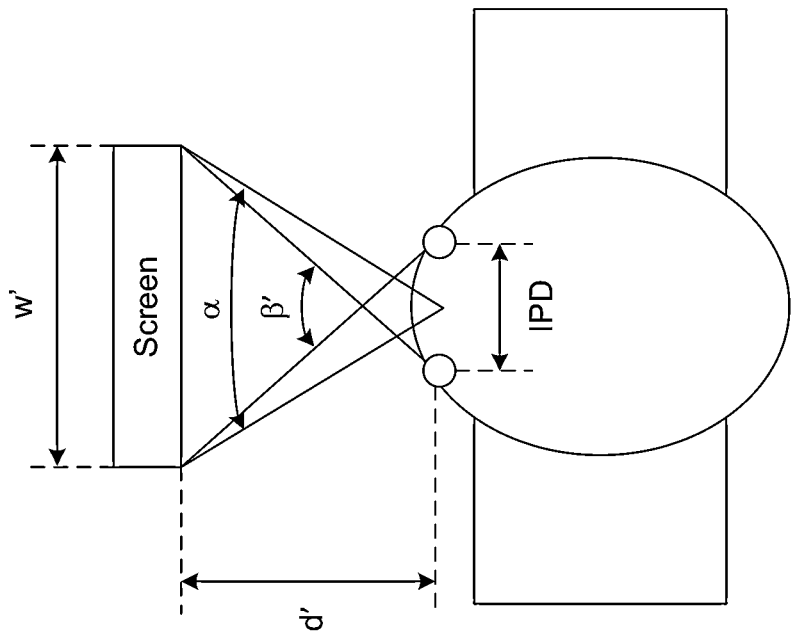
FIG. 28 illustrates a diagram of examples of two settings with the same viewing angle alpha, but different cross-angle beta.
Figure 28:
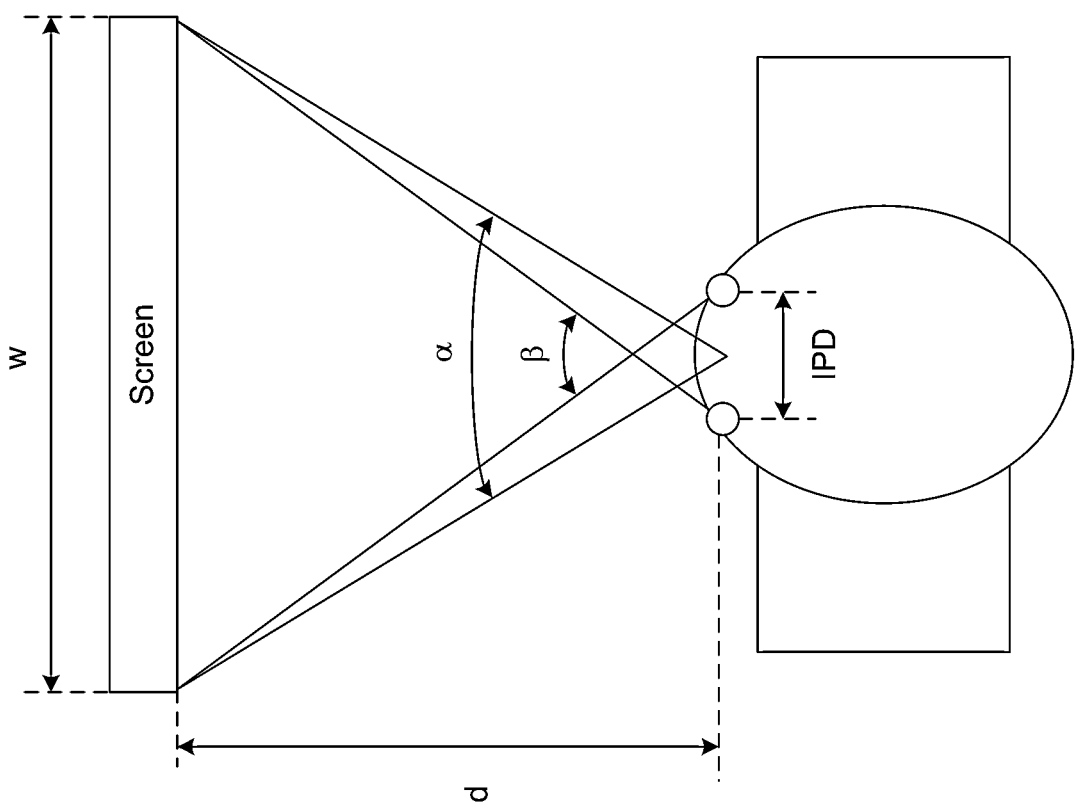

FIG. 28 illustrates a diagram of examples of two settings with the same viewing angle ($\alpha$), but different cross-angle ($\beta$ and $\beta'$). Referring to FIG. 28, the viewing angle ($\alpha$) may be the same for both settings. The cross-angle ($\beta$ and $\beta'$) may be different. The difference in cross-angle may diminish as the ration between the viewing distance and the interpupillary distance (IPD) increases. IPDs may vary from person to person. For example, the typical IDP for adults may range between approximately 50-75 mm (1.96-2.95"). Therefore, signaling of viewing setting for 3D reproduction may account for a user's IPD.

Referring to FIG. 28, viewing angle ($\alpha$) and cross-angle ($\beta$) may be utilized. These parameters may be derived from descriptors including attributes such as, but not limited to, physical size of the screen, distance between the user's eye's and the screen, and a user's IPD. Descriptors may also be defined such that they list any combination of several parameters, where a subset may be utilized. For example, a descriptor may be defined with parameters such as, but not limited to, the physical size of the screen, the distance between the user's eyes and the screen, and/or the viewing angle. Any two of the parameters may be utilized to derive the third.

Any combination of the parameters of viewing setup disclosed herein may be included as pre-defined attributes of Adaptation Sets, Representations, and/or sub-representations in a MPD file in the DASH standard. Any combination of the parameters of viewing setup may be signaled, for example, by means of generic descriptors in DASH MPD files. An example of such signaling may be illustrated below:

```xml
<Representation id="720kbps" bandwidth="792000" width="640" height="368" >
  <ClientDescriptor schemeIdUri="urn:sdo:dash-ext1:viewing-angle"
behavior="required" value="36" />
    <SubRepresentation level="1" contentComponent="481" maxPlayoutRate="32"/>
    <SegmentBase timescale="90000" presentationTimeOffset="162000000" />
</Representation>
```

Another example of such signalling may be illustrated below:

```xml
<Representation id="720kbps" bandwidth="792000" width="640" height="368"
>
    <Supplemental schemeIdUri="urn:sdo:dash-ext1:viewing-angle" value="36"/>
    <SubRepresentation level="1" contentComponent="481" maxPlayoutRate="32"/>
    <SegmentBase timescale="90000" presentationTimeOffset="162000000" />
    ...
</Representation>
<Representation id="720kbps" bandwidth="792000" width="640" height="368"
>
    <Essential schemeIdUri="urn:sdo:dash-ext1:viewing-angle" value="12"/>
    <SubRepresentation level="1" contentComponent="481" maxPlayoutRate="32"/>
    <SegmentBase timescale="90000" presentationTimeOffset="162000000" />
    ...
</Representation>
```

For example, "schemeIdUri" may provide an identifier of a specification and/or deployment system using this attribute. Behavior attributes may indicate how generic clients (e.g., streaming clients) may react to the descriptor (e.g., which may relate to a viewing parameter). For example, if the descriptor is specified as necessary (e.g., "required," "essential," etc.), then clients (e.g., only clients) that understand and/or can utilize this descriptor (e.g., viewing parameter) may use such representations. If "behavior" is specified as discretionary (e.g., "optional," "supplemental," etc.), then clients may use the representation, even if the client does not understand the descriptor (e.g., viewing parameter). "value" may specify that this descriptor includes one or more values. For example, in the example provided herein, the value may refer to viewing angle.

For example, "schemeIdUri" may provide an identifier of a specification and/or deployment system using this attribute. For example, if "behavior" is specified as "required," then clients (e.g., only clients) that understand and/or can utilize this descriptor (e.g., viewing parameter) may use the representations. If "behavior" is specified as "optional," then clients may or may not use the representation, even if the client understands the descriptor (e.g., viewing parameter). "value" may specify that this descriptor includes one or more values. For example, in the example provided herein, the value may refer to viewing angle.

Descriptors may be defined at the adaptation set level. Descriptors may be defined at the representation and/or sub-representation levels. URIs, such as but not limited to, "urn:sdo:dash-ext1:viewing-angle", "urn:sdo:dash-ext1: min-viewing-angle", and "urn:sdo:dash-ext1:max-viewing-angle" may be used to identify the minimum, maximum, and/or desired values of viewing angles. Similar URIs may be defined for alternative ways to communicate such information, for example, such as but not limited to, display size and viewing distance parameter combinations.

There may be several ways to use the visual attributes, for example, in a DASH streaming client. For example, median viewing distance and/or one or more viewing angle parameters may be utilized. For example, a DASH streaming app may use OS-supplied APIs to obtain physical parameters of a device that it is running on. Such parameters may include, but are not limited to, the mobility of the device (e.g., which may be inferred from type of network connection), native resolution of the screen, density of pixels of the screen or screen diagonal, whether rendering may be done in a window (e.g., the size of the window and its location), etc.

A DASH client running on a device may also infer its size. For example, if a device is mobile and it has 5" or smaller screen, then the DASH client may infer that the device is a hand-held device. The Dash client may select a median viewing distance characteristic (e.g., see FIG. 26). The client may estimate the viewing angle. Using the estimate, the client may select adaptation set and representation, for example, utilizing the @viewingAngle (and/or @minViewingAnge, @maxViewingAngle or @cutOff or @frequencyResponse) value as a possible target.

Dynamically estimated viewing distance and/or viewing angle parameters may be used. A content publisher/distributor may deploy intelligent mobile streaming client applications. An application may use sensors to estimate the distance between a user and the device. The application may determine the viewing angle that may be present when the user is viewing content (e.g., watching a video).

Figure 29:
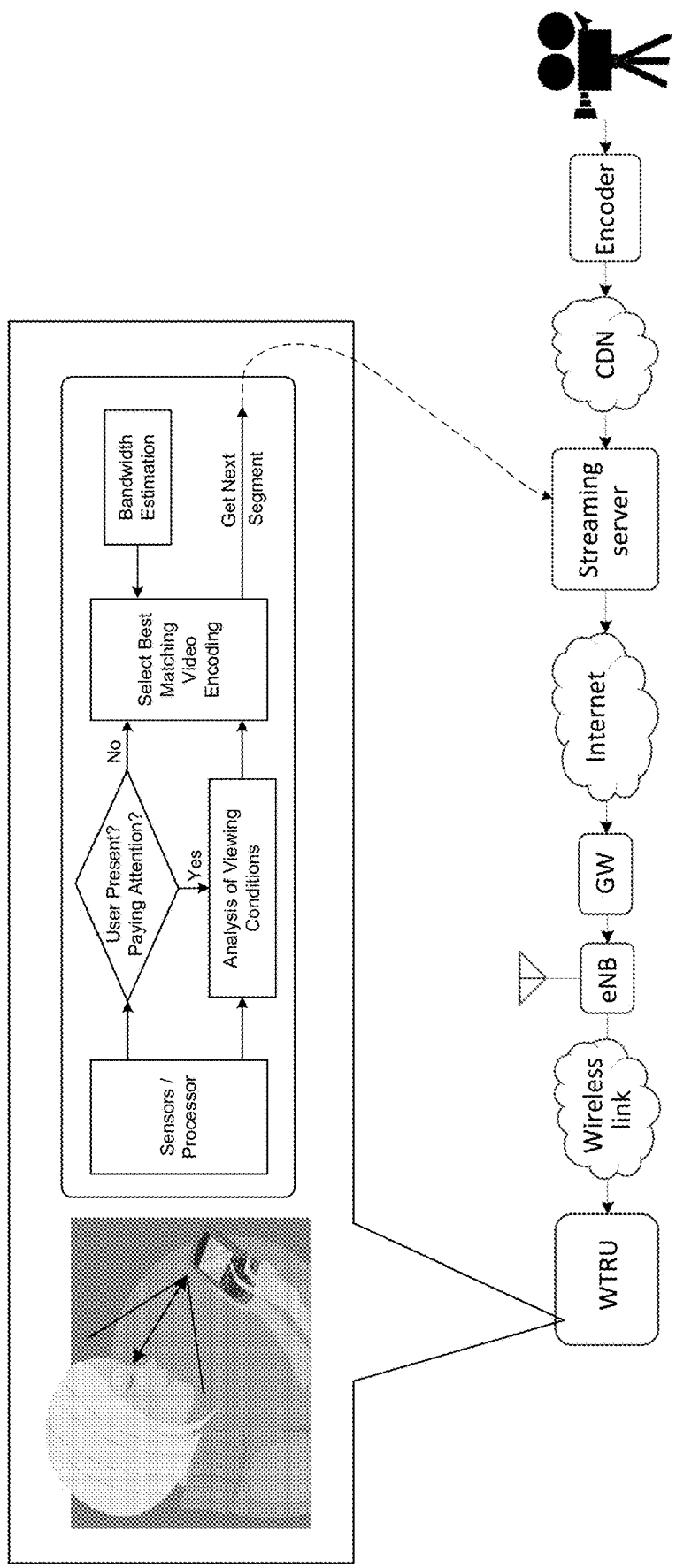
FIG. 29 illustrates a diagram of an example streaming system adapting to user's behavior and viewing conditions.

FIG. 29 illustrates a diagram of an example streaming system adapting to user's behavior and viewing conditions. The client may subscribe to streams that achieve the best match to its setup (e.g., which may include one or more of the visual characteristics described herein). For example, based on the user's behavior and viewing conditions, and one or more pre-encoded streams, the client may optimize the delivery of the content for different viewing angles.

The MPEG-DASH standard may offer a framework for design of HTTP-based adaptive streaming systems. It may offer a set of attributes for description of content properties, making it possible for streaming client to make informed decisions about choice of representations and rendering of the content. For example, encoded video in DASH can be described by one or more of the following: @codec—codec type, profile, and level being used; @bandwidth—target rate used to encode segments; @width, @height, @sar, @framerate—video resolution, aspect rate, framerate; and @qualityRanking—quality rank relative to other encodings in the adaptation set.

Using one or more attributes, a DASH client may determine adaptation sets and/or representations with a codec and video characteristics best matching the rendering capabilities of a particular device. Adjustments to the available network bandwidth may be accomplished by checking @bandwidth attributes and/or switching between streams encoded at different rates.

Viewing positions may be selected to achieve a wide (e.g., 25-40°) view of the screen, for example, in viewing environments, such as but not limited to movie theaters and living rooms. For example, THX suggests 36° as an optimal viewing angle for movie reproduction. Similarly, SMPTE EG-18-1994 suggest a viewing angle of at least 30° wide. When a user is watching a video on a mobile device (e.g., a smart-phones or tablets), the viewing angles may be smaller (e.g., 5-20°) than those suggested. This may be due to the limited physical dimensions of the mobile device and/or the distance at which the user is from the screen of the mobile device.

Examples of parameters of mobile viewing setup are shown in FIG. 15. These parameters may be interrelated, for example, according to the follow:

$$\text{viewing angle} = 2\arctan\left(\frac{\text{screen width[in]}}{2 \cdot \text{distance[in]}}\right).$$

Table 1 is reproduced below. Table 1 provides examples of parameters of several possible viewing settings. In Table 1, characteristics of a stationary viewing setup may be compared with possible settings using examples of mobile devices.

viewing angle experienced by a user watching a TV. The resulting spatial densities cross the $\frac{1}{60}^{th}$ of a degree of viewing angle barrier, which may be referred to as the visual acuity limit. Examples of such instances may be shown in Table 1. In some cases, density may exceed two times the acuity limit.

Fine spatial details in video prepared for wide-angle viewing may or may not be visible on mobile screens. Visibility of some or all spatial frequencies may be affected by a shift in scale/angle. A narrow viewing angle may exclude peripheral areas of vision that may have higher temporal sensitivity, potentially making it possible to render video at rates lower than normally utilized for wide-angle reproduction.

Streaming may be optimized for different devices and/or reproduction settings. For example, encoding of video assuming stationary (e.g., wide angle) reproduction may not be efficient if used for delivery to a small mobile device. Much fewer bits may be utilized to achieve the same user experience, for example, if it is known that reproduction may be done using a narrow viewing-angle setup.

One or more codec-level and/or pre-processing tools may be utilized to encode and/or process content (e.g., video) for a device with a narrow viewing angle setup. The tools may include, but are not limited to, down-sampling of video spatially and/or temporally prior to encoding, spatial and/or temporal pre-filtering (e.g., low-pass filtering prior to encoding), use of codec-level tools (e.g., quantization, R/D decision logic, etc.), etc.

Implementations described herein may provide an attribute that allows for one or more of production of encoded streams and/or MPD files that may be used across many

TABLE 2

Examples of viewing settings.

| Device | Screen Size | Resolution (pixels) | Density (ppi) | Viewing distance | Viewing angle Horizontal | Viewing angle Vertical | Angular density (pixels in 1°) |
|---|---|---|---|---|---|---|---|
| Netbook Sony ® Z-series ® | 13.3" | 1920 × 1080 | 165.63 | 16" | 39.8° | 23° | 46.3 |
| | | | | 24" | 27.1° | 15.5° | 69.3 |
| Tablet Apple ® iPad ® 3 | 9.7" | 2048 × 1536 | 263.92 | 12" | 35.8° | 27.3° | 55.3 |
| | | | | 16" | 27.3° | 20.6° | 73.7 |
| | | | | 24" | 18.4° | 13.8° | 110.5 |
| Large-screen Smartphone HTC ® Rezound ® | 4.3" | 1280 × 720 | 341.54 | 8" | 26.4° | 15° | 47.7 |
| | | | | 12" | 17.8° | 10° | 71.5 |
| | | | | 16" | 13.4° | 7.5° | 95.4 |
| | | | | 24" | 8.9° | 5° | 143.1 |
| Smartphone iPhone ® 4 | 3.5" | 960 × 640 | 329.65 | 8" | 20.6° | 13.8° | 46.0 |
| | | | | 12" | 13.8° | 9.2" | 69.0 |
| | | | | 16" | 10.4° | 6.9° | 92.1 |
| | | | | 24" | 6.9° | 4.6° | 138.1 |

Viewing angles for both screen orientations may be computed. The resulting spatial density of information on the screen may be calculated. For example, spatial density may be expressed by:

$$\text{pixels in } 1° = \text{display density}[ppi] \cdot \text{distance[in]} \cdot 2 \tan\left(\frac{\pi}{360}\right).$$

For example, a shown in Table 1, the viewing angles in a mobile environment may be small (e.g., 5-10° for small form-factor devices). This may be 3-6 times smaller than the devices, fewer encodings and/or MPD files needed, a unique identification of streams encoded for different reproduction environments (e.g., streams with the same bitrate and/or resolution, but different appearance), and adaptation logic in a DASH client (e.g., enabling the client to select the proper representations according to the reproduction settings and the device). For example. One or more attributes describing the viewing angle intended for watching the encoded content in accordance with implementations described herein may be added.

In accordance with the implementations described herein, one or more of the following may be added, for example, as shown in Tables 2, 3, and 4:

TABLE 2

Example Semantics of AdaptationSet Element

| Element or Attribute Name | Use | Description |
| --- | --- | --- |
| AdaptationSet | | Adaptation Set description |
| @minViewingAngle | O | May specify the minimum @viewingAngle value in some or all Representations in this Adaptation Set. This value may have the same units as the @viewingAngle attribute. If not present, the value may be unknown. |
| @maxViewingAngle | O | May specify the maximum @viewingAngle value in some or all Representations in this Adaptation Set. This value may have the same units as the @viewingAngle attribute. If not present, the value may be unknown. |

TABLE 3

Example Semantics of Representation Element

| Element or Attribute Name | Use | Description |
| --- | --- | --- |
| Representation | | This element may include a description of a Representation. |
| @viewingAngle | O | May Specify the intended/optimal viewing angle for reproduction of video media type. If not present, the value may be unknown. |

TABLE 4

Examples of Adaptation Set, Representation and Sub-Representation attributes and Elements

| Element or Attribute Name | Use | Description |
| --- | --- | --- |
| Common attributes and elements | | |
| @viewingAngle | O | May specify the intended/optimal viewing angle for reproduction of video media type. If not present, the value may be unknown. |

An encoding may be optimized based on device characteristics (e.g., viewing characteristics of the device). For example, in the presence of adaptation sets and/or representations within several different values of the @viewingAngle parameter, the client (e.g., DASH client) may make a decision regarding which value to use. For example, the client application may obtain characteristics of the device that it is running on (e.g., using the OS-supplied APIs). Such characteristics may include, but are not limited to, the mobility of the device (e.g., which may be inferred from type of network connection), the resolution of the screen and/or area of screen that may be used for rendering, the density of pixels of the screen and/or screen diagonal, etc. The client may classify the device (e.g., as a smartphone, tablet, stationary device), for example, based on mobility type of the device and size of the screen. The client may select a viewing distance and/or viewing angle that may be used. For example, for smartphones, a median value of viewing distance based on known statistics may be used. Similar data may exist for other types of devices. The client may chose the adaptation set and/or representation to use, for example, using the estimate of viewing distance and/or viewing angle, and/or using declared values of the @viewingAngle attributes of the representations and/or adaptation sets. For example, a player (e.g., a DASH player) may accomplish the selection of streams adopted for best viewing on a specific device. No custom (e.g., per-device) authoring of content and/or MPD files may be needed.

Encodings may be optimized based on dynamically estimated viewing distance and/or viewing angle parameters. In the presence of Adaptation Sets and/or Representations within several different values of @viewingAngle parameter, the DASH client may make decision about which one to use by using the following logic: DASH client application may use device sensors (for example, a user proximity sensor, IR, and/or front-facing camera) to detect presence of the user, and if s/he may be present—their distance to the screen; using obtained distance, as well as characteristics of the screen, DASH client may compute viewing angle; using viewing angle, and declared values of @viewingAngle attributes of Representations and/or Adaptation sets, the client may then chose most appropriate Adaptation Set and/or Representation to use. An example illustration of this logic in a DASH client is provided in FIG. 29. In the system shown in FIG. 29, the client may also make intelligent decision in cases when the user may not be present and/or paying attention to the screen. Such decisions may include, but are not limited to, lowering video quality and/or rate, and/or stopping playback.

As described herein, implementations may provide for methods and systems associated with viewing condition adaption of multimedia content. For example, multimedia content (e.g., video) may be received by a device (e.g., a mobile device, a personal computer, a video conferencing device, etc.) from a network (e.g., a network node such as, but not limited to a streaming server, HTTP server, etc.). A viewing parameter (e.g., a plurality of viewing parameters) associated with the user, the device, and/or the content may be determined, for example, by the device. The viewing parameter may include at least one of: a user viewing parameter, a device viewing parameter, or a content viewing parameter. A viewing parameter may comprise a plurality of viewing parameters.

As described herein, the user viewing parameter may include at least one of: a user's presence, a user's location with respect to a screen of the device, a user's orientation with respect to a screen of the device, a user's viewing angle with respect to a screen of the device, a user's distance from a screen of the device, a user's visual acuity, an ambient lighting condition (e.g., an intensity of ambient light), a number of users viewing a screen of the device, or a user's point of attention.

As described herein, the device viewing parameter may include at least one of: mobility of the device, size of a screen of the device, resolution of a screen of the device, pixel density of a screen of the device, contrast of a screen of the device, brightness of a screen of the device, size of a window displaying the multimedia content on the device, or a location of a window displaying the multimedia content on the device. As described herein, the content viewing parameter may include at least one of: contrast of the multimedia content, color gamut of the multimedia content, presence of third-dimension of multimedia content, or range of depth of three-dimensional content of the multimedia content.

The viewing parameter may be determined by the device (e.g., the processor of the device, a DASH client residing on the device, software residing on the device, etc.). The viewing parameter may be determined using at least one of: a size of a screen of the device, a resolution of a screen of the device, an angle of a screen of the device, a pixel density of a screen of the device, a contrast ratio of a screen of the device, a user proximity sensor, a front facing camera, a back facing camera, a light sensor, an infra-red imaging device, an ultra-sonic sensor, a microphone, an accelerometer, a compass, or a gyroscope sensor. For example, sensors of the device (e.g., a user proximity sensor, a front facing camera, a back facing camera, a light sensor, an infra-red imaging device, an ultra-sonic sensor, a microphone, an accelerometer, a compass, or a gyroscope sensor) may be used to determine the viewing parameter or may be used to determine information that is utilized to determine the viewing parameter.

A request for the multimedia content may be transmitted by the device to the network. The request may be based on the viewing parameter. For example, the request may include information relating to the viewing parameter. The request may be received and processed by the network. The network may determine a rate for the multimedia content (e.g., based on the request). For example, the network may determine the rate for the multimedia content based on the viewing parameter. For example, the rate may be associated with the viewing parameter. The multimedia content may be received by the device from the network. The multimedia content received from the network may be processed at a rate according to the viewing parameter. The multimedia content may be displayed on the screen of the device.

The multimedia content may be processed at a plurality of different rates. For example, each rate may be a function of at least one of: an encoding rate of the multimedia content, a spatial resolution of the multimedia content, a temporal resolution of the multimedia content, quantization parameters, rate control parameters, target bit rate of the multimedia content, spatial filtering of the multimedia content, or temporal filtering of the multimedia content. Each rate may be associated with at least one viewing parameter. Therefore, the multimedia content may be customized to the viewing parameter via the different rates. For example, the multimedia content may be customized according to the user's experience.

The viewing parameter may change dynamically. The rate of the multimedia content provided to the device may be changed dynamically, for example, according to the dynamically changing viewing parameter. For example, the rate of the multimedia content may change per predetermined quantity of the multimedia content (e.g., from one segment to the next), per predetermined period of time, etc. For example, a first segment of the multimedia content, processed at a first rate, may be received from the network. The first rate may or may not be based on a viewing parameter. A viewing parameter may be determined (e.g., a subsequent viewing parameter or a changed viewing parameter) and a request for a second segment of the multimedia content may be transmitted to the network. The second segment of the multimedia content, processed at a second rate according to the viewing parameter (e.g., a subsequent viewing parameter or a changed viewing parameter), may be received from the network. The processing rate of subsequent segments of the multimedia content may or may not change, for example, until the entirety of the multimedia content has been delivered to the device or the connection cancelled.

The request transmitted to the network may determine the rate of multimedia content received by the device. For example, the request may include the specific rate of the multimedia content requested by the device. The network may determine the rate of the multimedia content received by the device according to the request. For example, the request may be a manifest file (e.g., a multimedia presentation description (MPD) file), an SEI message, or other messaging that may, for example, include the viewing parameter. The network may utilize the viewing parameter to select a rate of the multimedia content.

A manifest file (e.g., a multimedia presentation description (MPD) file), an SEI message, or other messaging may be received by the device from the network. The manifest file (e.g., MPD file), SEI message, or other messaging may include information relating to the rate (e.g., all the available rates) of the multimedia content. The information relating to the rate may include a descriptor that is associated with the viewing parameter. The manifest file (e.g., MPD file), SEI message, or other messaging may indicate whether the descriptor is required or optional. A required descriptor may indicate that the device must meet the requirements of the descriptor to receive the multimedia content processed at the rate. For example, if the required descriptor specifies a viewing parameter of "viewing angle of at least 36°," then devices (e.g., only devices) that have a calculated viewing angle of at least 36° (e.g., meet the descriptor) may receive the multimedia content processed at that rate. An optional descriptor may indicate that the device may meet the requirements of the descriptor, but do not have to meet the requirements of the descriptor, to receive the multimedia content processed at the rate.

Implementations described herein may be utilized for video conferencing. For example, a first device (e.g., first video conferencing device) may determine a viewing parameter (e.g., a plurality of viewing parameters) of a second device (e.g., second video conferencing device), for example, as described herein (e.g., via SEI messages, requests, signalling, without any signaling, etc.). Characteristics of video encoding suitable for the viewing parameter may be determined by the first video conferencing device. The characteristics of video encoding may include a rate in which video content is processed, for example, as described herein. Video content encoded according to the determined characteristics of video encoding may be transmitted from the first video conferencing device to the second video conferencing device. Implementations described herein for video conferencing may be utilized for/by any number of connected video conferencing devices.

Figure 30A:
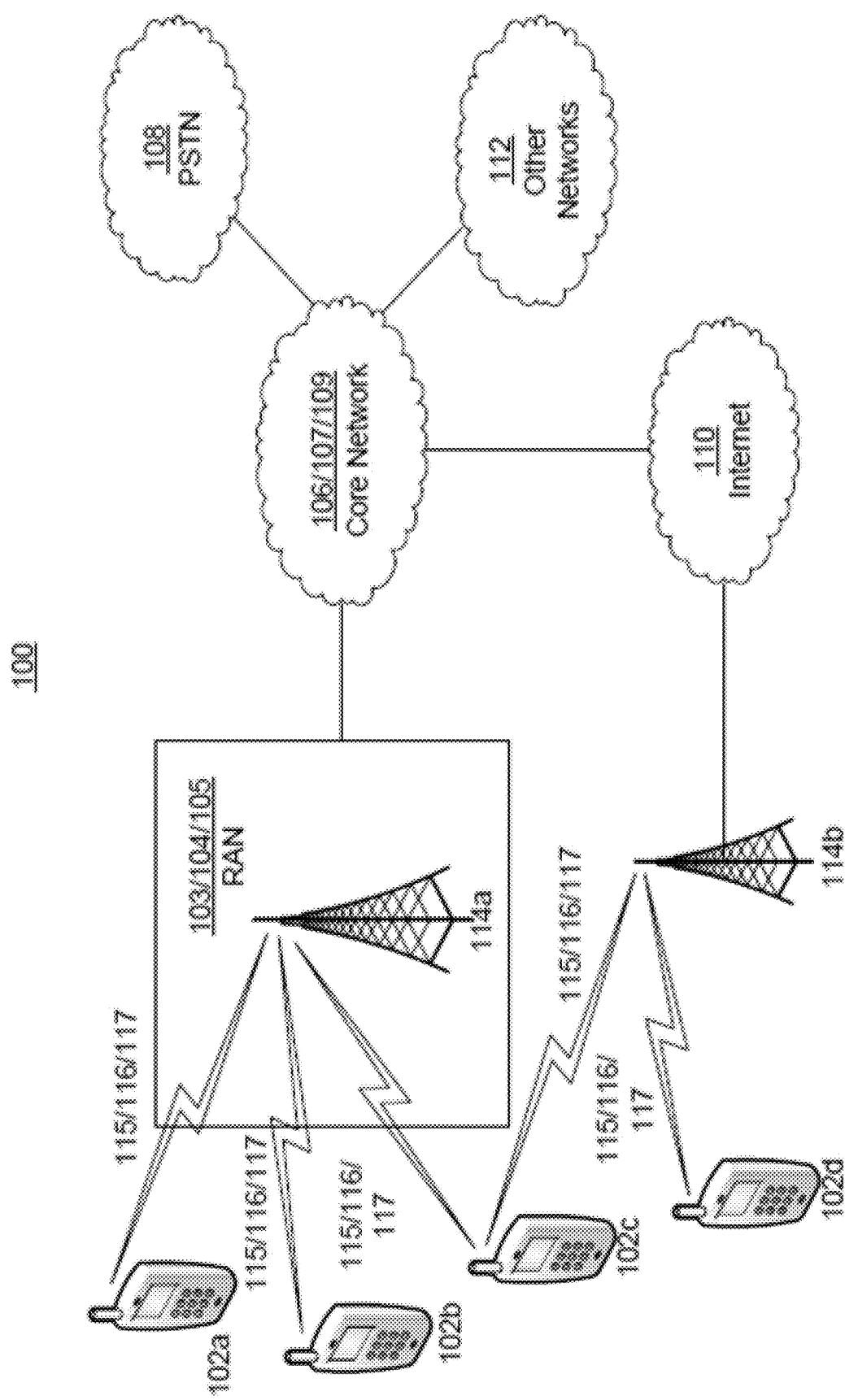
FIG. 30A is a system diagram of an example communications system in which one or more disclosed embodiments may be implemented.

FIG. 30A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 30A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 30A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 30A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 30A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 30A may be configured to communicate with the base station 114a, which may employ a cellular-based radio technology, and with the base station 114b, which may employ an IEEE 802 radio technology.

Figure 30B:
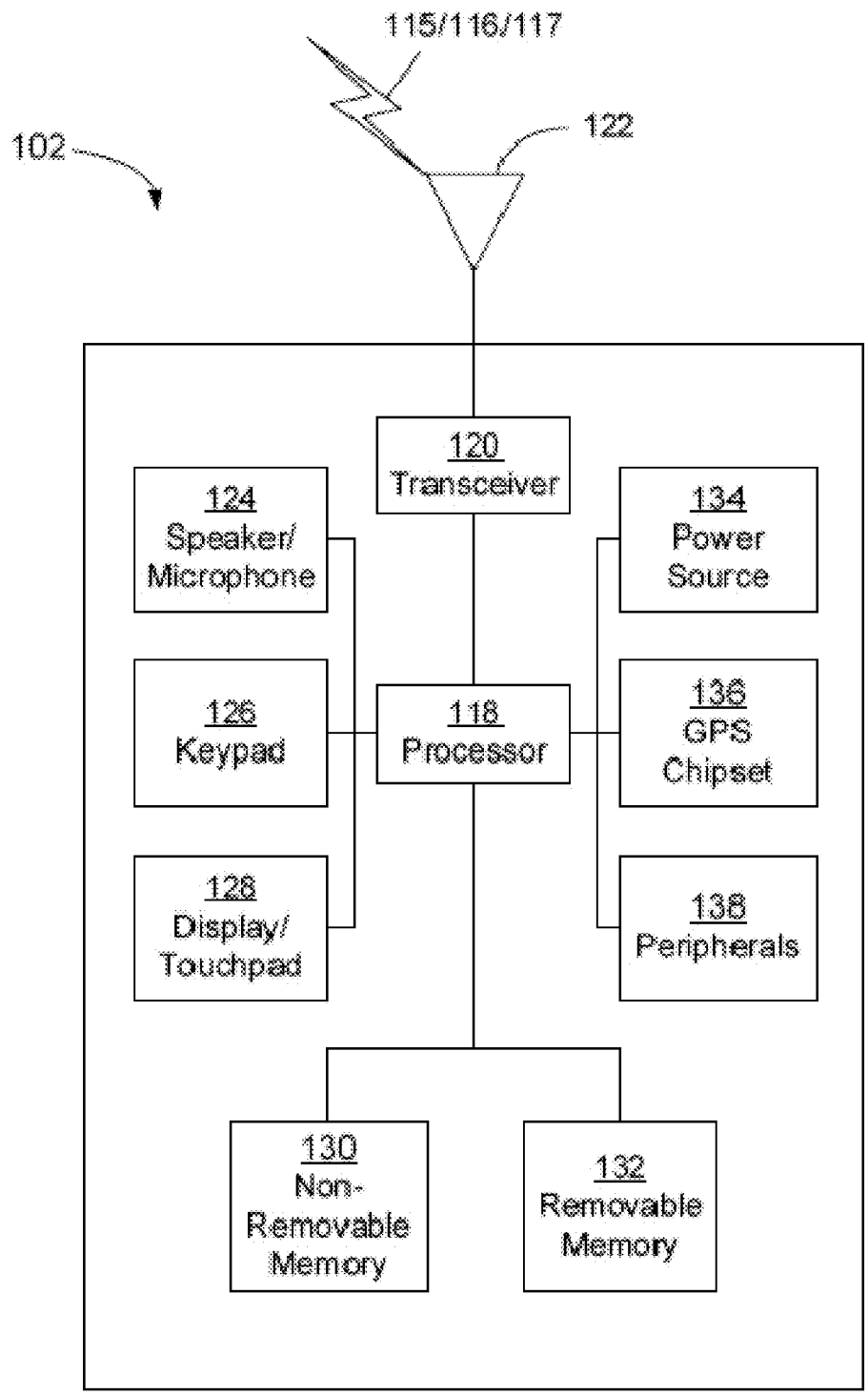
FIG. 30B is a system diagram of an example wireless transmit/receive unit (WTRU) that may be used within the communications system illustrated in FIG. 30A.

FIG. 30B is a system diagram of an example WTRU 102. As shown in FIG. 30B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 30B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 30B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 30B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 30C:
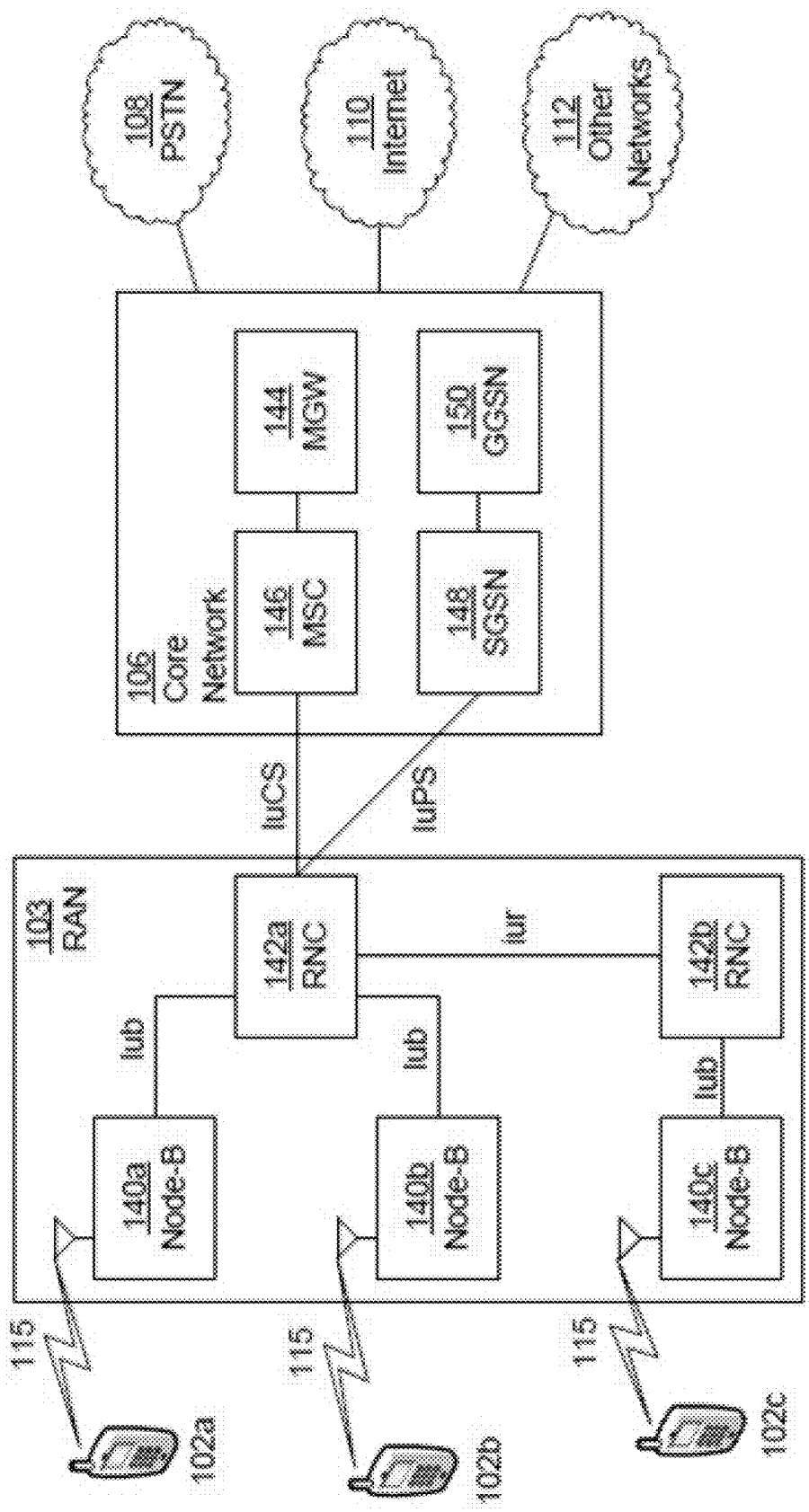
FIG. 30C is a system diagram of an example radio access network and an example core network that may be used within the communications system illustrated in FIG. 30A.

FIG. 30C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 30C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 30C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 30C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 30D:
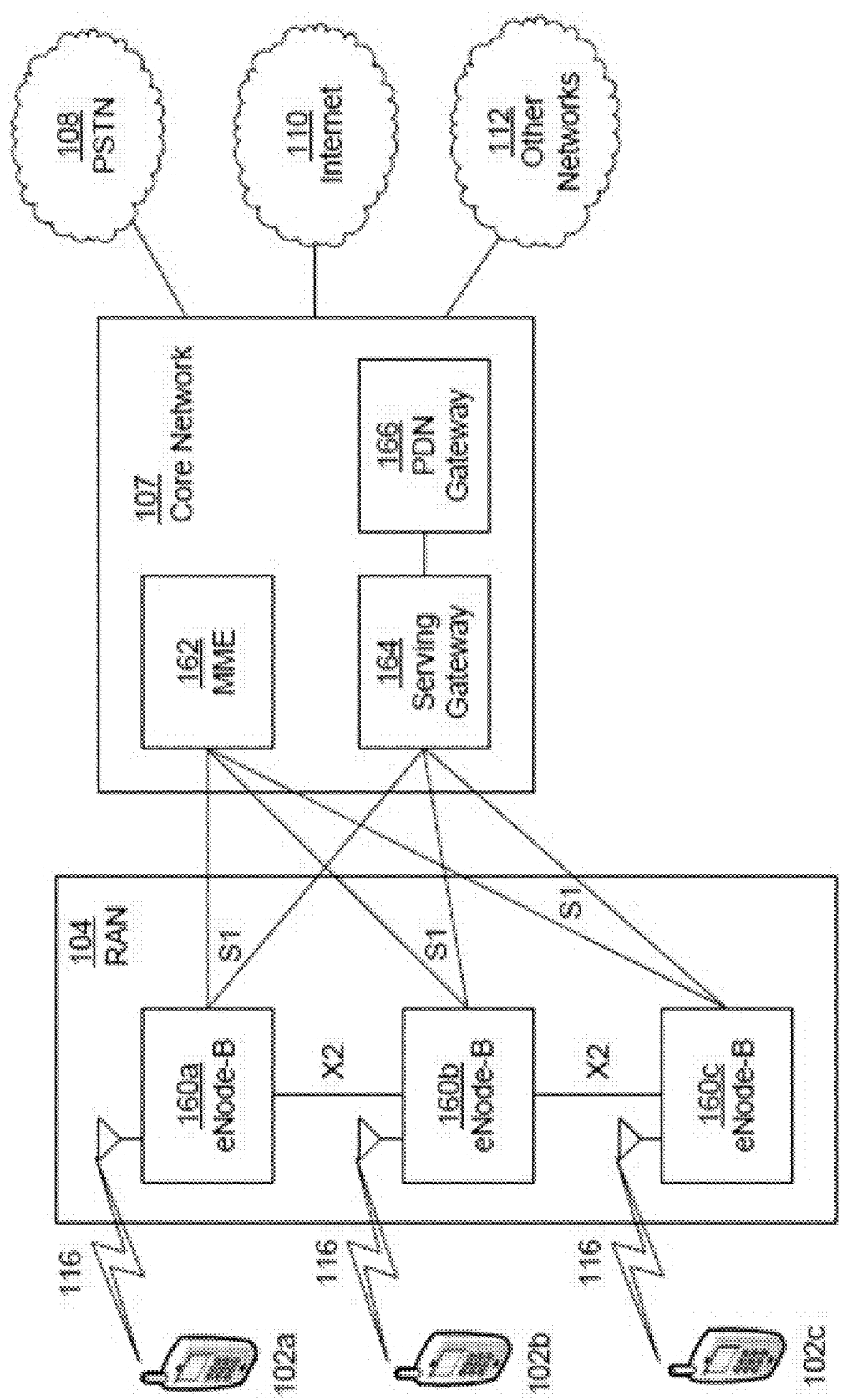
FIG. 30D is a system diagram of an another example radio access network and another example core network that may be used within the communications system illustrated in FIG. 30A.

FIG. 30D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 30D, the eNode-Bs 160a, 160b, 160c may communicate with one another over an X2 interface.

The core network 107 shown in FIG. 30D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 30E:
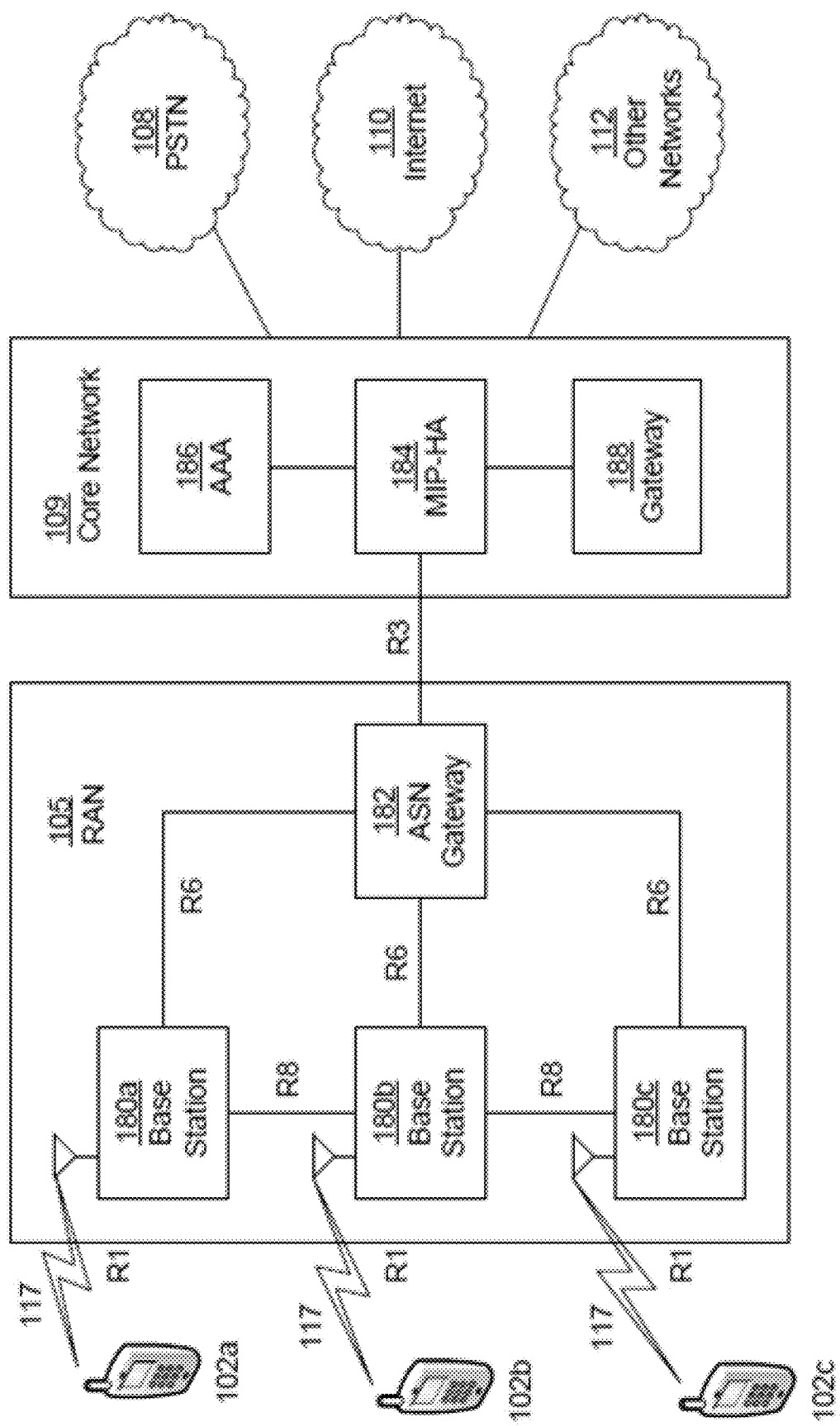
FIG. 30E is a system diagram of an another example radio access network and another example core network that may be used within the communications system illustrated in FIG. 30A.

FIG. 30E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 30E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 30E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 30E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for receiving multimedia content using a mobile device, the method comprising:
   receiving a Media Presentation Description (MPD) file for Dynamic Adaptive Streaming over HTTP (DASH), wherein the MPD file is configured to indicate at least one of a first viewing angle attribute that is associated with a segment of the multimedia content or a second viewing angle attribute that is associated with the segment of the multimedia content;
   receiving a first input from a mobile device camera that is associated with the mobile device, wherein the mobile device comprises a screen;
   based on the first input from the mobile device camera, determining a first viewing angle associated with the screen;
   determining that the first viewing angle associated with the screen is one of a set of viewing angles indicated by the first viewing angle attribute in the MPD file;
   based on the determination that the first viewing angle associated with the screen is one of the set of viewing angles indicated by the first viewing angle attribute in the MPD file, sending a first hypertext transfer protocol (HTTP) GET request for a first DASH segment of the multimedia content from a network, wherein the first DASH segment is associated with the segment of the multimedia content, and wherein the first DASH segment is processed at a first rate;
   receiving the first DASH segment of the multimedia content from the network;
   starting playback of the first DASH segment of the multimedia content;
   receiving a second input from the mobile device camera associated with the mobile device;
   based on the second input from the mobile device camera, determining a second viewing angle associated with the screen;
   determining that the second viewing angle associated with the screen is one of a set of viewing angles indicated by the second viewing angle attribute in the MPD file; and
   based on the determination that the second viewing angle associated with the screen is not one of the set of viewing angles indicated by the second viewing attribute in the MPD file, stopping the playback of the first DASH segment of the multimedia content.

2. The method of claim 1, wherein the method is performed by a DASH client residing on the mobile device, and wherein the multimedia content comprises a video file.

3. The method of claim 1, wherein the MPD file is further configured to indicate a maximum viewing angle attribute that is associated with the segment of the multimedia content, wherein the method comprises:
receiving a third input from the mobile device camera associated with the mobile device;
based on the third input from the mobile device camera, determining a third viewing angle associated with the screen;
determining that the third viewing angle is greater than the maximum viewing angle attribute indicated in the MPD file; and
based on the determination that the third viewing angle is greater than the maximum viewing angle attribute indicated in the MPD file, stopping the playback of the first DASH segment of the multimedia.

4. The method of claim 1, wherein the MPD file is further configured to indicates a minimum viewing angle attribute that is associated with the segment of the multimedia content, wherein the method comprises:
receiving a third input from the mobile device camera associated with the mobile device;
based on the third input from the mobile device camera, determining a third viewing angle associated with the screen;
determining that the third viewing angle is less than the minimum viewing angle attribute indicated in the MPD file;
based on the determination that the third viewing angle is less than the minimum viewing angle attribute indicated in the MPD file, sending a second HTTP GET request for a second DASH segment of the multimedia content, wherein the second DASH segment is processed at a second rate, wherein the second DASH segment is associated with the minimum viewing angle attribute indicated in the MPD, and wherein the second rate is different than the first rate; and
receiving the second DASH segment of the multimedia content from the network.

5. The method of claim 4, wherein the second rate is determined based on a function of at least one of: an encoding rate of the multimedia content, a spatial resolution of the multimedia content, a temporal resolution of the multimedia content, quantization parameters, rate control parameters, a target bit rate of the multimedia content, a spatial filtering of the multimedia content, or a temporal filtering of the multimedia content.

6. The method of claim 1, wherein the MPD file is further configured to indicates a third viewing angle attribute, wherein the MPD file further comprises a descriptor indicating whether the third viewing angle attribute is required, and wherein the method comprises:
receiving a third input from the mobile device camera associated with the mobile device;
based on the third input from the mobile device camera, determining a third viewing angle associated with the screen;
based on the descriptor, determining that the third viewing angle attribute is required;
based on the determination that the third viewing angle attribute is required, determining whether the third viewing angle meets the required third viewing angle attribute associated with the MPD; and
based on a determination that the third viewing angle fails to meet the required third viewing angle attribute, stopping the playback of the first DASH segment of the multimedia.

7. The method of claim 1, wherein the MPD file is further configured to indicates a third viewing angle attribute, wherein the MPD file further comprises a descriptor indicating whether the third viewing angle attribute is required, and wherein the method comprises:
receiving a third input from the mobile device camera associated with the mobile device;
based on the third input from the mobile device camera, determining a third viewing angle associated with the screen;
based on the descriptor, determining that the third viewing angle attribute is required,
based on the determination that the third viewing angle attribute is required, determining whether the third viewing angle meets the required third viewing angle attribute associated with the MPD;
based on a determination that the third viewing angle meets the required third viewing angle attribute, sending a second HTTP GET request for a second DASH segment of the multimedia content processed at a second rate, wherein the second HTTP GET request for the second DASH segment is associated with the required third viewing angle attribute, and wherein the second rate is different than the first rate; and
receiving the second DASH segment of the multimedia content from the network.

8. The method of claim 7, wherein the second rate is determined based on a function of at least one of: an encoding rate of the multimedia content, a spatial resolution of the multimedia content, a temporal resolution of the multimedia content, quantization parameters, rate control parameters, a target bit rate of the multimedia content, a spatial filtering of the multimedia content, or a temporal filtering of the multimedia content.

9. A mobile device configured to receive multimedia content, the mobile device comprising:
a screen; and
a processor configured to:
receive a Media Presentation Description (MPD) file for Dynamic Adaptive Streaming over HTTP (DASH), wherein the MPD file is configured to indicate at least one of a first viewing angle attribute that is associated with a segment of the multimedia content or a second viewing angle attribute that is associated with the segment of the multimedia content;
receive a first input from a mobile device camera associated with the mobile device, wherein the mobile device comprises the screen;
based on the first input from the mobile device camera, determine a first viewing angle associated with the screen;
determine that the first viewing angle associated with the screen is one of a set of viewing angles indicated by the first viewing angle attribute in the MPD file;
based on the determination that the first viewing angle associated with the screen is one of the set of viewing angles indicated by the first viewing angle attribute in the MPD file, send a first hypertext transfer protocol (HTTP) GET request for a first DASH segment of the multimedia content from a network, wherein the first DASH segment is associated with the segment of the multimedia content, and wherein the first DASH segment is processed at a first rate;

receive the first DASH segment of the multimedia content from the network;

start playback of the first DASH segment of the multimedia content;

receive a second input from the mobile device camera associated with the mobile device;

based on the second input from the mobile device camera, determine a second viewing angle associated with the screen;

determine that the second viewing angle associated with the screen is one of a set of viewing angles indicated by the second viewing angle attribute in the MPD file; and based on the determination that the second viewing angle associated with the screen is not one of the set viewing angles indicated by the second viewing attribute in the MPD file, stop the playback of the first DASH segment of the multimedia content.

10. The mobile device of claim 9, wherein the processor is part of a DASH client residing on the mobile device, and wherein the multimedia content comprises a video file.

11. The mobile device of claim 9, wherein the MPD file is further configured to indicate a maximum viewing angle attribute that is associated with the segment of the multimedia content, wherein the processor is configured to:

receive a third input from the mobile device camera associated with the mobile device;

based on the third input from the mobile device camera, determine a third viewing angle associated with the screen;

determine that the third viewing angle is greater than the maximum viewing angle attribute indicated in the MPD file; and based on the determination that the third viewing angle is greater than the maximum viewing angle attribute indicated in the MPD file, stop the playback of the first DASH segment of the multimedia.

12. The mobile device of claim 9, wherein the MPD file is further configured to indicates a minimum viewing angle attribute that is associated with the segment of the multimedia content, wherein the processor is configured to:

receive a third input from the mobile device camera associated with the mobile device;

based on the third input from the mobile device camera, determine a third viewing angle associated with the screen;

determine that the third viewing angle is less than the minimum viewing angle attribute indicated in the MPD file;

based on the determination that the third viewing angle is less than the minimum viewing angle attribute indicated in the MPD file, send a second HTTP GET request for a second DASH segment of the multimedia content, wherein the second DASH segment is processed at a second rate, wherein the second DASH segment is associated with the minimum viewing angle attribute indicated in the MPD, and wherein the second rate is different than the first rate; and receive the second DASH segment of the multimedia content from the network.

13. The mobile device of claim 12, wherein the second rate is determined based on a function of at least one of: an encoding rate of the multimedia content, a spatial resolution of the multimedia content, a temporal resolution of the multimedia content, quantization parameters, rate control parameters, a target bit rate of the multimedia content, a spatial filtering of the multimedia content, or a temporal filtering of the multimedia content.

14. The mobile device of claim 9, wherein the MPD file is further configured to indicates a third viewing angle attribute, wherein the MPD file further comprises a descriptor indicating whether the third viewing angle attribute is required, and wherein the processor is configured to:

receive a third input from the mobile device camera associated with the mobile device;

based on the third input from the mobile device camera, determine a third viewing angle associated with the screen;

based on the descriptor, determine that the third viewing angle attribute is required;

based on the determination that the third viewing angle attribute is required, determine whether the third viewing angle meets the required third viewing angle attribute associated with the MPD; and based on a determination that the third viewing angle fails to meet the required third viewing angle attribute, stop the playback of the first DASH segment of the multimedia.

15. The mobile device of claim 9, wherein the MPD file is further configured to indicates a third viewing angle attribute, wherein the MPD file further comprises a descriptor indicating whether the third viewing angle attribute is required, and wherein the processor is configured to:

receive a third input from the mobile device camera associated with the mobile device;

based on the third input from the mobile device camera, determine a third viewing angle associated with the screen;

based on the descriptor, determine that the third viewing angle attribute is required, based on the determination that the third viewing angle attribute is required, determine whether the third viewing angle meets the required third viewing angle attribute associated with the MPD;

based on a determination that the third viewing angle meets the required third viewing angle attribute, send a second HTTP GET request for a second DASH segment of the multimedia content processed at a second rate, wherein the second HTTP GET request for the second DASH segment is associated with the required third viewing angle attribute, and wherein the second rate is different than the first rate; and receive the second DASH segment of the multimedia content from the network.

16. The mobile device of claim 15, wherein the second rate is determined based on a function of at least one of: an encoding rate of the multimedia content, a spatial resolution of the multimedia content, a temporal resolution of the multimedia content, quantization parameters, rate control parameters, a target bit rate of the multimedia content, a spatial filtering of the multimedia content, or a temporal filtering of the multimedia content.

* * * * *